United States Patent
D'Ippolito et al.

(10) Patent No.: US 11,533,216 B2
(45) Date of Patent: Dec. 20, 2022

(54) AGGREGATING ALARMS INTO CLUSTERS TO DISPLAY SERVICE-AFFECTING EVENTS ON A GRAPHICAL USER INTERFACE

(71) Applicant: Ciena Corporation, Hanover, MD (US)

(72) Inventors: Tommaso D'Ippolito, Ottawa (CA); Christiane Louise Campbell, Ottawa (CA); Sonya Thornley, Ottawa (CA); Nigel Davis, Edgware (GB)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/005,386

(22) Filed: Aug. 28, 2020

(65) Prior Publication Data
US 2022/0070050 A1    Mar. 3, 2022

(51) Int. Cl.
*H04L 41/0631* (2022.01)
*H04L 41/0604* (2022.01)
*H04L 41/22* (2022.01)

(52) U.S. Cl.
CPC ...... *H04L 41/0631* (2013.01); *H04L 41/0609* (2013.01); *H04L 41/0613* (2013.01); *H04L 41/0627* (2013.01); *H04L 41/22* (2013.01)

(58) Field of Classification Search
None
See application file for complete search history.

(56) References Cited

U.S. PATENT DOCUMENTS

| | | |
|---|---|---|
| 6,223,219 B1 | 4/2001 | Uniacke et al. |
| 6,381,237 B1 | 4/2002 | Lam et al. |
| 6,819,668 B1 | 11/2004 | Hackett et al. |
| 6,907,549 B2 | 6/2005 | Davis et al. |
| 6,990,517 B1 | 1/2006 | Bevan et al. |
| 7,107,496 B1 | 9/2006 | D'Ippolito et al. |
| 7,149,975 B1 | 12/2006 | Johnson et al. |
| 7,400,583 B2 | 7/2008 | Friskney et al. |
| 8,127,042 B1 | 2/2012 | Davis et al. |
| 10,033,623 B2 | 7/2018 | Jain et al. |
| 2007/0129893 A1* | 6/2007 | McColl ............ G06Q 10/00 702/19 |
| 2009/0086757 A1 | 4/2009 | Shew et al. |
| 2009/0234946 A1* | 9/2009 | Luo ............ H04L 41/06 709/224 |
| 2013/0007624 A1* | 1/2013 | Hasan ............ H04L 67/26 715/736 |

(Continued)

FOREIGN PATENT DOCUMENTS

CA        2287844 A1    5/2001

*Primary Examiner* — Joshua Joo
(74) *Attorney, Agent, or Firm* — Clements Bernard Baratta; Lawrence A. Baratta, Jr.; Christopher L. Bernard

(57) ABSTRACT

Systems and methods are provided for correlating alarms throughout a multi-layer network and visualizing alarm clusters in a display of an interactive Graphical User Interface (GUI) to enable a network operator to prioritize urgent network issues. In one embodiment, an interactive GUI includes a main display area configured to display one or more geometrical shapes representing one or more alarm clusters, respectively. Each alarm cluster may represent a potential root-cause event in a network. The interactive GUI also includes one or more interactive objects that, when selected by a user, provide additional information associated with the one or more alarm clusters.

16 Claims, 52 Drawing Sheets

(56) References Cited

U.S. PATENT DOCUMENTS

| | | | |
|---|---|---|---|
| 2013/0099916 A1* | 4/2013 | Camp | G05B 19/0428 |
| | | | 340/501 |
| 2014/0006871 A1* | 1/2014 | Lakshmanan | H04L 41/064 |
| | | | 714/37 |
| 2015/0106506 A1* | 4/2015 | Weinrich | G05B 23/0267 |
| | | | 709/224 |
| 2015/0156059 A1 | 6/2015 | Shew et al. | |
| 2015/0350260 A1* | 12/2015 | Tadepalli | G06F 9/542 |
| | | | 709/203 |
| 2016/0182274 A1* | 6/2016 | Kiesekamp | H04L 43/045 |
| | | | 709/224 |
| 2016/0231909 A1* | 8/2016 | Olsson | G06T 11/206 |
| 2017/0102846 A1* | 4/2017 | Ebler | G16H 40/67 |
| 2017/0288945 A1* | 10/2017 | Chandangoudar | |
| | | | H04L 41/0631 |
| 2017/0346701 A1* | 11/2017 | Perrett | H04L 41/145 |
| 2018/0095856 A1* | 4/2018 | Brugler | G06F 11/3075 |
| 2018/0123924 A1* | 5/2018 | Lin | H04L 41/5012 |
| 2018/0211167 A1* | 7/2018 | Xu | H04L 41/0622 |
| 2018/0239522 A1 | 8/2018 | Campbell et al. | |
| 2018/0248960 A1* | 8/2018 | Maheshwari | H04L 41/5032 |
| 2018/0359133 A1 | 12/2018 | Shew et al. | |
| 2019/0215248 A1 | 7/2019 | D'Ippolito et al. | |
| 2019/0228296 A1* | 7/2019 | Gefen | G06F 11/079 |
| 2020/0106660 A1* | 4/2020 | Kakani | G06F 11/0709 |
| 2020/0162353 A1* | 5/2020 | Szigeti | H04L 41/5009 |
| 2020/0382362 A1* | 12/2020 | Wang | H04L 41/0695 |
| 2021/0248138 A1* | 8/2021 | Pelloin | G06F 16/248 |

\* cited by examiner

FIG. 14

AGGREGATING ALARMS INTO CLUSTERS TO DISPLAY SERVICE-AFFECTING EVENTS ON A GRAPHICAL USER INTERFACE

TECHNICAL FIELD

The present disclosure generally relates to correlating alarms received throughout a system, such as a communications network, to group the alarms into bundles or clusters that can be represented as service-affecting events to be addressed in the system.

BACKGROUND

Generally, at a Network Operations Center (NOC) or Network Management Center (NMC), network experts may analyze various information related to the conditions or states of a network. From this analysis, the experts can make decisions regarding control, management, maintenance, network planning, etc., to keep the network operating properly and to ensure that network services are provided to customers. NOCs may be set up for use by various businesses or organizations to oversee complex networking systems. In particular, the network experts may need to monitor alarms in order to address pending issues or events within the network, particularly those alarms that are indicative of significant issues, such as a service being down.

Some software products are used for gathering alarms and events within a network. However, many of the products merely provide a list of various alarms. In response, a rudimentary alarm-to-service correlation function may be performed which tags each alarm with the raw count of related services each alarm may affect. Details for any given alarm may simply include a list of the related services at a single layer of the network. No related services at corresponding higher-layers or lower-layers are listed.

Conventional systems therefore do not contain any type of correlation of related alarms (e.g., root-cause, symptomatic alarms, etc.) and there is no inclusion of all services that may be affected by the alarms across all managed layers. In this type of system, a network expert may be required to manually traverse up and down each layer by selecting dependent services or supported services tabs from an original list of related services of the alarm objects in focus. This typically results in more work and time needed to ascertain the size and extent of network events and how they affect services. In addition, manually traversing layers to discover the multiple services is complex and prone to human error. Therefore, there is a need in the field of networking and network management to provide a tool to simplify the process of managing and controlling a network.

BRIEF SUMMARY

The present disclosure is directed to systems, methods, and non-transitory computer-readable media for obtaining alarms from various locations throughout a system, such as a communications network, and correlating the alarms into groups or alarm clusters that represent a potential singular root-cause event. According to one embodiment, an interactive Graphical User Interface (GUI) includes a main display area configured to display one or more geometrical shapes representing one or more alarm clusters, respectively, wherein each alarm cluster represents a potential root-cause event in a system. The GUI also includes one or more interactive objects that, when selected by a user, provide additional information associated with the one or more alarm clusters.

According to another embodiment, a method may include the steps of obtaining alarms from a multi-layer network, correlating the alarms across the multi-layer network based on a combination of time and service, and presenting a visualization of the correlated alarms and services.

According to yet another embodiment, a system may be configured to include a processor and a memory device configured to store software logic having instructions that, when executed, enable the processor to receive alarms based on parameters detected at different points of a multi-layer network. The instructions also enable the processor to analyze the alarms to determine correlations among sets of alarms to group related alarms into bundles and graphically display each bundle as a single object on an interactive GUI.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIGS. 13-15 are diagrams illustrating yet another example of an interactive GUI for displaying network events allowing user interaction, according to various embodiments.

DETAILED DESCRIPTION

Figure 1:
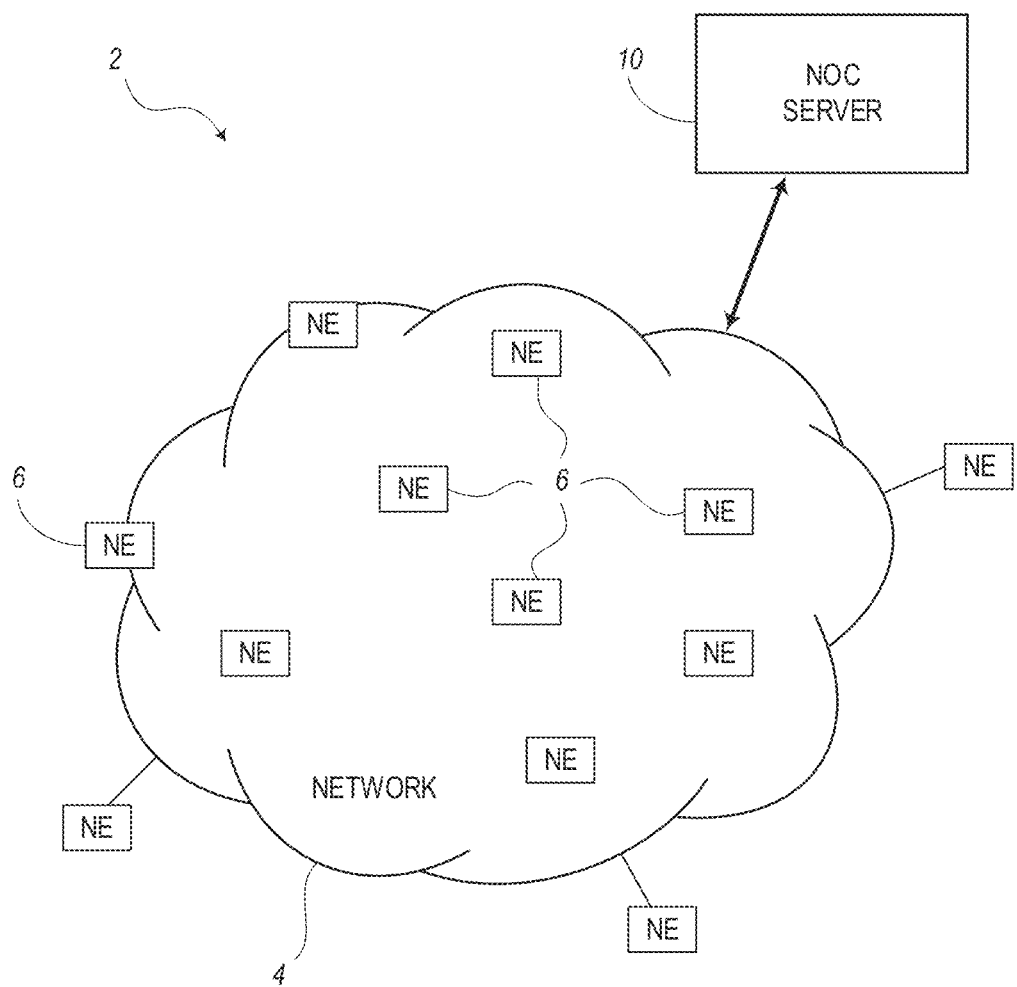
FIG. 1 is a diagram illustrating a communication system in which a network is monitored, according to various embodiments of the present disclosure.

Conventional network management systems typically do not provide any type of useful correlation information regarding network alarms that are related in order to determine a root-cause. The analysis of network conditions is useful for determining root causes of network issues. However, although the embodiments of the present disclosure may be used for estimating a root cause, another aspect of the present disclosure is to prioritize issues that have been detected in a network and clearly communicate multiple issues to a network expert so that the expert can determine what issues should be addressed first. The systems and methods of the present disclosure also help to prevent some issues from going unaddressed.

The present disclosure is configured to group related services that may be affected by the same event across multiple layers of the network. The present disclosure provides systems and methods that are an improvement over conventional systems by utilizing an interactive Graphical User Interface (GUI) that can graphically depict related alarms and services into one object that can be plotted on a graph. For example, the graph may include elapsed time on the x-axis to indicate the age of the alarm group since the alarm group was first detected. Bandwidth is shown on the y-axis to indicate the number of channels affected by the network issue. The present systems thus provide a visual display with ancillary statistics to assist an operator on choosing the highest priority event or event group/bundle that affects services to draw attention to issues that should be resolved first. Thus, the embodiments of the present disclosure do not require a user to manually traverse up and down layers by selecting dependent services or supported services tabs, as would normally be required in a conventional system, but may display the information in a format that would be easy for a network operator to see which alarms may require the most attention. The present disclosure also allows the network operator to quickly ascertain the size of service affecting events.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a diagram illustrating an embodiment of a monitoring system 2 in which a network 4 or any other type of system is monitored. A plurality of Network Elements (NEs) 6 are connected to and/or in communication with components or equipment of the network 4. In other embodiments, the network 4 may instead be configured as a system having any type of elements with interrelated functions. The NEs 6 may include detectors or sensors (forming a telemetry system) for detecting various parameters that may be related to the condition or state of the NEs 6 at different points in the network. Also, the network 4 may be a multi-layer network and the NEs 6 may be configured to detect parameters to determine the conditions at any of the layers. The NEs 6 can also determine if the measured parameters are indicative of an alarm situation, such as when the parameters are outside of a range of normal operating values. Such alarm situations may point to one or more issues or events in the network 4 that should be addressed and resolved.

The NEs 6 are in communication with a service 10, which may be located at a Network Operations Center (NOC) and may be associated with an orchestrator, controller, Network Management System (NMS), management system/controller, etc. The term NMS shall be used here to cover any such system. The server 10 may be configured to send the measured parameters or only the parameters or alarms that are indicative of some type of problem in the network 4. When the various elements or components of the network 4 (at different points of the network) exhibit various symptoms that may represent an issue, the NE 6 provide the detected symptoms to the server 10 for further processing. In response to receiving numerous alarms, a network manager at the server 10 may need to analyze these alarms to determine how to go about resolving any network issues or events.

In the conventional systems, it may be difficult and time-consuming for the network manager at the server 10 to determine any type of correlating between related issues. However, in the present disclosure, the server 10 may include automated functions for grouping a plurality of localized issues into clusters in order that each cluster can be handled as a single event. Therefore, the server 10 is configured to receive the various alarms from the multiple NEs 6 and then correlate those alarms to determine some correlation or association among the alarms in order to group or aggregate the correlated alarms into one or more bundles or alarm clusters which represent potential root-cause events. In particular, the alarm clusters are grouped to represent events that affect some service or services in the network 4. By automatically grouping the issues in this way, it is possible for the network manager at the server 10 to manage each alarm cluster more easily. Also, it will allow the network manager to prioritize the events by defining the events as critical, major, minor, etc., so that the events can be addressed at an appropriate time.

Figure 2:
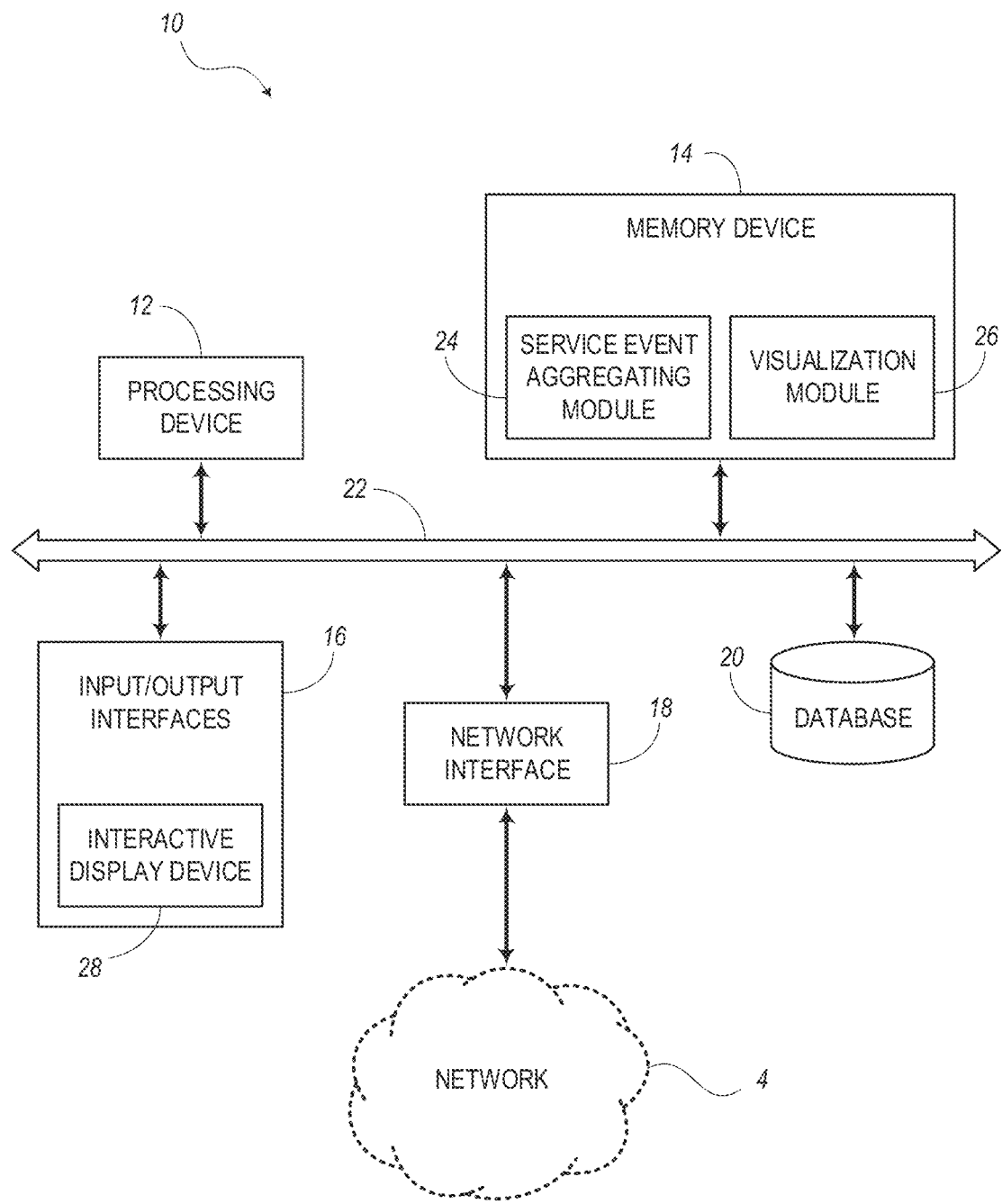
FIG. 2 is a block diagram illustrating a Network Management System (NMS) for monitoring events within a network according to various embodiments of the present disclosure.

FIG. 2 is a block diagram illustrating an embodiment of the server 10 shown in FIG. 1. For example, the server 10 may be configured within the network 4 or may be in communication with the network 4 for monitoring various elements and components of the network 4. In particular, the server 10 is configured to receive and analyze the alarms from the NEs 6. In the analysis, the server 10 is configured to determine correlations among sets of alarms to group the related or correlated alarms into bundles or clusters. For example, the alarms may be grouped based on the association of related issues within a layer stack. Also, grouping may be based on the proximity of the NEs 6 having similar issues. The alarms may additionally be grouped based on issues or events happening at essentially the same time. It should be noted that alarms can be grouped according to other various factors.

In addition, the server 10 is further configured to display the results of the issue grouping process. For example, the server 10 may include a Graphical User Interface (GUI) for graphically displaying each issue cluster as a single object (e.g., a bubble). The GUI may show the objects (representing different issue clusters) in certain ways and on certain places on the display screen to convey certain aspects of each of the issue clusters. For example, the GUI may include a graph having an x-axis and a y-axis, whereby the age (time or elapsed time) of the issue cluster can be shown on the x-axis and an amount of bandwidth affected can be shown on the y-axis. As such, the GUI can be regularly updated to show the ever-increasing age of the issue clusters. Also, the GUI may include interactive features to allow the user to obtain additional information on demand, such as by clicking on an interactive object (e.g., text, link, etc.) that represents a client, service, etc.

In the illustrated embodiment, the server 10 may be a digital computer that, in terms of hardware architecture, generally includes a processing device 12, a memory device 14, Input/Output (I/O) interfaces 16, a network interface 18, and a database 20. The memory device 14 may include a data store, database (e.g., database 20), or the like. It should be appreciated by those of ordinary skill in the art that FIG. 2 depicts the server 10 in a simplified manner, where practical embodiments may include additional components and suitably configured processing logic to support known or conventional operating features that are not described in detail herein. The components (i.e., 12, 14, 16, 18, 20) are communicatively coupled via a local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a Central Processing Unit (CPU), an auxiliary processor among several processors associated with the server 10, a semiconductor-based microprocessor (in the form of a microchip or chip set), or generally any device for executing software instructions. When the server 10 is in operation, the processing device 12 may be configured to execute software stored within the memory device 14, to communicate data to and from the memory device 14, and to generally control operations of the server 10 pursuant to the software instructions.

It will be appreciated that some embodiments of the processing device 12 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 18 may be used to enable the server 10 to communicate over a network, such as the network 4, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the network 4.

The memory device 14 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store used to store data. In one example, the data store may be located internal to the server 10 and may include, for example, an internal hard drive connected to the local interface 22 in the server 10. Additionally, in another embodiment, the data store may be located external to the server 10 and may include, for example, an external hard drive connected to the Input/Output (I/O) interfaces 16 (e.g., SCSI or USB connection). In a further embodiment, the data store may be connected to the server 10 through a network and may include, for example, a network attached file server.

Moreover, some embodiments may include a non-transitory computer-readable storage medium having computer readable code stored in the memory device 14 for programming the server 10 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

According to some embodiments, the memory device 14 may include a service event aggregating module 24, a visualization module 26, and various other software/firmware programs, code, logic, etc. for controlling, monitoring, managing the network 4. In other embodiments, the modules 24, 26 may be implemented in hardware or a combination of hardware and software/firmware.

The service event aggregating module 24 may be configured to enable the processing device 12 to receive alarms from the network 4 via the network interface 18. Upon collecting the various alarms, the service event aggregating module 24 may enable the processing device 12 to perform a correlation process for determining a correlation or association among sets of related alarms. Thus, the related/correlated alarms can be grouped or aggregated into one or more bundles or "alarm clusters." For example, the alarm clusters may represent a single root-cause event in the network 4 that affects multiple elements or components within the network 4. More importantly, the alarm clusters represent one or more events that have a negative impact on services offered by service providers over the network 4. When the correlated alarms are clustered, it is possible for a network manager to more easily understand the scope that each alarm cluster has on the services.

The data obtained from the network 4 and the alarm clusters can be used for displaying useful information to the network manager at the server 10. For instance, specific display features can be shown on an interactive display device 28 of the I/O interfaces 16. The interactive display device 28 may include a display screen on which a number of interactive GUIs can be displayed. Multiple examples of GUIs are described throughout the present disclosure.

The service event aggregating module 24 is configured to correlate network alarms and events into service-affecting event bundles so that services (e.g., cross-layer services) are grouped into one addressable object that can be visually graphed on the interactive display device 28 of the server 10 in order to help the operator focus on the events with the highest priority, the most bandwidth being affected, the most customer-sensitive services being affected, or other urgent events. Basically, a service-affecting bundle is created by associating related network alarms with the services that are affected. Usually, a service on a lower layer (e.g., Layer 0 or photonic layer) may be the bearer of the issue and may be associated with services on an upper layer (e.g., Layer 3 or Internet Protocol (IP) layer) that the lower layer supports. The service event aggregating module 24 may be configured to tie in all the associated symptomatic alarms that occur at relatively the same time. In essence, an alarm cluster (or service-affecting event bundle) may be defined as a set of affected services that are associated together and happen at approximately the same time.

The visualization module 26 may be stored as software or firmware in the memory device 14, as shown, or may alternatively be implemented as any combination of hardware, software, and/or firmware. The visualization module 26 enables the processing device 12 to perform various functions related to displaying GUIs on the interactive display device 28. Information derived from the service event aggregating module 24 (e.g., alarm clusters and details of each of the alarm clusters) can be fed to the visualization module 26 so that the information can be displayed for the user in a format that can be easily understood so that the user can prioritize the various alarms or events. For example, the visualization process may include converting alarm clusters or alarm bundles into bubbles for display in the graph area of the GUI. The service event aggregating module 24 and visualization module 26 may work together in combination to create various GUIs, dashboards, and/or other display features for presentation on the interactive display device, as described below.

Service-affecting event bundles, once created by the service event aggregating module 24, are presented and graphed on GUIs or dashboards as geometrical shapes (e.g., circles or bubbles). Also, the shapes are displayed substantially in real time. For instance, the GUIs may include a main display area having a graph with an x-axis and a y-axis, where the x-axis may be "time," "raised time," or "elapsed time" since the bundle or cluster was first detected. Thus, as the age of a detected event increases (gets older), the farther along the x-axis it is displayed. This graph of the main display may show the correlated services being affected on the y-axis. The affected services may be defined by the amount of bandwidth affected (e.g., in gigabytes), the number of services affected, the number of customers affected, or other factors.

Figure 3:
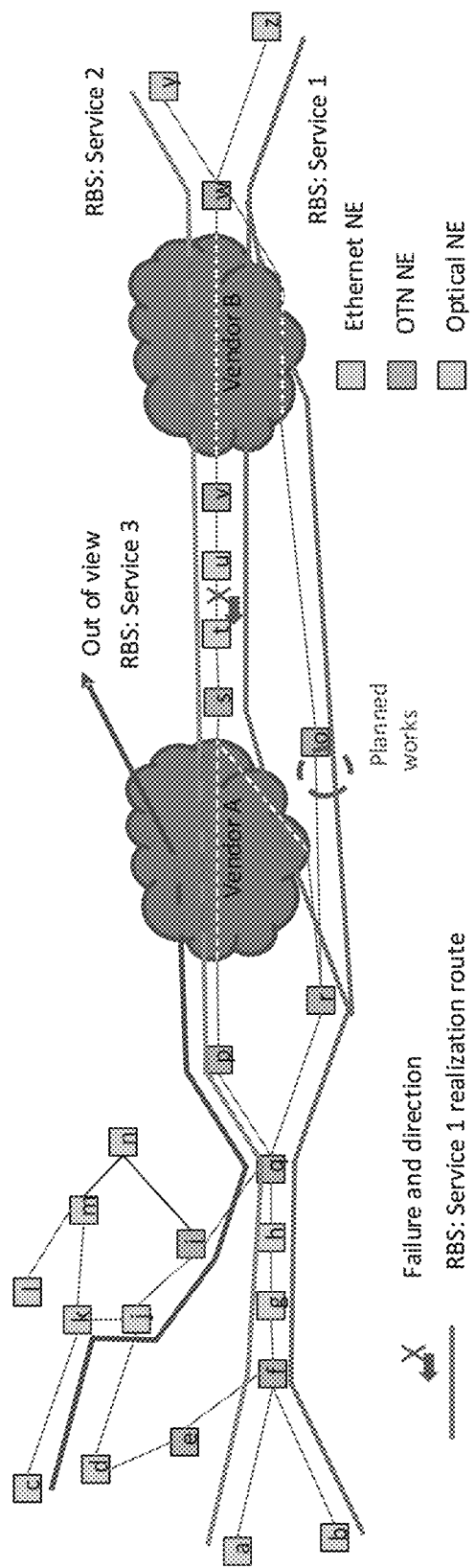
FIG. 3 is a diagram illustrating the effect of a failure within a network, according to various embodiments.

FIG. 3 is a diagram illustrating a portion of a network (e.g., network 4) and an example of the effect of a failure within the network. Again, according to other alternative embodiments, the network may instead be configured as any type of system with interrelated elements. One of the goals of various embodiments of the present disclosure is to detect faults, failures, or other conditions or states in the network or system where measured parameters are determined to be outside of certain tolerance ranges. A fiber break in a communications network, for example, can be detected when no signal is received from the fiber. The present embodiments are configured to manage faults and respond appropriately to restore a network or other system.

A fault in a layer impacts client services of that layer. However, a device is normally unable to observe services across multiple layers and has limited or no visibility of indications in other devices. Thus, when a service is down, it may be detected as separate faults on multiple layers. The present disclosure provides a solution to this problem and is configured to enable a user (e.g., network operator) to trace a service down through the layers and also see all services and hence customers that may be impacted by a fault in a lower layer. The GUIs of the present disclosure are service-oriented. This can provide: 1) faster and more accurate service-assurance, 2) better system-wide surveillance/detection by utilizing alarm stream analysis, 3) better problem triage processes by determining and/or predicting the services impacted by one or more faults, 4) improved diagnosis/isolation, 5) opportunity for mitigation and corrective actions, and others. In some cases, a topology or map of the network may be used to show portions of the network that are affected.

FIG. 3 shows service routes and the way in which an example fault or failure affects services. As shown in FIG. 3 a fault is detected at Network Element "t" (NE t) and potentially in Network Element "u" (NE u), where the actual fault lies somewhere between NE u and NE t impacting service 1 and service 2 realizations for traffic routed in the direction from NE u to NE t. A problem analysis capability may perform a fault localization and, in this example, identify the fault detected at NE t as the indication closest to the actual problem (the root detection). It may also determine service impact and troubleshooting/repair activity prioritization. The NEs may include capabilities to deal with IP, Ethernet, Optical Transport Network (OTN), photonics etc. FIG. 3 highlights the key technology focus of each NE in the example. Various algorithms may be run by the service event aggregating module 24 for analyzing faults and correlating nodes, NEs, services, etc.

One of the purposes of these algorithms is to focus on fault localization and the determination of impact. The algorithms may provide a view of prioritized efforts for resolving network issues to maintain business operations. This can be done by 1) locating each of the localized detections (e.g., by detectors of the NEs 6) throughout the network and finding the location of the detector nearest to the cause (often called the "root cause," which may usually be some indirect action remote from the detector) of a network problem to guide repair action, 2) understanding the service impact (e.g., degradation, failure, etc.) and which specific network problem is causing a service degradation/failure, and 3) understanding what impact any action on the network would have such that impact mitigation actions can be taken (e.g., switch traffic away), etc.

Detectors for detecting network/service operations of the NEs 6 can raise alarms and performance threshold crossing notifications and may support identification of the causes of problems and an explanation of impact on other devices. The detectors may send alarms, Performance Metrics (PMs), and/or other various parameters to the server 10 for further analysis.

For many types of problems, the cause and impact can be determined by use of the structure of networking. As an example, an understanding of the topology of the portion of the network shown in FIG. 3 can be used to properly process the received alarms, PMs, or other data. Observation of interconnectivity and layering in the network enables understanding of resource interdependencies and the support of services. Then, problem analysis can be applied to the whole network (or the portion of the network under observation), including all layers, all vendors, and all services.

When the issues are analyzed using the various algorithms, a problem model can be obtained that focusses on problems and the services impacted, rather than raw alarms etc. themselves. From the GUIs described herein, the user (e.g., network operator) may be able to more readily see the problems when they are displayed as groups of detected conditions (e.g., aggregated alarms, PMs, etc.) than when a long list of raw alarms is all that is provided (as in many conventional systems). This will allow focus on the actual root cause or elements near the root cause so that users can direct maintenance teams to work on problems.

Problems, each of which include many aggregated alarms, can be acknowledged and "owned" by an operator working through the server 10 (as opposed to many individual alarms being acknowledged separately) and each may be handed on to a new owner as the resolution progresses. The systems may use knowledge of network structure including: a) detailed layering (e.g., IP, Ethernet, photonic etc.), b) detector ordering and interdependencies, c) protection and other protocol capabilities that reduce problem impact, d) all service structures and service realizations.

To account for deterministic and non-deterministic issues, the systems of the present disclosure may be configured to deal with: a) known probabilistic issues (e.g., interference) and crosstalk in analogue spaces, b) "invisible" deterministic behaviours such as power network, c) non-deterministic issues such as weather, etc.

"Latched" intermittent indications may be viewed as part of a problem, etc., such that an issue that causes indications to appear then vanish then reappear rapidly does not seem to be many different issues. Just because the indication has gone does not mean that the cause has gone. In some embodiments, a focus may be on the detector instances rather than the alarm occurrences. Any indication, even fleeting, means that there is probably a problem. A problem latch can be reset by an operator such that the problem will clear if the key alarms are no longer active (this may cause a hidden problem to be exposed or for the original set of indications to reappear causing a new representation of the original problem). A process may include gathering all relevant indications (i.e., from that closest to cause through all consequential indications) into a problem structure. The problem structure will be formed on the first occurrence of any new indication from the network that does not clearly belong to an existing problem and may evolve as more information is received from the network. The analysis of the problem structure may include navigating "up" the layers from infrastructure (the lowest layer) to service (the highest layer) to gather detected conditions. It is possible for the system to update a problem as new information arrives (including the combining of multiple problems into one) and also to allow manual assembly or disassembly of problems where the user has insight not readily available to the system, similar to the processes described in U.S. Pat. No. 6,907,549, the contents of which are incorporated by reference herein. A detected condition may be present in more than one problem.

The systems may automatically deal with network fragments and known chained fragments. For example, it may be possible to monitor only a fragment or portion of the network and provide cause/impact within that fragment view. The present systems may also identify if cause is within the domain of a certain region, external operator etc. The systems may also deal with the challenge of missing data to provide probabilistic information on cause and impact. The identity of the detector closest to the problem can be determined and then further steps performed, such as 1) indicate what appears to be causes outside the fragment, 2) identify degree of impact per service and service group, 3) highlight jeopardy (e.g. where service protection has been lost), 4) determine problem repair priority. The process may use the same approach for a "what if" analysis in some embodiments.

Figure 6:
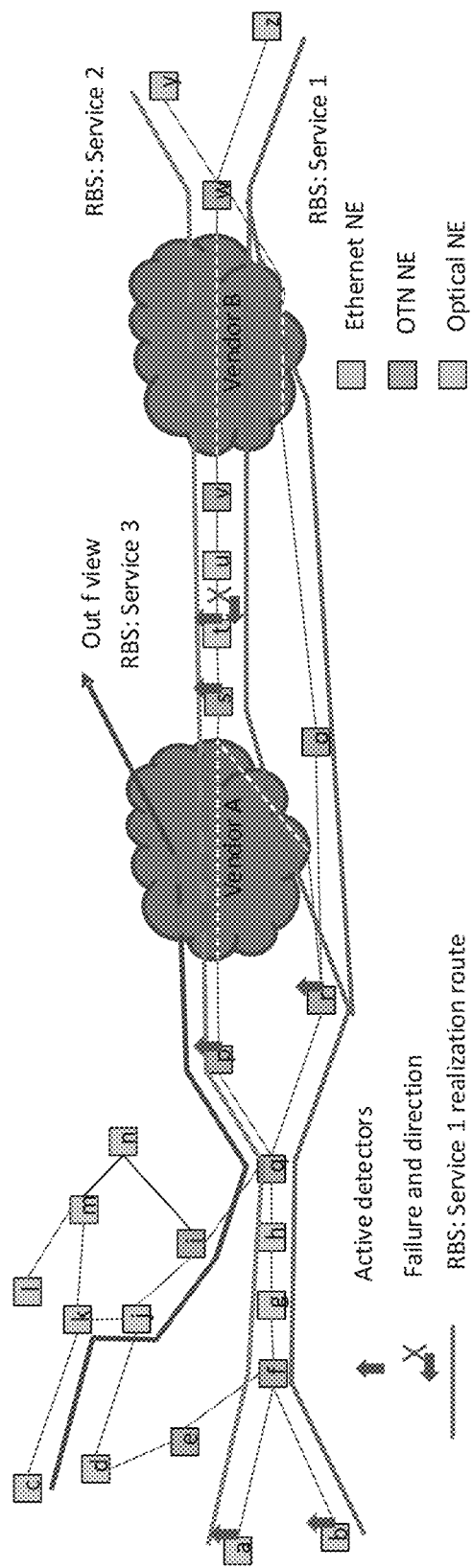
FIG. 6 is a diagram illustrating the network of FIG. 2 and active detectors for detecting a failure, according to various embodiments.

According to one example using the network shown in FIG. 3 and FIG. 6, the network fragment may find a problem, which may be given an identity, for example "problem 235". The system may find a root detection, such as an "optical input failure at port 1 of NE 't'." The first occurrence can also be recorded in any format, such as, for example, "20200623 11:42:31.05 GMT." There may be consequential alarms detected: 1) optical remote indication at port xx on NE u (not shown in FIG. 6); 2) OTN indications (alarms etc.) xx at port xx on NE s; 3) OTN indications xx at port xx on NE p; 4) OTN indications xx at port xx on NE r; 5) Ethernet indications xx at port xx on NE b (this may be minor as protection has recovered Service 1); 6) Ethernet indication xx at xx on NE a; 7) Ethernet remote indication xx at xx on NE y (not shown in FIG. 6). The problem recorded in the server 10 may be identified as being acknowledged/owned by a certain person. The "Problem Status" may be identified as "Intermittent latched." A "Recent root detection state" may be identified as "Not Active 20200623 11:52:00.0 GMT." A "suggested cause" may be identified as "Fiber micro-bend." Other correlations may include: 1) No known supply issues in building; 2) No known temperature issues in building; etc. Operator notes may include: 1) Embedded OTDR shows unexpected reflection close to NE t; 2) Workforce apparently in building. Services Impacted may include: 1) RBS Service 2: Failed; 2) RBS Service 1: Jeopardy: Protection lost. An urgency/priority factor may include: Priority 2 out of 10. And an Estimated Restored Time may be: 20200623 16:00:00 GMT.

In addition to the above "problem 235," the following may be scheduled as worked planned with a certain identity, such as for example, "Planned works 178," which may include: "Impact: Fail port 1 NE o (on signal from NE r to NE o); Plan: Start 20200623 15:00 GMT, End 20200623 16:00 GMT". Expected alarms may include: 1) OTN remote alarm at port xx on NE r (from NE o); 2) OTN alarm xx at port xx on NE w (on signal from NE o), etc. A Status may include: "Owned by Joe Blow". The Services Impacts may include "RBS Service 1—Tolerable based upon SLA." Warnings may include "RBS Service 1 in Jeopardy (Problem 235) and will fail on Works action." Also, operator notes on Problem 235 may include: "Estimated Restored Time: 20200623 16:00 GMT." This will lead to advice to delay the planned work to allow for the fix of Problem 235 so as to not fail service 1.

The RBS Service summary may include a Service state, such as: 1) "RBS Service 1: Jeopardy (problem 235), Warning (planned works 178)"; 2) "RBS Service 2: Failed (problem 235)"; 3) "RBS Service 3: No known issues," etc. A Value Risk may be: "$20,000 loss at probability 20%". Also, a Network problem summary may include: "Owned: 15, New: 3, Alarms: 15,064." Priorities may include: "1 (0), 2(3), 3 (5), 4 (0), 5 (0), 6 (7), 7-10 (0)," and a Current time may be shown as "20200623 12:00:00 GMT".

Certain gains may be achieved by operating the algorithms described in the present disclosure. For example, some gains may include a reduction in alarm noise, an improved focus on purposeful repair, and improved linkage between service impact and repair action. Also, other gains may include improved assurance workflow and repairs that can be directed based upon a degree of impact, where the services more greatly impacted can be focused on first. This can be extended to cost/impact analysis to focus repair actions, as described with respect to U.S. Pat. No. 7,400,583, the contents of which are incorporated by reference herein.

The algorithms used in the various embodiments may include any suitable features for accomplishing the functions described in the present disclosure. Some details of these algorithms may include latching and correlation. From an understanding of the detector, particular detectors may be "known" to be "obvious" causes (e.g., laser bias fail). Indications from components downstream may be gathered under it (up to a protection switch, restoration, etc. opportunity). In addition, a simple algorithm can be used to deal with known/unknown switch states. Particular detectors may be "known" to indicate a problem whenever they occur. Hence, they may be latched. Other particular detectors may be "known" to indicate in-spec behavior (e.g., occasional errors), but may be an indication of something more significant (e.g., if above a threshold). In this case, a threshold indication may be an alarm that is latched. For example, a Loss of Frame (LoF) may include several frames in error in some pattern that causes a threshold to be recognized as crossed.

An additional aspect of the various algorithms may include relating an indication to a transport resource, which may be direct or indirect, where direct may be termination point entity (common terms used for this sort of entity are LTP, LT, Endpoint, UNI, NNI, TTP, CTP, TPE etc. TPE will be used here for a stack of layers and LT (Layer Termination—including functions that are commonly called Adapter, Termination) for a single layer) and forwarding relationship entity (terms used for this sort of entity are Connection, XC, VLAN, VPN, VRF, FC, FRE etc. FRE will be used here). There may be many detectors against each TPE. The FRE indications normally result from configuration issues. Indirect resources may include a Backplane (where there are hidden relationship potentially obscured further by equipment protection), Synchronization, power distribution (may or may not impact the signal), Temperature, external environment, etc.

Another aspect is that it can provide impact qualification for each specific detector, such as a flow direction, type of impact, degree of impact and probability that it is a false detection. Definitions of indications (Alarm etc.), from standards and from device development organizations, will provide details of these qualifications and will provide further explanatory detail. These definitions may ideally be in machine interpretable form.

According to one embodiment of a first cut simple algorithm framework, the algorithm may be configured to deal with layering. The algorithms may be configured to latch most upstream indications of problems. Regarding latching, the algorithm framework may not have a strict detector order, simply resolving to LT (which may include logic to deal with obvious ordering) but will highlight all detectors active against the most upstream LT as the indication of the problem. Also, the algorithm may be configured to deal with direction and remote end considerations and always assume worst case protection states when navigating a problem structure (especially relevant where the protection state may not be known) and hence makes a pessimistic statement about service impact.

Furthermore, this embodiment of a simple algorithm may be configured such that it can merge problems as new indications arrive. Some detectors may be relevant for several problems. It may keep a problem history recording problem lifecycle including problem merge etc. The algorithm may deal with both unidirectional and bidirectional problem cases and be such that it may deal with the merging of two unidirectional problems into one bidirectional problem. Also, this first algorithm framework may be configured to keep a first derived occurrence time but not other less relevant time details. It may indicate whether the problem appears to currently be active but may not keep activity history for the problem. Furthermore, it can allow a user removal of problems that have already been dealt with, where the most upstream indication is clear. It may have an option to archive problems that have been dealt with. It will construct previously hidden problems once the larger masking problem has gone. It may not need to deal with ownership, problem hand-offs, etc.

FIGS. 4A-4G are diagrams illustrating the effect of a failure within a fragment of a network, showing a pictorial representation of a data model in the server 10 or NMS. As shown, this data model may also be used for tracking multiple layers. As described herein, the data model (which may also be referred to as an object model, information model, etc.) includes computer data in a specified structure. In the diagrams, the green and purple rectangular structures represent TPEs and the yellow structures represent FREs. Within the TPEs there are dashed rectangles surrounding triangles, trapezoids, ellipses etc. These dashed rectangles represent processing of a single protocol layer and, as noted earlier are LTs. The computer data is, for example, used to maintain and manage configurations of optical channels and to program and configure the physical hardware associated with the optical network. For optical networks, the physical hardware can include, for example, Wavelength Selective Switches (WSSs), ROADMs, tunable filters, multiplexers/demultiplexers, optical modems, etc. The computer data is further used by control/management systems (e.g., controller on a NE, a control plane, SDN controller, Network Management System (NMS), Element Management System (EMS), etc.) for performing various OAM&P (Operations, Administration, Maintenance & Provisioning) functions, such as the optical control and modem configuration. An aspect of the data model is to enable management interoperability between disparate vendors and allow each layer to be tracked across the network. By introducing the concept of technology-independent management, it is possible to perform management of diverse equipment using common communication interfaces. In this manner, a high-level view over a set of NEs can be achieved. An example of a data model is described in ITU-T Recommendation G.7711 "Generic protocol-neutral management Information Model for Transport Resources" (03/18), the contents of which are incorporated by reference herein.

Figure 4A:
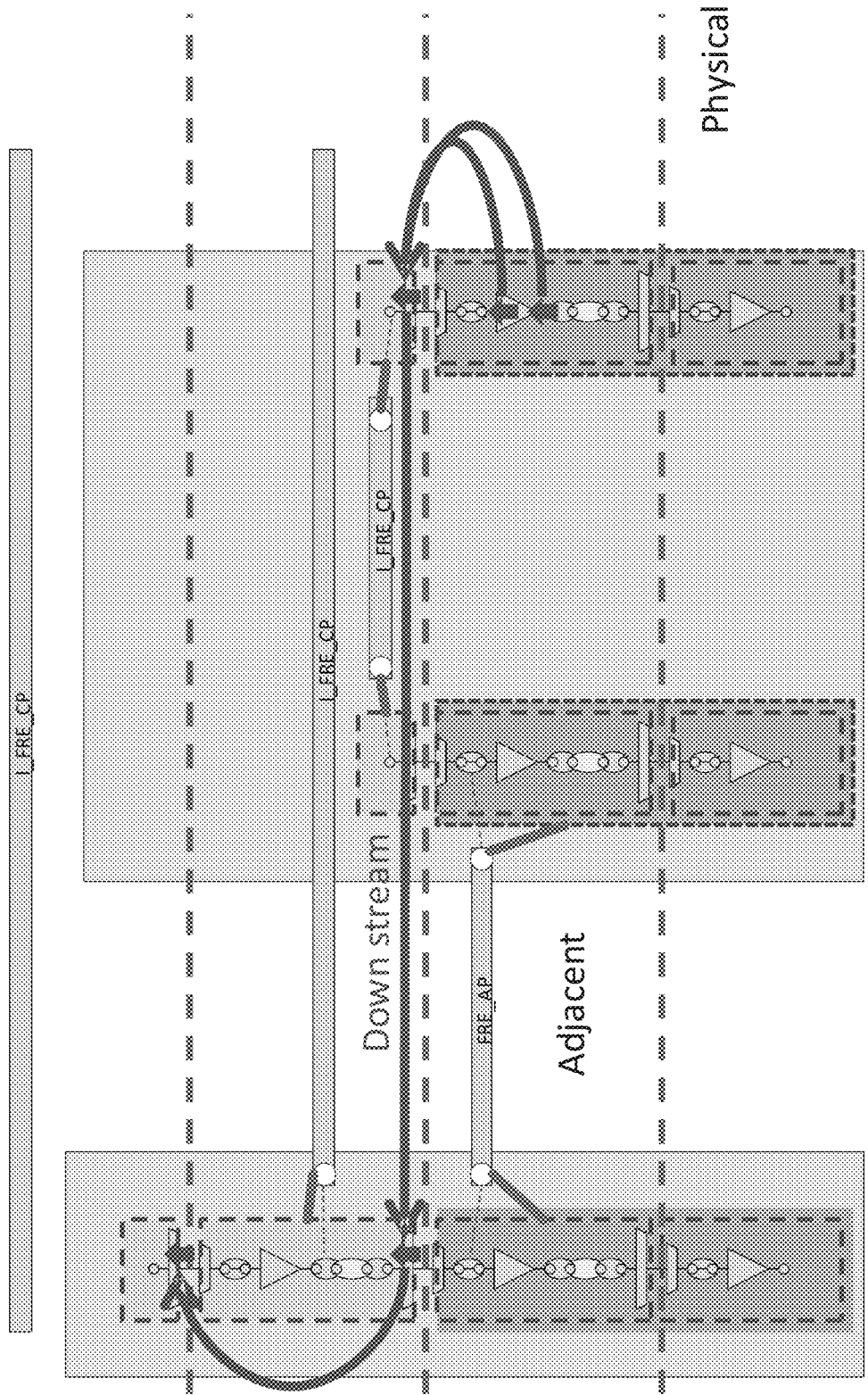
FIGS. 4A-4G are diagrams illustrating the effect of a failure within a fragment of a network, according to various embodiments.
Figure 4B:
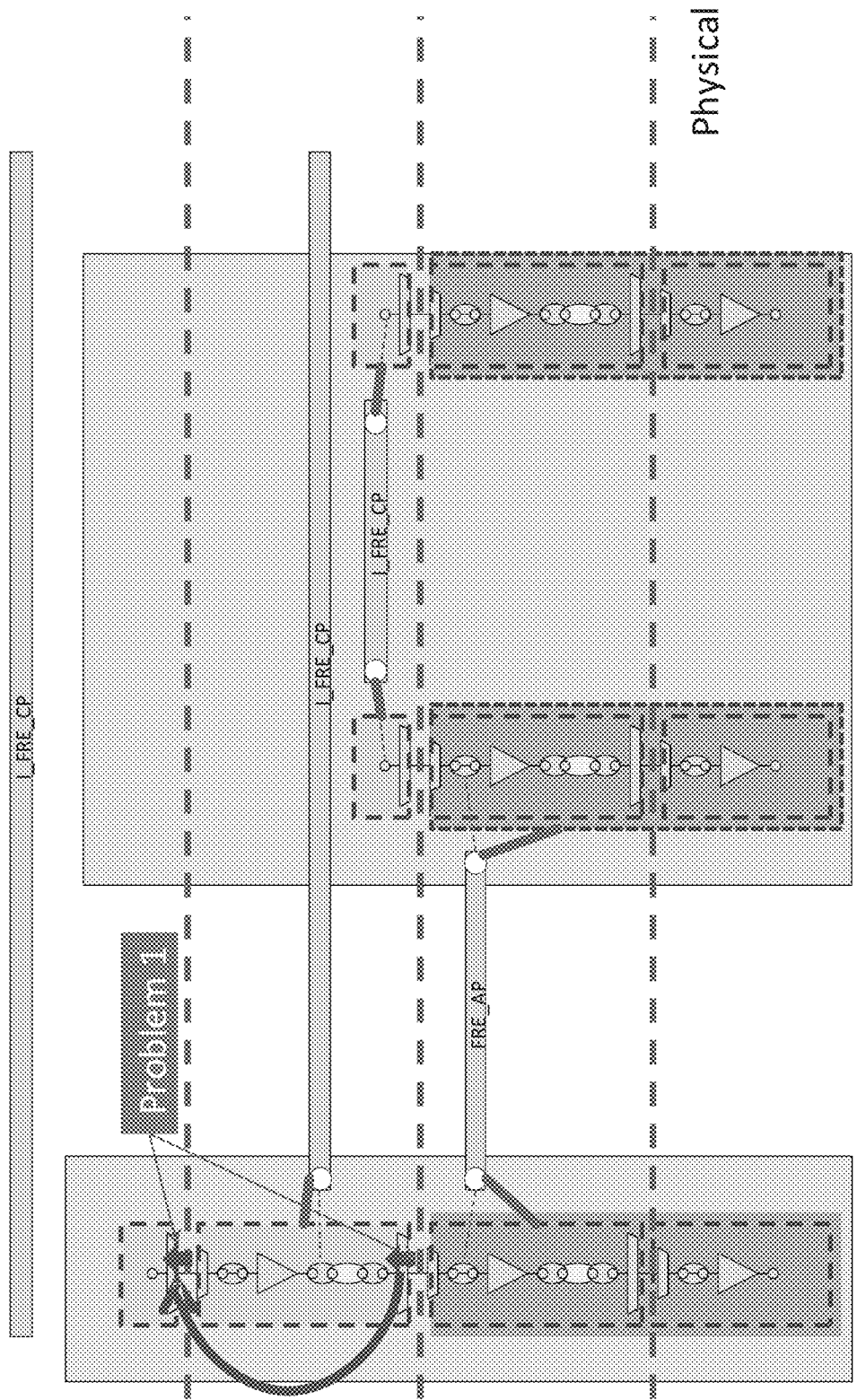
Figure 4C:
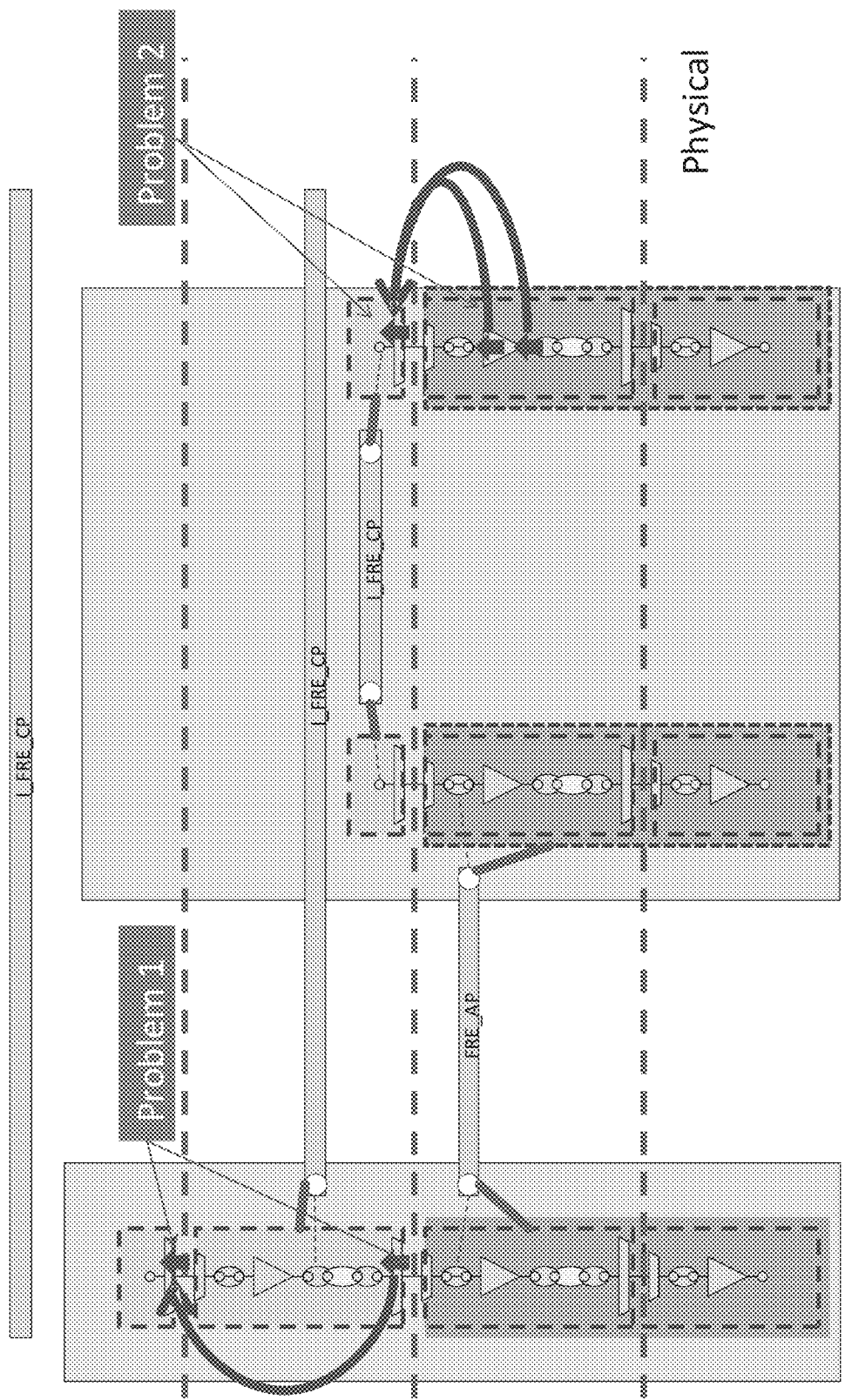
Figure 4D:
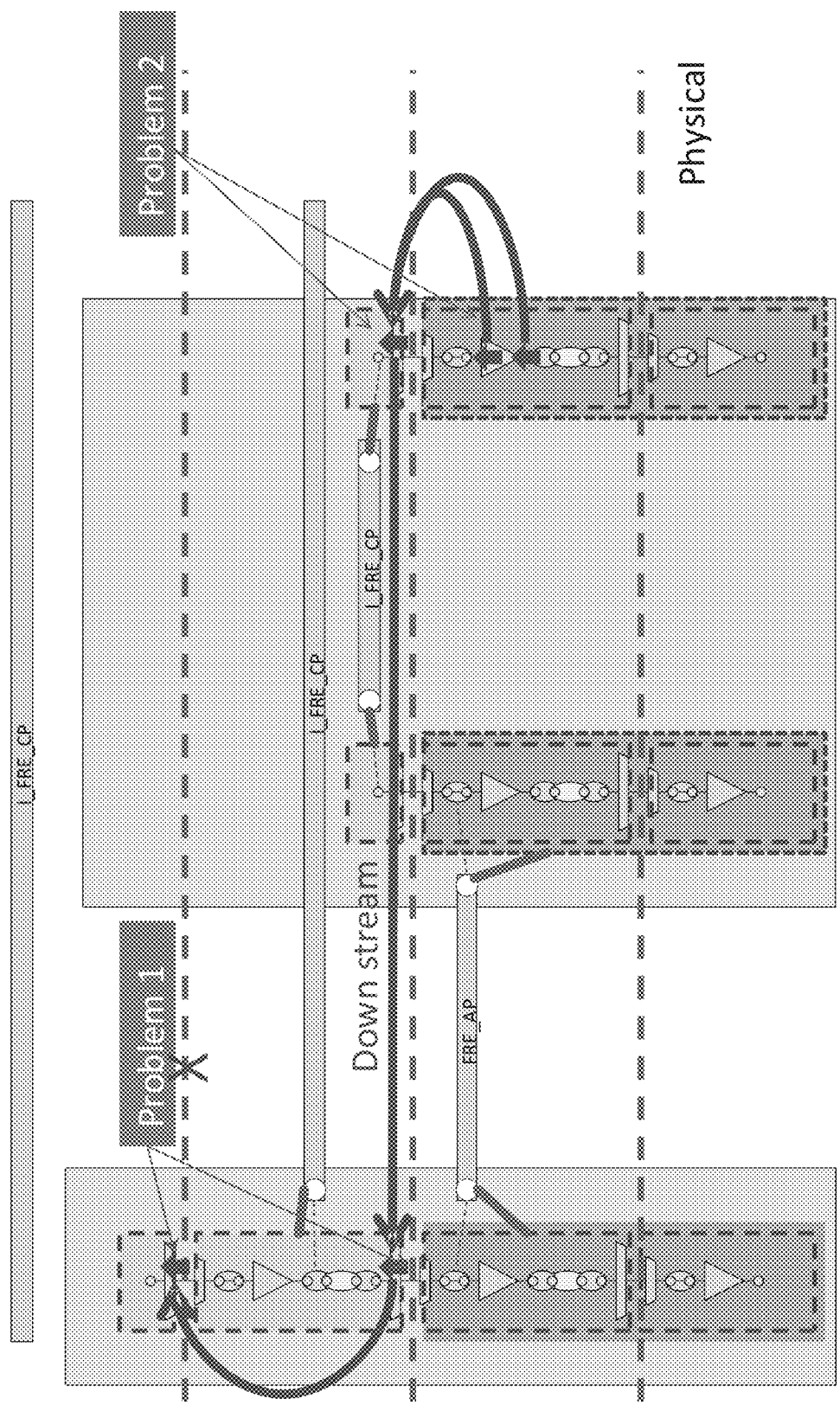
Figure 4E:
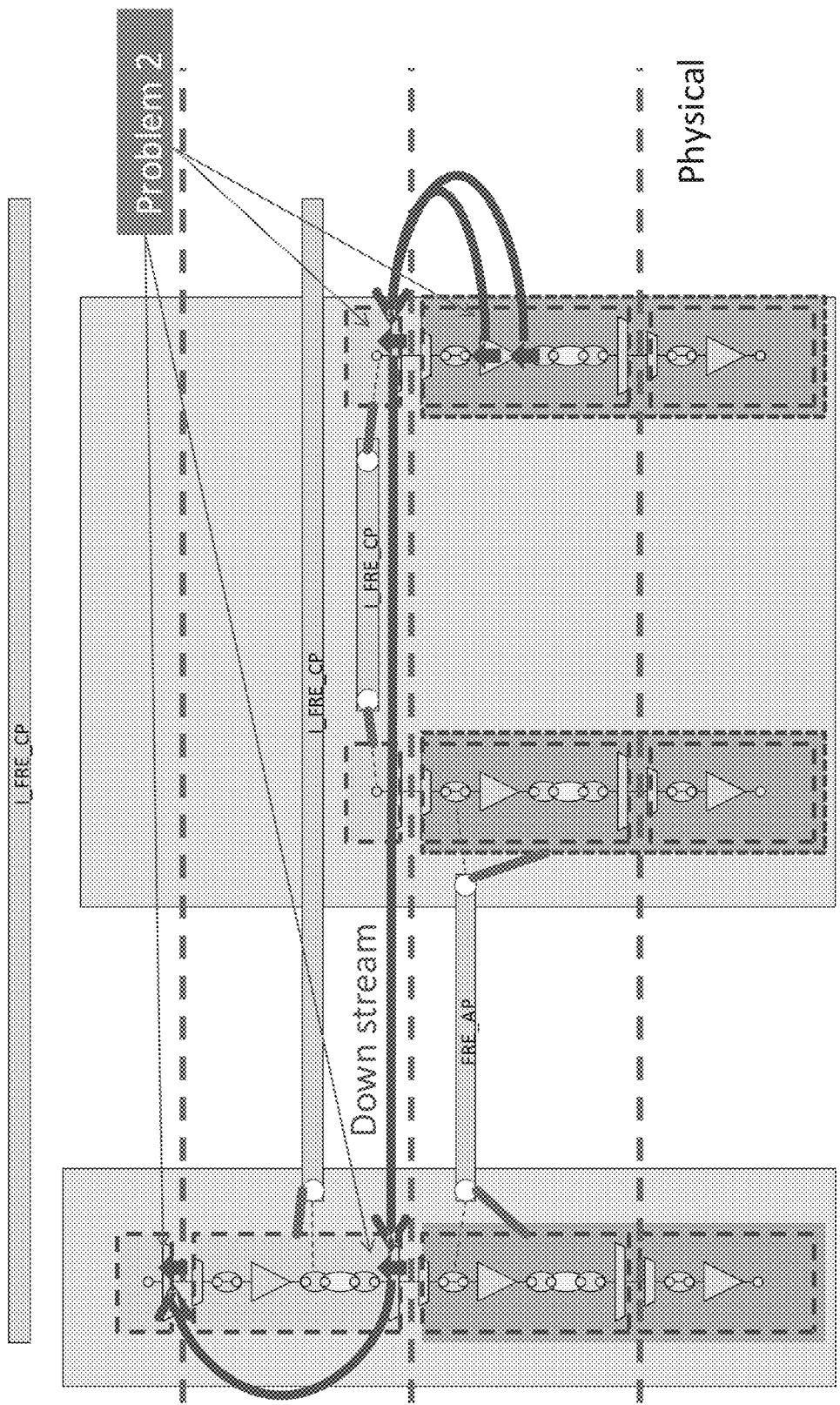

The bottom layer is photonic layer (i.e., Layer 0). The next layer is OTN or Time Domain Multiplexing (TDM) (i.e., Layer 1), then an Ethernet layer (i.e., Layer 2), and on top is an IP layer (i.e., Layer 3). As shown, there are multiple functional parts (within the TPEs) of a terminal device/node (brown rectangle) on the layers on the left side of FIGS. 4A-4G and likewise multiple functional parts of two ports (often referred to as degrees) of a device/node to right side of the figures. Other various pieces may be included according to other embodiments to represent any type of model. Also, a data model of the underlying hardware supporting various functional parts may exist. FIGS. 4A-4G include sensors or detectors on each layer to sense the condition of the various functional parts. Any conditions/issues can be correlated as described in the present disclosure. FIG. 4A shows the detection of localized issues in a signal flow in the node on the right, the propagation of the impacted signal flow and the detection that those issues can cause on the node on the left. Alarms and other indications may arrive from different devices asynchronously and out of order. Depending upon network scale, there may be thousands of alarms per minute for L0, L1, L2, L3. The following is an example of problems that may exist and how they various layers.

The first cut simple algorithm mentioned above may have a basic flow of operations. A first action may include a "First Alarm" including: (1) Alarm indication received, (2) TPE, LT and direction resolved, (3) LT examined to see if it has problem pointer for direction (assume no), (4) Problem created ("problem 1") and alarm indication added as "most upstream" with time of occurrence, and (5) Each downstream LT examined for existing problem (assume none) and if none then problem pointer added, where all relevant FREs added to problem and "Service" FREs identified. The problem may be "latched" such that the problem remains present with the identified alarms even if all the alarms clear so that the operator can be aware of the problem, its impact etc. Further actions will be taken as in the following paragraphs, but not necessarily in the order stated.

A second action may include a "Downstream alarm" including: (1) Alarm indication received, (2) TPE, LT and direction resolved, and (3) LT examined to see if it has problem pointer for direction (assume yes) and if so then alarm added to problem (problem 1).

A third action may include "Upstream alarm" including: (1) Alarm indication received, (2) TPE, LT and direction resolved, (3) LT examined to see if it has problem pointer for direction (assume no), (4) Problem created ("problem 2") and alarm indication added as "most upstream" with time of occurrence, and (5) Each downstream LT examined for existing problem, where none, the problem pointers are added, all relevant FREs added to problem and "Service" FREs identified, and where there is a problem found associated with an LT (problem 1) the detector in LT is checked to see if it is the most upstream for its existing problem (problem 1) and if so the new problem (problem 2) subsumes the existing problem (problem 1) leaving only one problem (problem 2), as in FIG. 4E, with the earliest time of occurrence of the two problems (as well as first occurrence for each alarm). In a real-world example several existing downstream alarms each with a separate problem associated may be subsumed into a single new problem as a result of the upstream alarm. To reduce churn to the operator where one or more of the apparently separate problems had been allocated to separate operators, one of the operators may be automatically handed the new problem and the other operators freed from dealing with the problem. This allocation may depend upon workload, skill set, progress made resolving the previous problem etc. and these considerations may be evaluated in terms of policy etc.

Figure 4F:
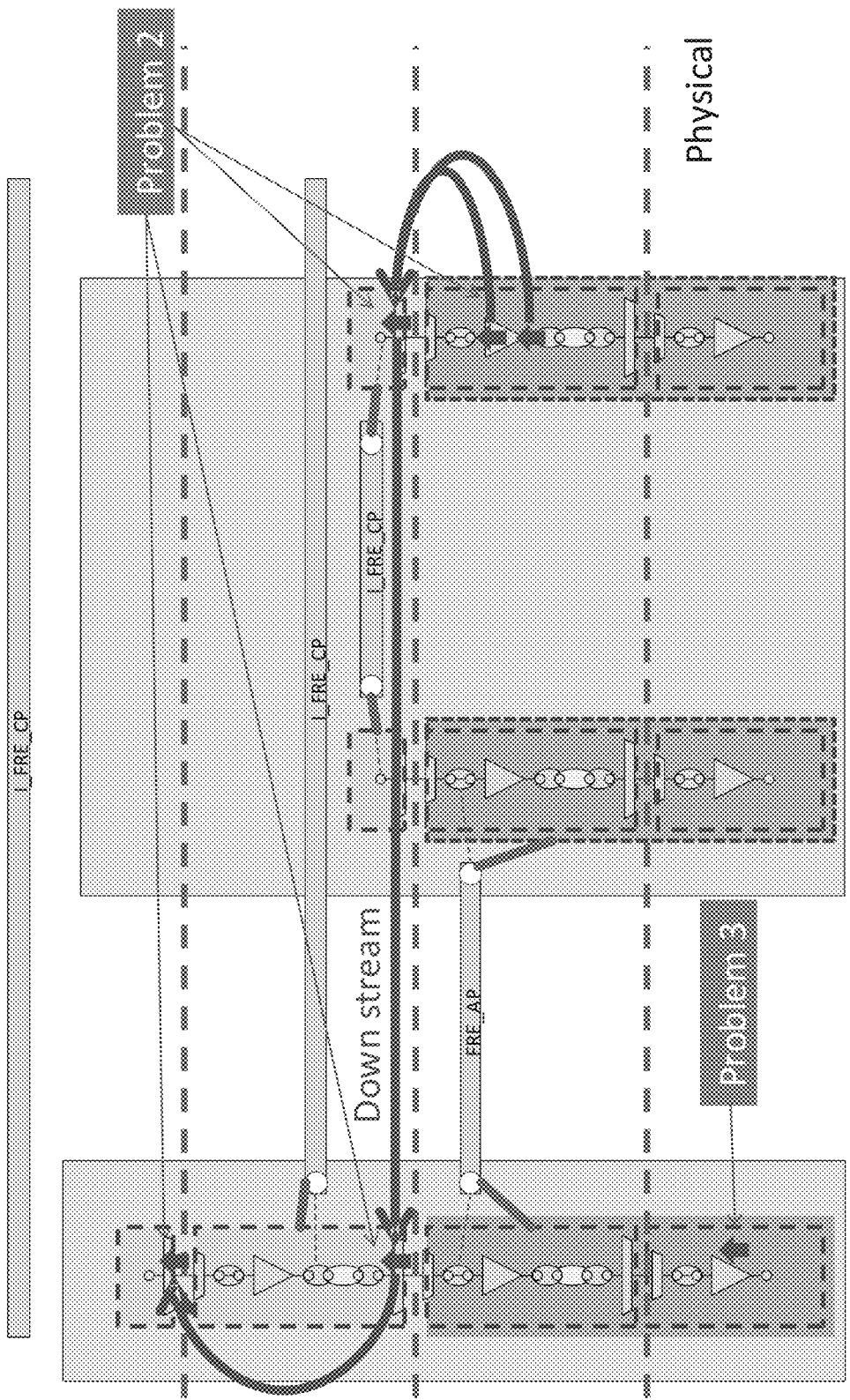
Figure 4G:
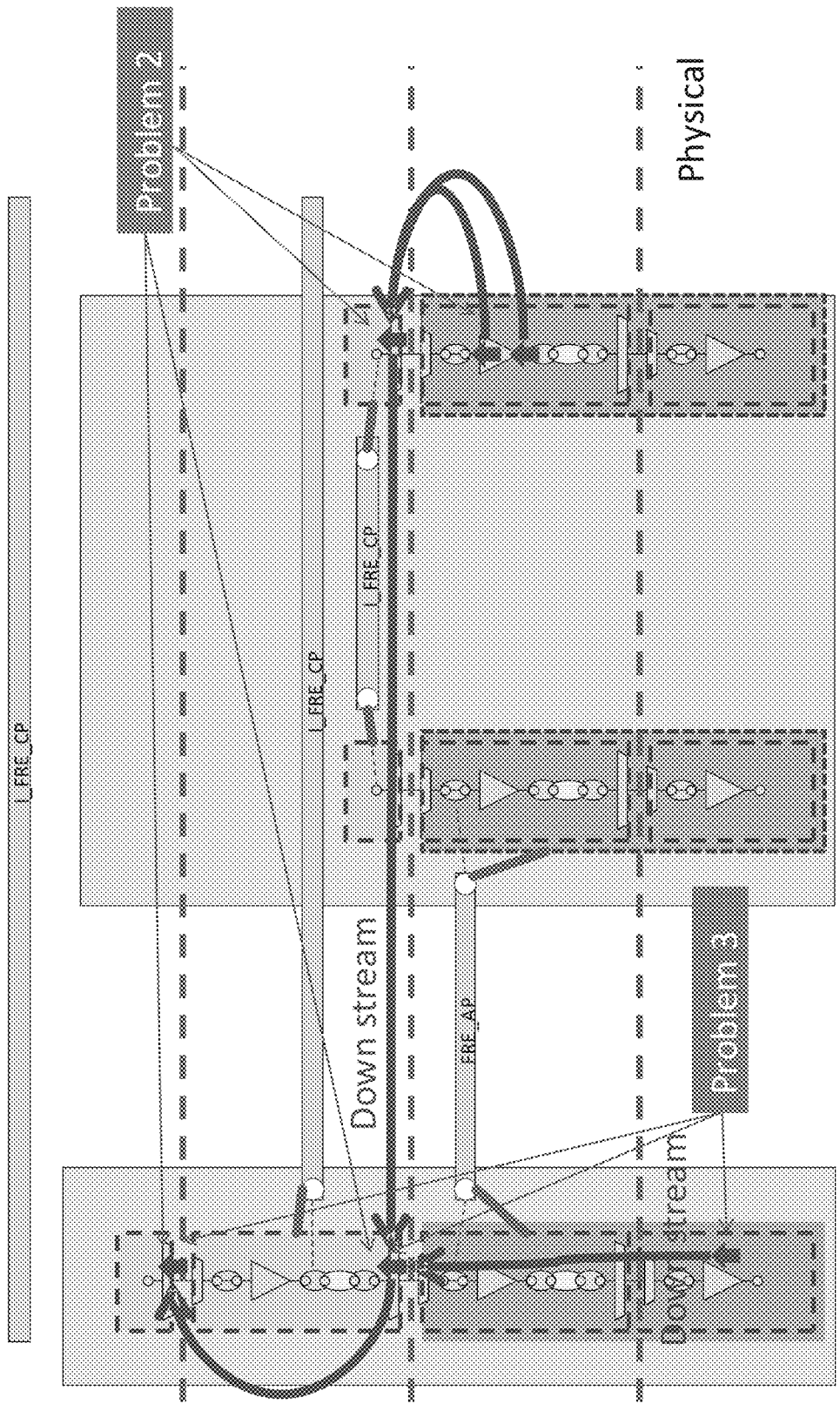

A fourth action may include detecting when "overlapping problem occurs," which may include (1) Alarm indication received, (2) TPE, LT and direction resolved, (3) LT examined to see if it has problem pointer for direction (assume no), (4) Problem created ("problem 3"), as in FIG. 4F, and alarm indication added as "most upstream" with time of occurrence, and (5) Each downstream LT examined for existing problem, where none then problem pointer added. All (relevant) FREs added to problem and "Service" FREs identified, and where there is problem found associated with an LT (problem 2) the detector in LT is checked to see if it is the most upstream and if not then a problem overlap is recognized (where two clearly separate impacts have the same effect) and the new problem (problem 3) simply continues to walk downstream adding points. In this case it does not subsume the existing problem (problem 2) and hence some LTs may have more than one problem pointer.

A fifth action of this algorithm for detection in the sections of FIGS. 4A-4G includes when a "Downstream alarm clears," which includes (1) Clear indication received, (2) TPE, LT and direction resolved, and (3) LT examined to see if it has problem pointer for direction (assume yes) and if so then the alarm is updated in problem (problem 2 and potentially 3) as currently clear.

A sixth action is performed when the "Most upstream alarm (problem 2) clears," which includes (1) Clear indication received, (2) TPE, LT and direction resolved, (3) LT examined to see if it has problem pointer for direction (assume yes) and if so then alarm update in problem (problem 2) as currently clear, and (4) as the alarm is the most upstream in the problem, the problem state is also changed to currently clear, but the problem is still latched.

A seventh action is performed when a "Final alarm in a problem clears," which includes (1) Clear indication received, (2) TPE, LT and direction resolved, (3) LT examined to see if it has problem pointer for direction (assume yes) and if so then alarm update in problem (problem 2) as currently clear, (4) as problem indicates currently clear the problem is examined to identify if any alarms are active. There are none. (5) The problem is offered to the operator as potentially resolved (there may be various delays etc. associated with the final clear indication), and (6) The operator chooses to remove the problem.

An eight action is performed when "Operator decides to split a problem," which includes (1) The problem (problem 2) indicates currently clear but there are still uncleared alarms in the problem, (2) The operator decides to force the problem to clear, (3) The most upstream active alarm not in another problem is used to form a new problem (there may be several problems formed as there are now several independent alarm threads). It may be the case that there is no need to form any new problems as all alarms are already in problem 3.

This simple algorithm may simply "suggest" a location to examine. A more complex algorithm may provide a collection of "probably consequential" indications. This algorithm may group problems using other criteria, such as by FRE (bearer/service). At the suggested location, the simple algorithm may also provide "further cause indicators" that may not be on the traffic path, but may be at the location or its remote peer in the layer of concern. Also, the collection of impacted services should indicate that there is "some degree of impact on the services as a result of the located problem."

Figure 5:
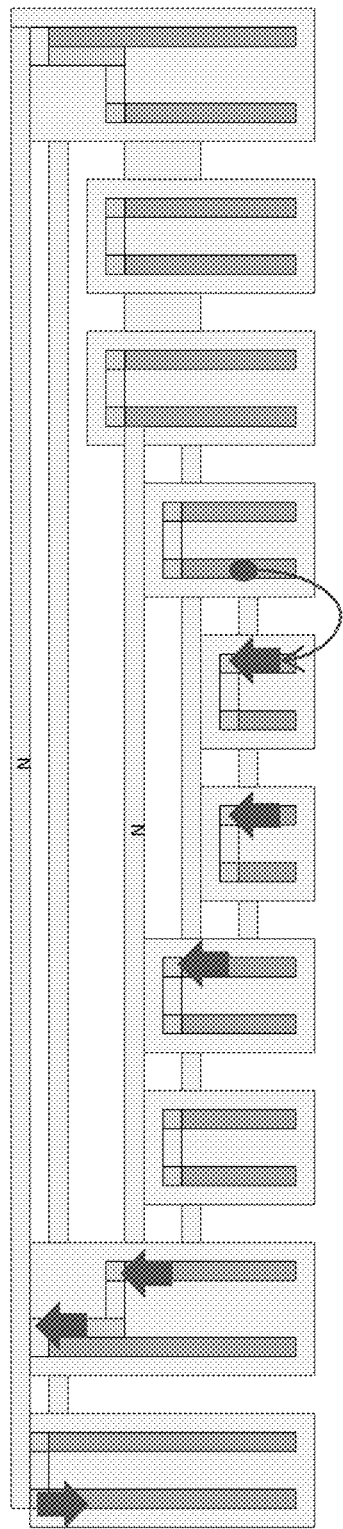
FIG. 5 is a diagram illustrating an example of an initial network issue affecting other proximate equipment in the network, according to various embodiments.
Figure 7:
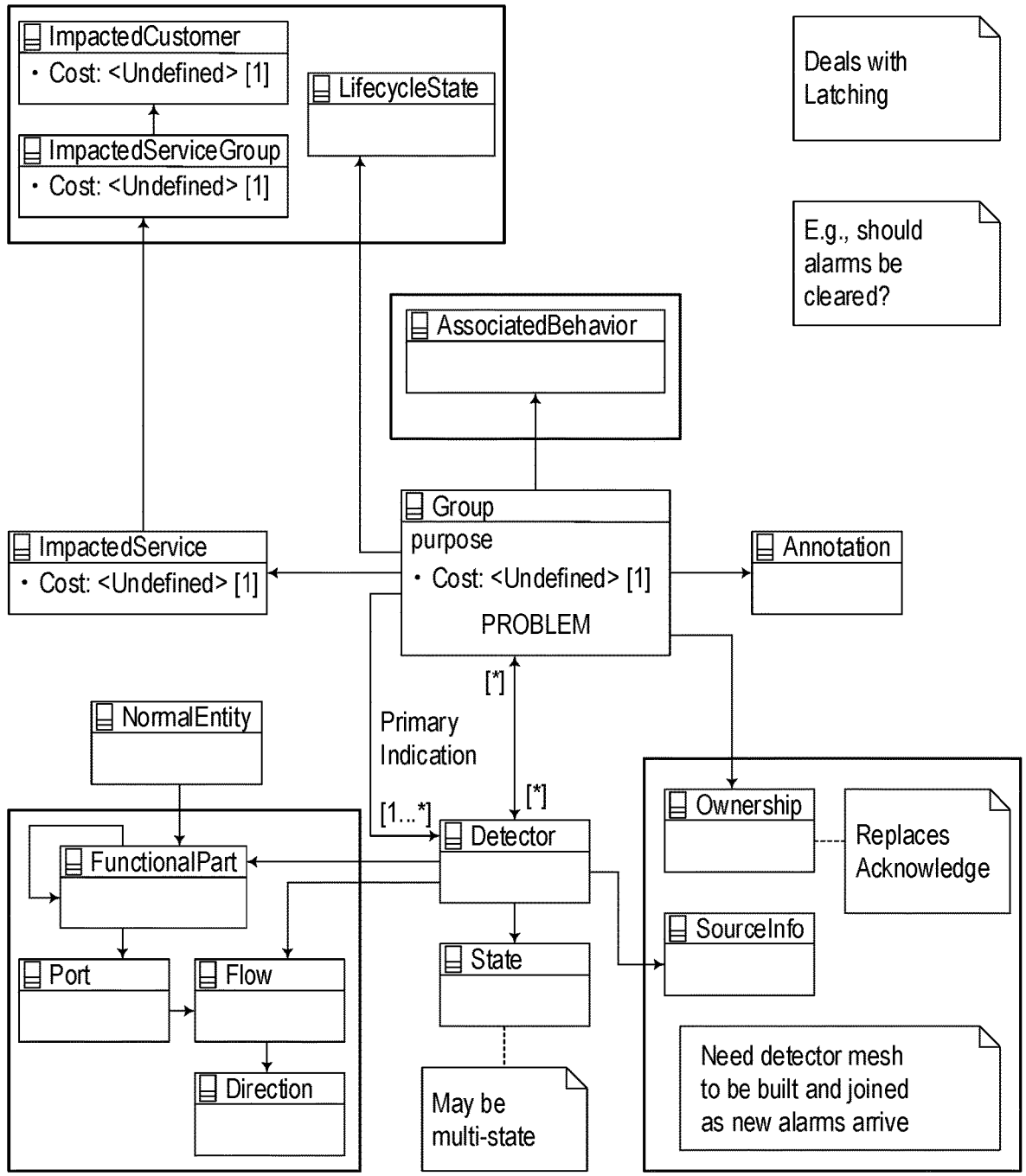
FIG. 7 is a flow diagram illustrating software functions for monitoring, analyzing, and displaying network events, according to various embodiments.
Figure 8:
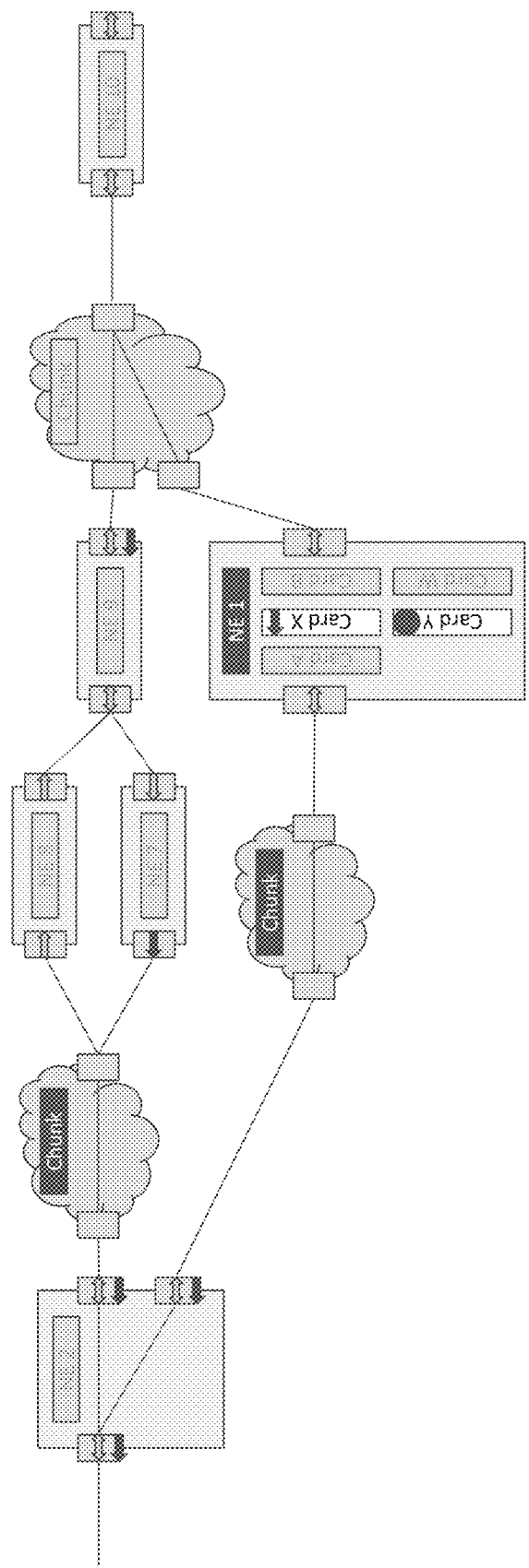
FIG. 8 is a diagram illustrating a process for correlating the NEs of FIG. 7 when events are detected, according to various embodiments.

FIG. 5 is a compact layer view showing active detectors and shows how processing of issues can be associated in a network fragment along with active detectors indicating failure. FIG. 6 is a diagram illustrating the network of FIG. 3 and active detectors for detecting a failure. FIG. 7 is an information model sketch fragment showing the relationships between Problem, Detector and measured Entity (the example of an LT is shown). FIG. 8 is a diagram illustrating a fragment of network in a view mixing physical and functional aspects.

The following includes deterministic and probabilistic aspects of the present disclosure according to various embodiments and may be focused on what might be considered more systematic aspects for some embodiments and what rules these aspects are based on. Regarding the network and service realization structure, for example, much of the realization of the network and of services is intentional, highly structured and deterministic in nature. Much of the structure is relatively static either directly or indirectly (where a dynamic aspect is bounded). Much of the dynamic aspect can be abstracted to some degree. The degree of abstraction necessary will depend upon the compute power available. The arrangement of capabilities that directly support a service may normally be known, but the arrangement of the capabilities that indirectly support service may often not be readily known (e.g., power system design). Some properties are quantized/digital, and some are continuous/analogue. Analogue aspects, especially, may suffer interference, which can be probabilistic.

A visible deterministic structure of the various embodiments may include equipment, flows, and detected conditions as follows. A Protocol operation may include nesting of protocol layering where there may be deterministic dependencies. For a Protocol analysis and condition detector relationship, there may be a distinct order of detectors (potentially as standard) and the NE design may dictate the order. The orientation of a detector with respect to the direction of signals, can be determined. Regarding the flow across the network, provisioned constrained flow for a particular protocol may be defined by the FRE. Flow options in an FRE and actual flow may be defined by: 1) FRE asymmetry (e.g. Root/Leaf), 2) presence of protection, 3) protection switch state, 4) MAC learning, etc. Also, equipment interconnects may include basic equipment organization in hierarchy of shelf providing a context and specific explicit interconnect/layout. NEs should provide FRU replacement guides once the NE has been located (these could be coordinated by the NMS). Structure not readily visible may include Power, External sync, Physical environment, and Network fragments supported by other vendors.

Regarding the aspect of Intermittency, the embodiments may be characterized such as to account for the many faults that will cause intermittent disruption, i.e., where the detectors indicate fleeting, flapping or occasional issues. Some traditional solutions ignore fleeting issues. However, any detection of unexpected behavior may be an indication of a problem and should not normally be ignored. Some short intermittent disruptions will cause much more significant problems downstream. According to some embodiments, all fault conditions, regardless of how short, may be captured and considered to potentially be problems.

Discussion of the potential value and general purposes of some of the embodiments are provided in the following. The provider may agree to acceptable degradations in service with the user (e.g., operation intention, user expectation in a contract, etc.). A service may focus on apparent/virtual adjacency, which may be realized by constraining flow using FREs in a layered protocol network. The degradations relevant from a provider's perspective may include error, loss, delay variations, etc. Degradations of service can be caused by both expected and unexpected network behavior, such as: 1) Designed behavior (e.g., intentional discard under load); 2) Operations practices such as engineering works (where an NE is inserted in a live link due to a need to grow the network); 3) Incorrect design of service realization; 4) Hardware failures and degradations; 5) Incorrect configurations (which may be simple mistakes or may be misinterpretations of capability). To maintain user expectation, service degradation may need to be maintained within agreed limits by: 1) Restoring the service by changing the details of realization; 2) Correcting the network problem, such as by a) Repair/replacement of failed/degraded hardware, and/or b) Correcting configuration errors. Regarding the acceptable degradations, the provider may also agree to locate the cause of a network problem to enable repair within a particular time after the problem occurred. This agreed time may relate to contracts and/or regulations.

Other purposes may be that the provider intends to maximize use of assets which leads to a need to repair failed redundant hardware. Even after restoration, it is usually necessary to correct the network problem so as to restore overall network capacity etc. The provider will often want to offer information on repair expectation to the user when there is a persistent degradation/failure of service and may want to provide some details of cause of degradations. There may be a need at this point to understand service degradation/failure and which specific network problem is causing the service degradation/failure. Prior to carrying out an engineering works activity, the provider will want to understand the impact of any work so as to take mitigating actions. There may be a need to understand what impact any action on the network would have such that impact mitigation actions can be taken (e.g., switch traffic away).

Regarding services and service realization in the present disclosure, there are various service structures that may be utilized considering the service demarcation (e.g., service access points). These may include point-to-point, symmetric multi-point, asymmetric multi-point (e.g., root-leaf), and dual homed. Every service realization may involve multiple network layer protocols. For some service types, most of the layer protocols may have degenerate networking (i.e., point-to-point) and several layer protocols may be multi-hop. Some service types may be layer protocol asymmetric where the service access at points are not necessarily at the same layer protocol. Some services may be realized using protection at a server layer within the network.

With respect to network fragmentation, a service instance may not usually be supported by only NEs from a single vendor, even when considering a single layer. For most service instance realizations there will be NEs from different vendors. Services will also not usually be supported by a single network operator.

Figure 9:
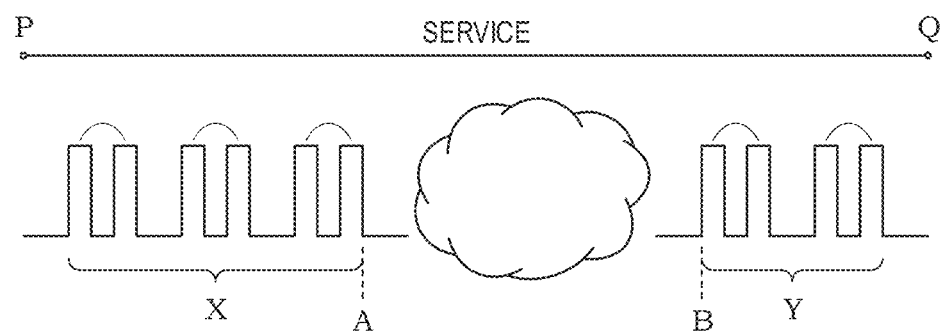
FIG. 9 is a diagram illustrating wavebands transmitted through a network, according to various embodiments.

FIG. 9 illustrates an example of a service provided by two or more operators where, considering one operator, P to A through X and B to Q through Y is represented in detail, but where there is no visibility to that operator of the detail between A and B as the service is carried through one or more other operators' networks. Problems sourced in X or Y can be diagnosed and fixed, whereas a problem between A and B can potentially be detected but cannot be fully resolved. An appropriate embodiment will identify the location of the problem as between A and B and trigger the necessary negotiation between network operators.

The systems described herein may determine a degree of SLA violation for each service for each problem. The impact on a customer perceived value can be estimated by considering the accumulation of SLA violations across all services for that customer (where each service is weighted appropriately considering its importance to the customer). The probability of losing the customer account or losing customer trust and hence future purchases can be estimated based upon the impact on customer value and other soft factors. The allocation of scarce customer facing resource can be balanced aiming to minimize the loss of revenue (through loss of future purchase and loss of accounts). When there is a failure in protection capacity, this may be viewed as the services depending upon that protection being in jeopardy. Considering all customer services in jeopardy, an assessment can be made as to which protection bandwidth should be restored first. To restore protection may require some combination of configuration activities and physical actions. This in conjunction with the consideration of the impact of failed customer services (on customer retention) requiring configuration or physical action can be used to direct scarce maintenance resources.

The following description is an analysis and solution to the problem model as described above. In this example, the system is configured to gather all the relevant indications (from the closest components) to cause flow through the consequential indications into a problem structure. This may include use of knowledge of the layered network structure and navigate "up" the layers from lower layer infrastructure to higher layer service to gather detected conditions. Then, an algorithm may include accounting for protection and other protocol capabilities that may reduce the impact of the problems.

Next, the algorithm may latch intermittent indications collected as part of a problem. The focus will be on problems and detector instances rather than alarm occurrences. A problem latch can be cleared by an operator. Then, the algorithm model may account for network fragments and known chained fragments. The model may identify a detector that appears to be the closest to the problem and propose further steps. For example, the model may indicate what appears to be causes outside the fragment.

The process of focusing on the problems rather than alarms may include the following steps. First, the model may evaluate the problem cause and problem impact. The users may be able to see the problems that are rational groups of detected conditions (e.g., alarms, PMs, etc.) rather than a long list of raw alarms. Also, users may work on problems and not on individual alarms. Problems may be owned and acknowledged, rather than single alarms. The process of the model may include identifying the degree of impact per service and the service group. The model may also highlight a jeopardy conditions (e.g., where service protection has been lost).

Some benefits of this problem analysis and model may include a significant reduction in alarm noise. Also, there may be improved linkage between service impact and repair action. Furthermore, repairs can be directed to focus first on the problems considered to have the highest impact. Also, the processes may have improved assurance workflow.

Figure 10:
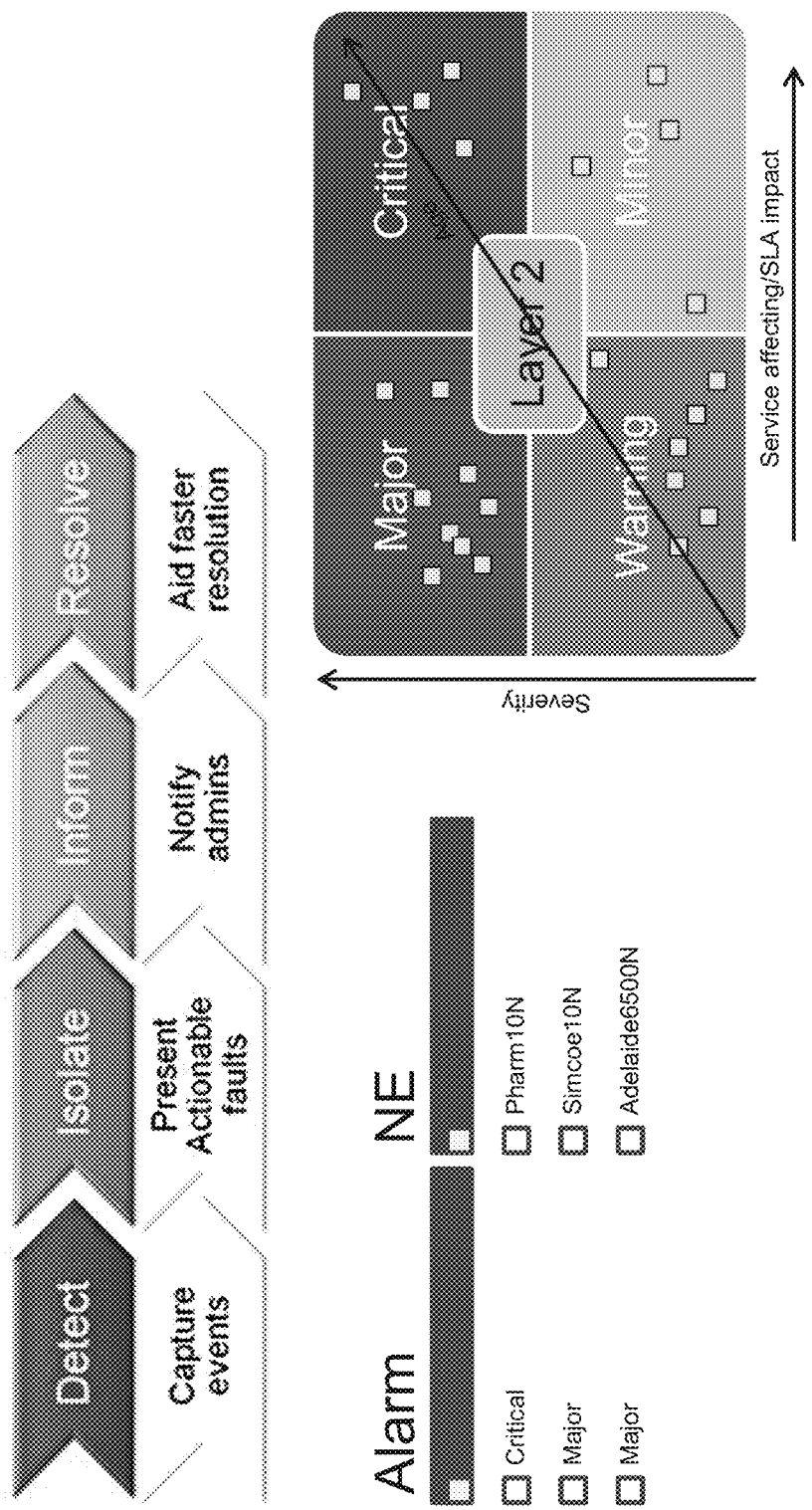
FIG. 10 is a diagram illustrating a general process for detecting and resolving issues in a network, according to various embodiments.

FIG. 10 is a diagram illustrating a general process for detecting and resolving issues in a network. A "detect" process (e.g., by detectors of the NEs 6) may be performed to capture events. Then, an "isolate" process (e.g., by the service event aggregating module 24) may be performed to correlate alarms and present actionable faults. Next, an "inform" process (e.g., by the visualization module 26) may be performed, using GUIs, to notify the administration or network operators of the aggregated alarms. Personnel can then be sent out to service the network to "resolve" the network issues or events. By using the GUIs, described below, to visualize the urgency of various problems, the personnel can be scheduled in a timely manner to aid a faster resolution of the network problems.

Also shown in FIG. 10 are check sheets for various urgency levels or degrees of urgency of the alarms, including, for example, critical, major, minor, etc. The figure also includes a chart showing different types of events graphed with respect to their severity vs the impact or effect on services or SLAs. The chart can be divided into various categories, including, for example, "warning," "minor," "major," and "critical."

The alarms are correlated to define an event. The alarm clusters are grouped and then ranked based on the number of service-affecting incidents that are caused by the event. The services (e.g., cross-layer services) are grouped into one object that can be graphed or visually displayed by the visualization module 26 in order to help the operator focus on the highest priority events (e.g., the ones consuming the most bandwidth, the most sensitive service events, and/or other factors).

According to some embodiments, the system may be configured to identify interesting patterns or statistically significant metrics/data from the correlated service events that would further assist a NOC operator to focus on resolving, with little effort, the biggest events that have the greatest negative impact on services. In one example, Customer A has three services that are troubled and 55% of all service-affecting incidents are less than 10 minutes old. It would be a bonus to be able to suppress the symptomatic alarms that are associated with each correlated service event by implementing the systems and processes described in the present disclosure.

Figure 11A:
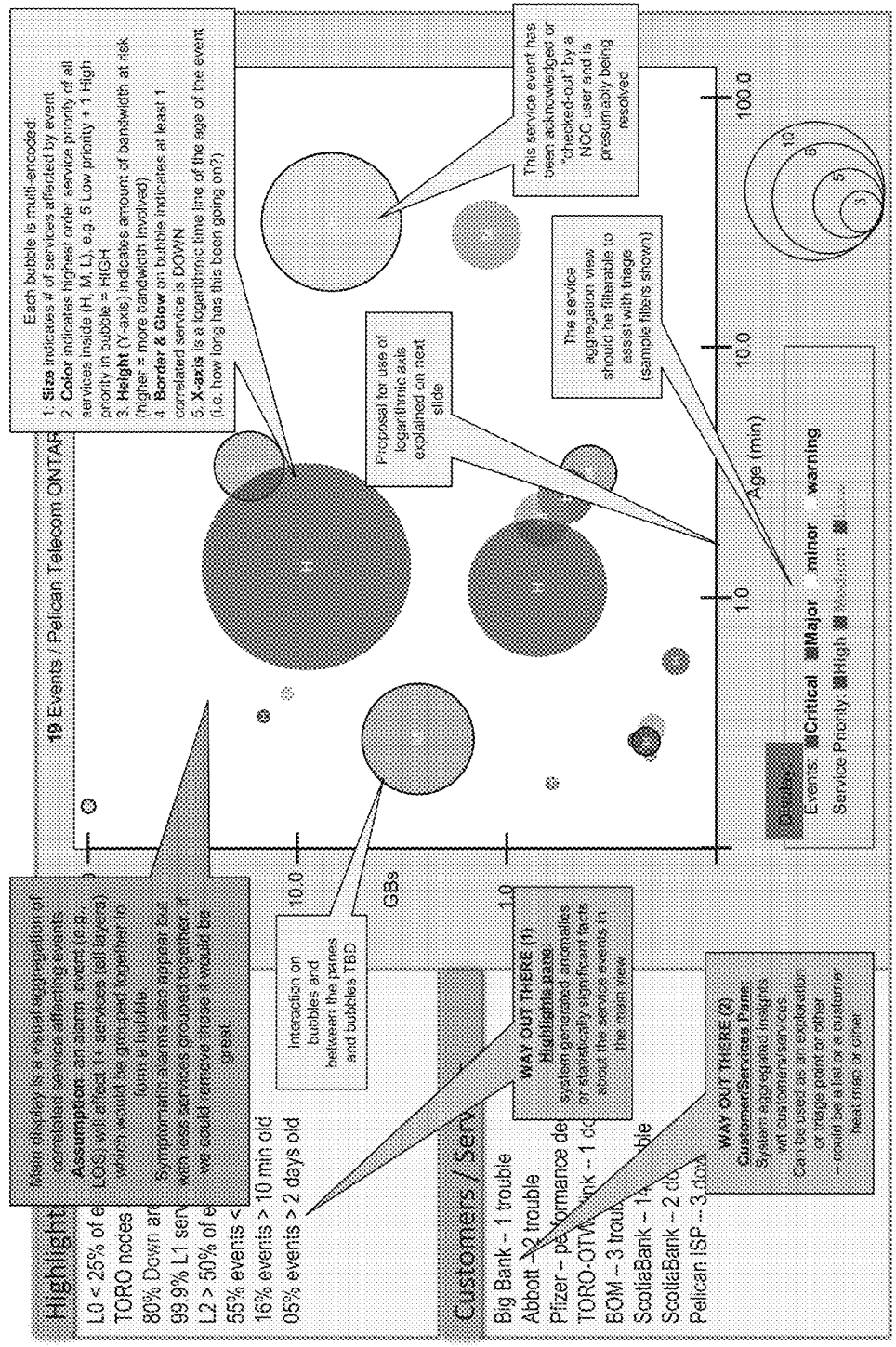
FIGS. 11A-11N are diagrams illustrating an example of an interactive Graphical User Interface (GUI) for displaying network events allowing user interaction, according to various embodiments.
Figure 11B:
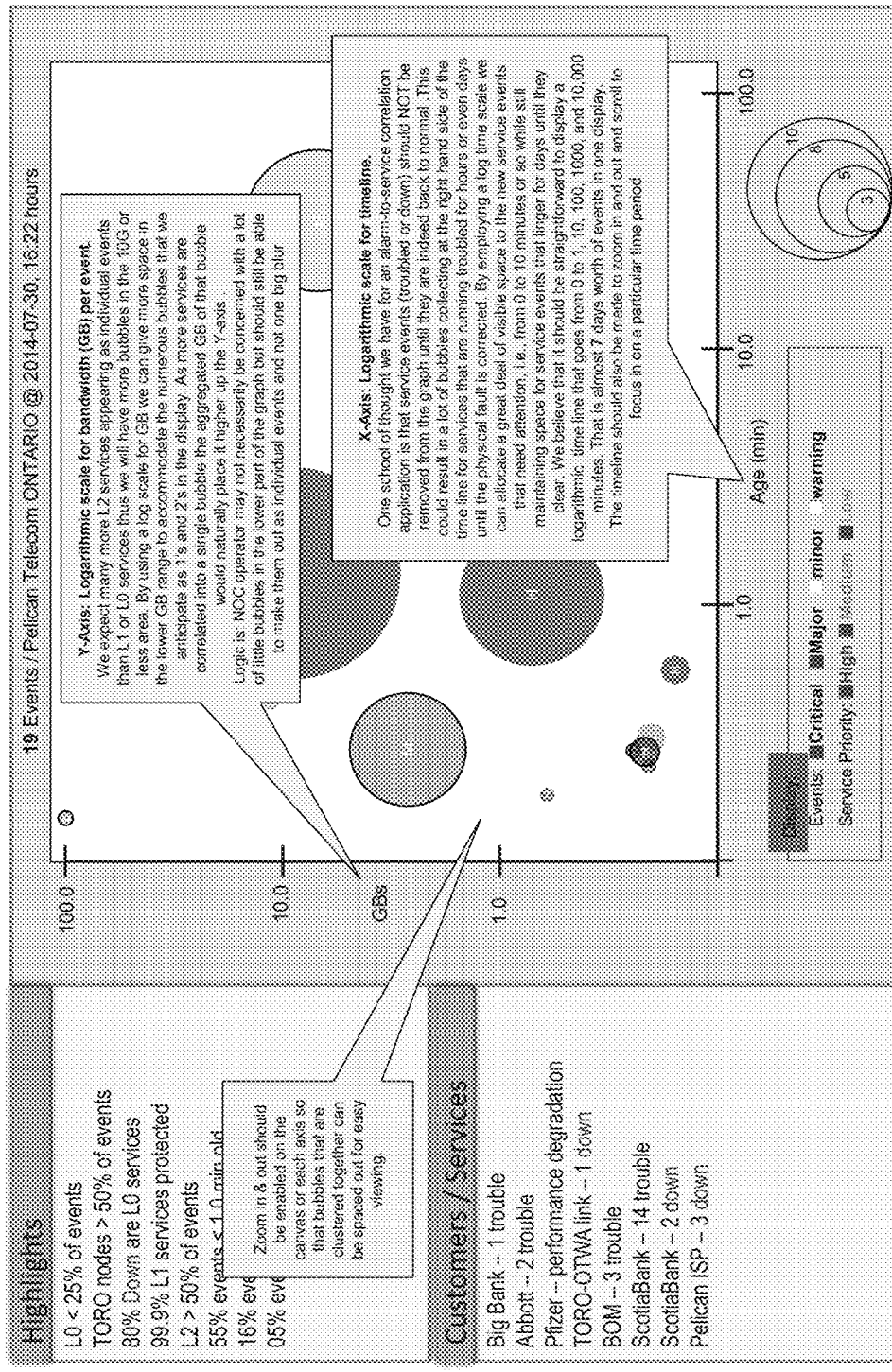
Figure 11C:
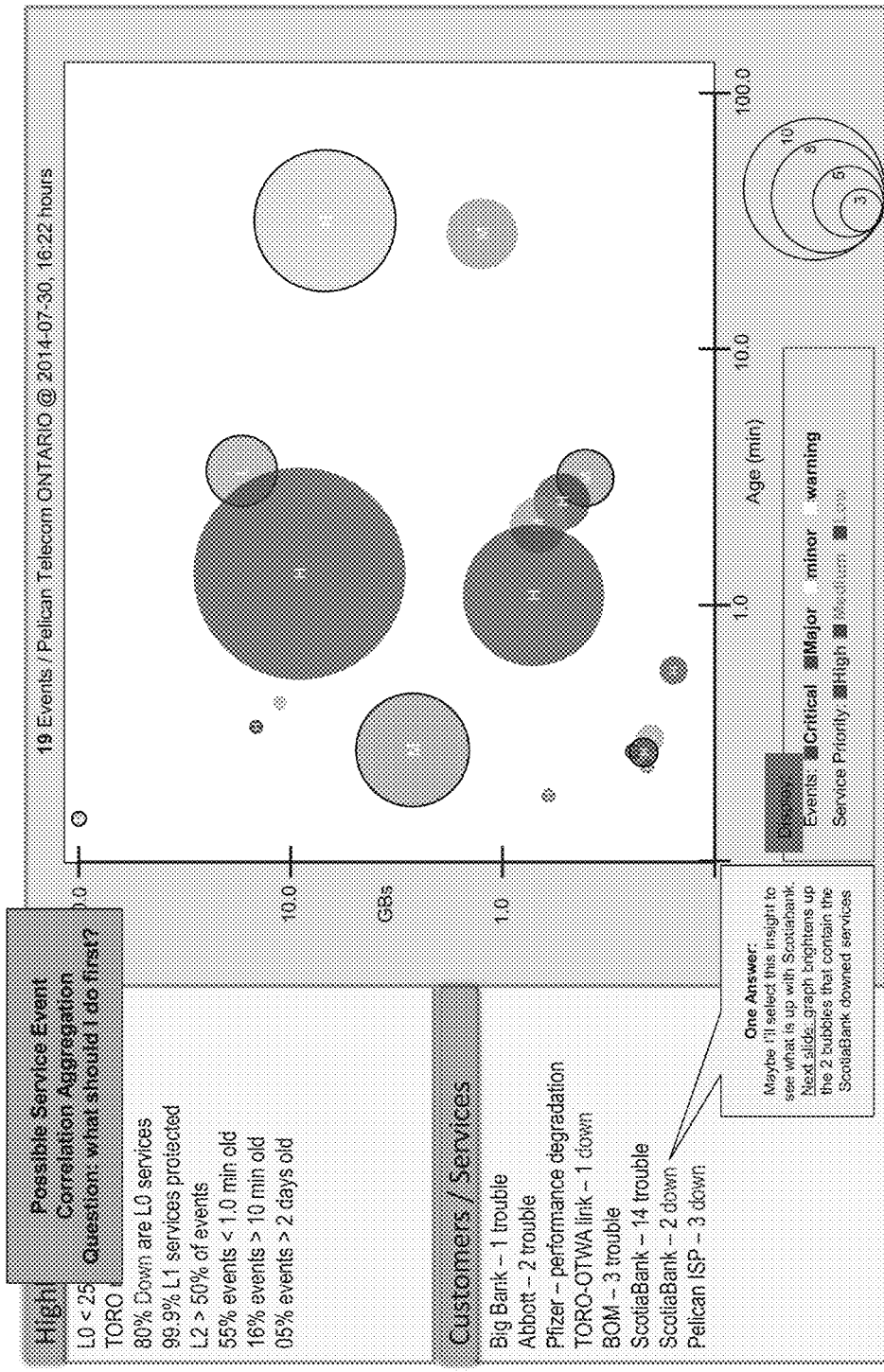
Figure 11D:
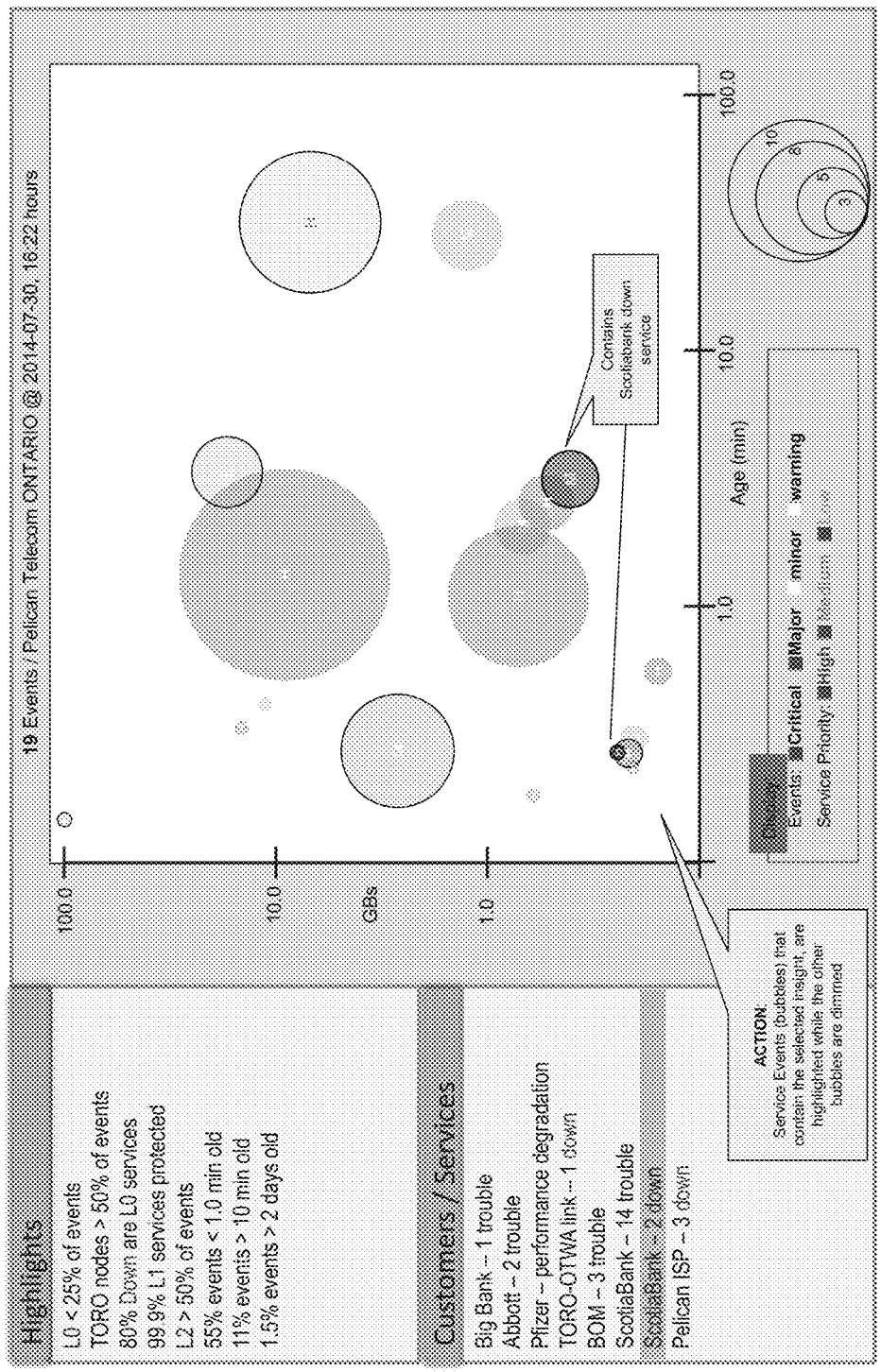
Figure 11E:
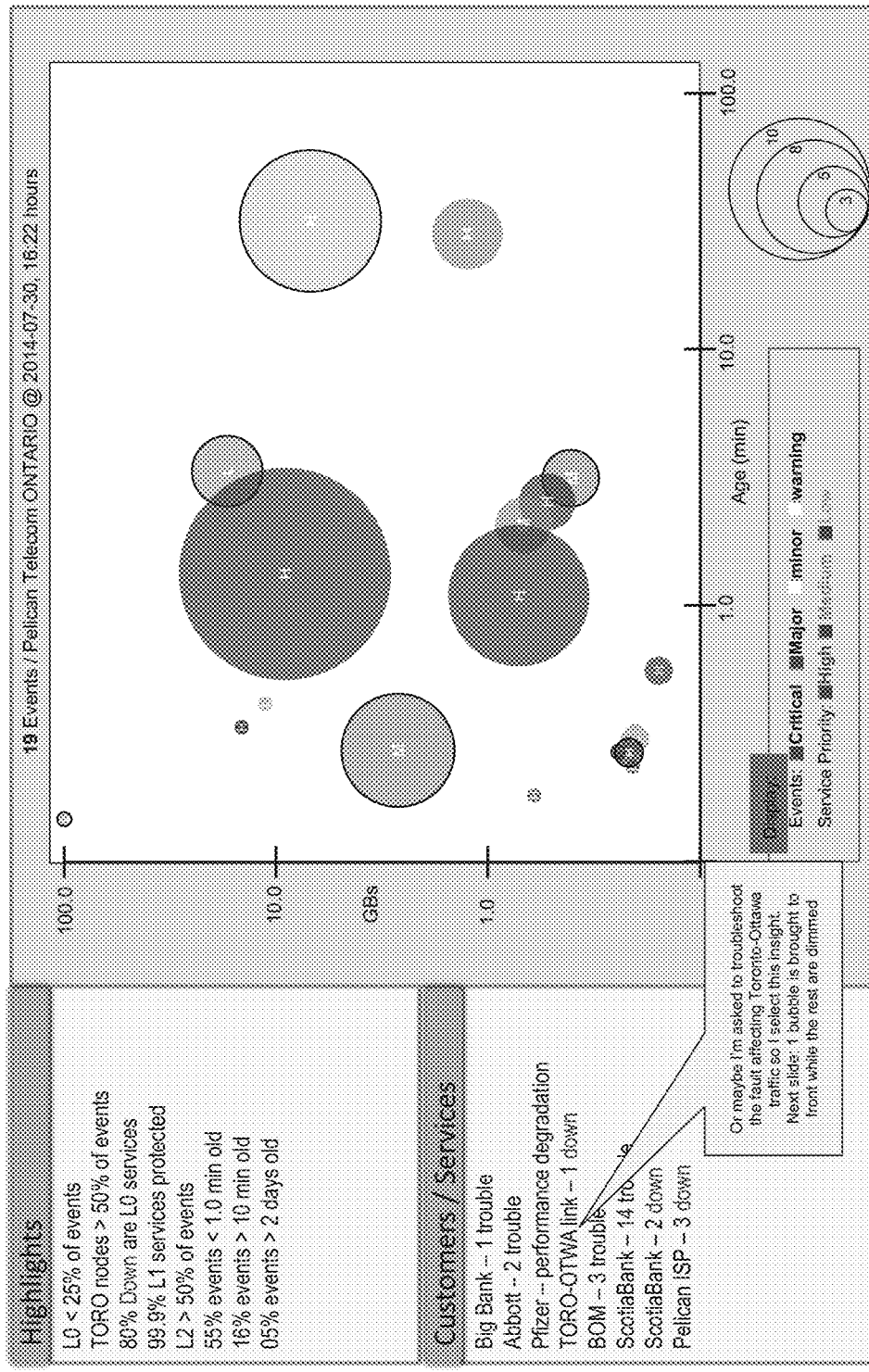
Figure 11F:
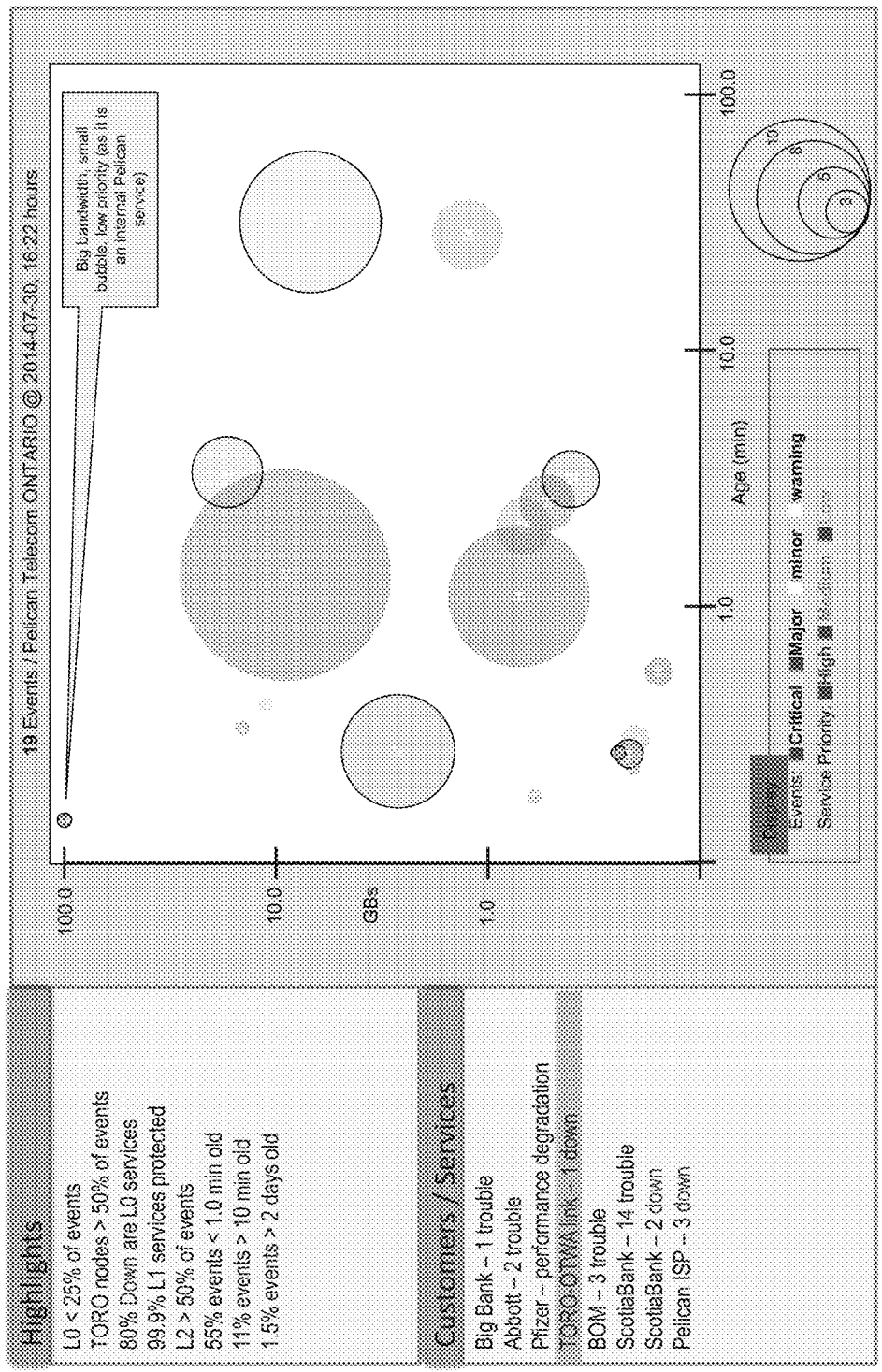
Figure 11G:
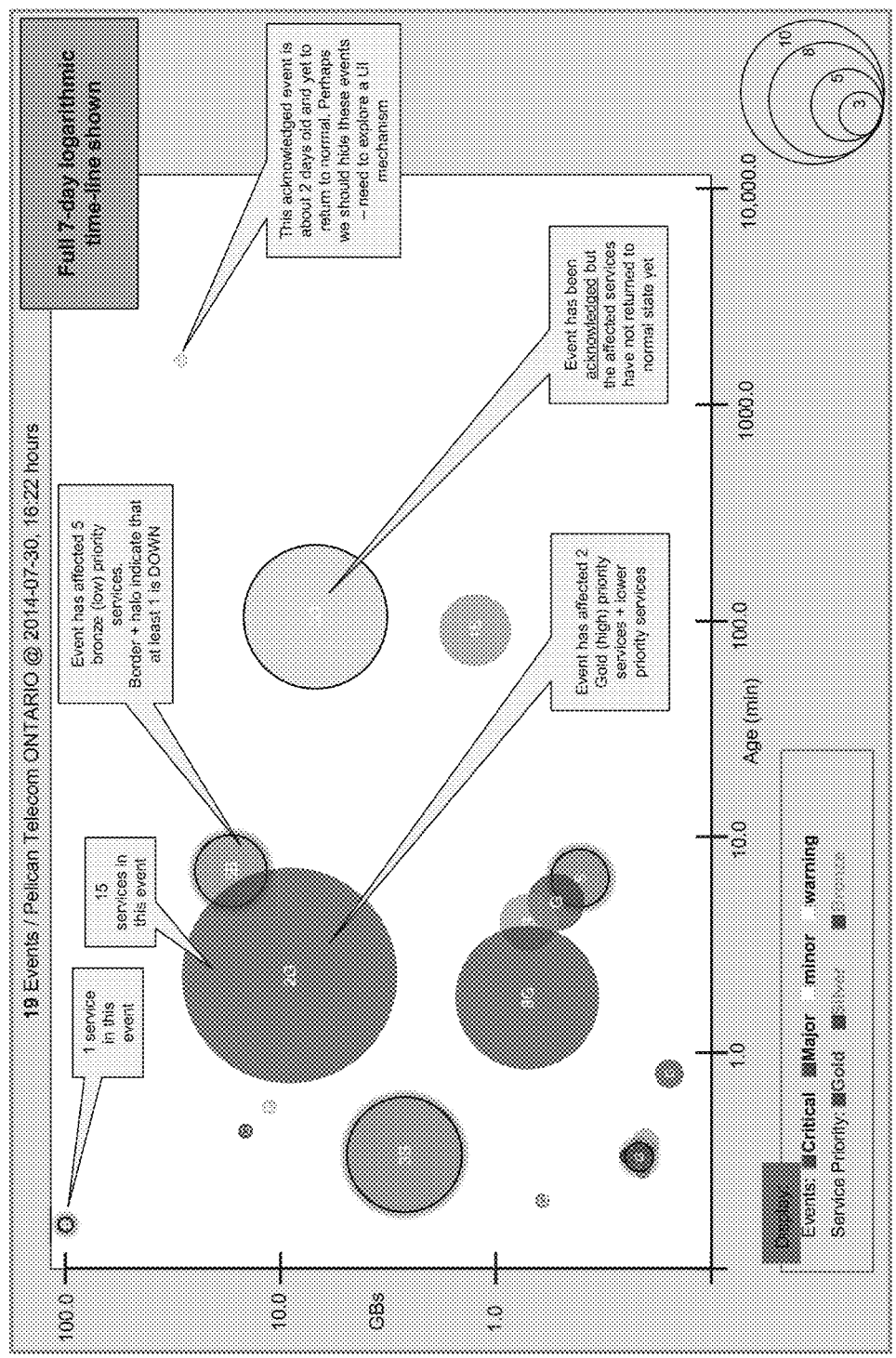
Figure 11H:
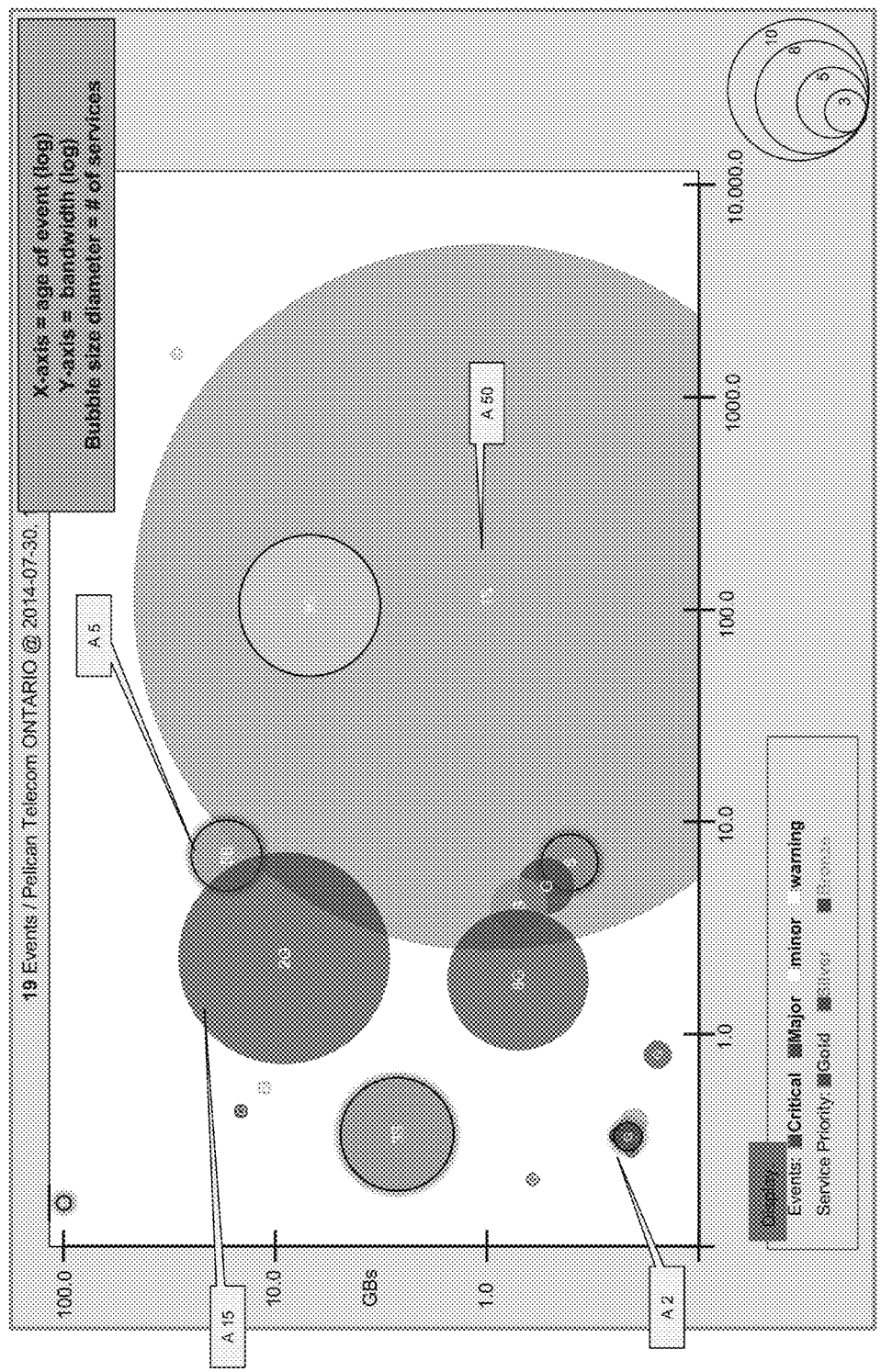
Figure 11I:
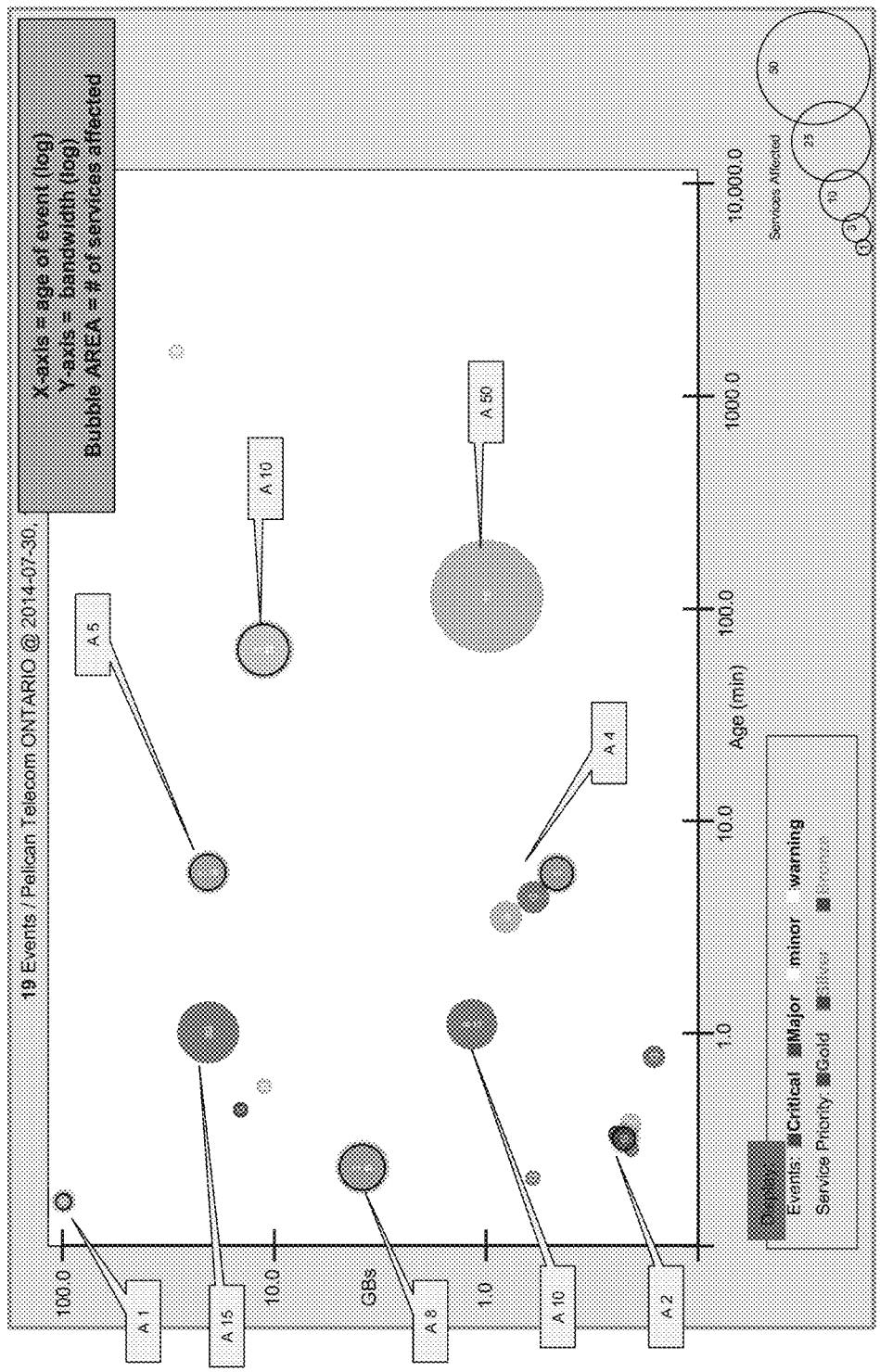
Figure 11J:
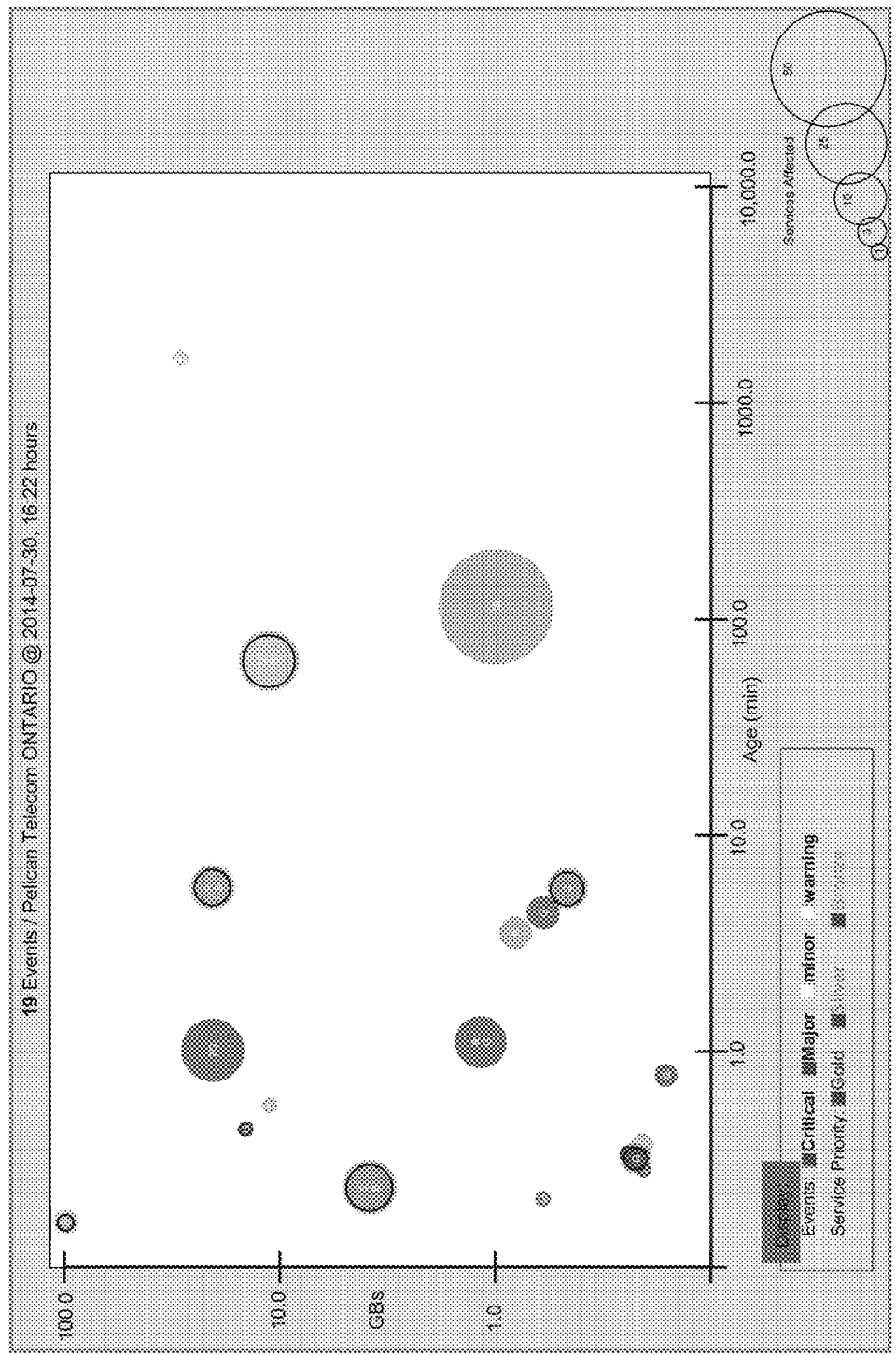
Figure 11K:
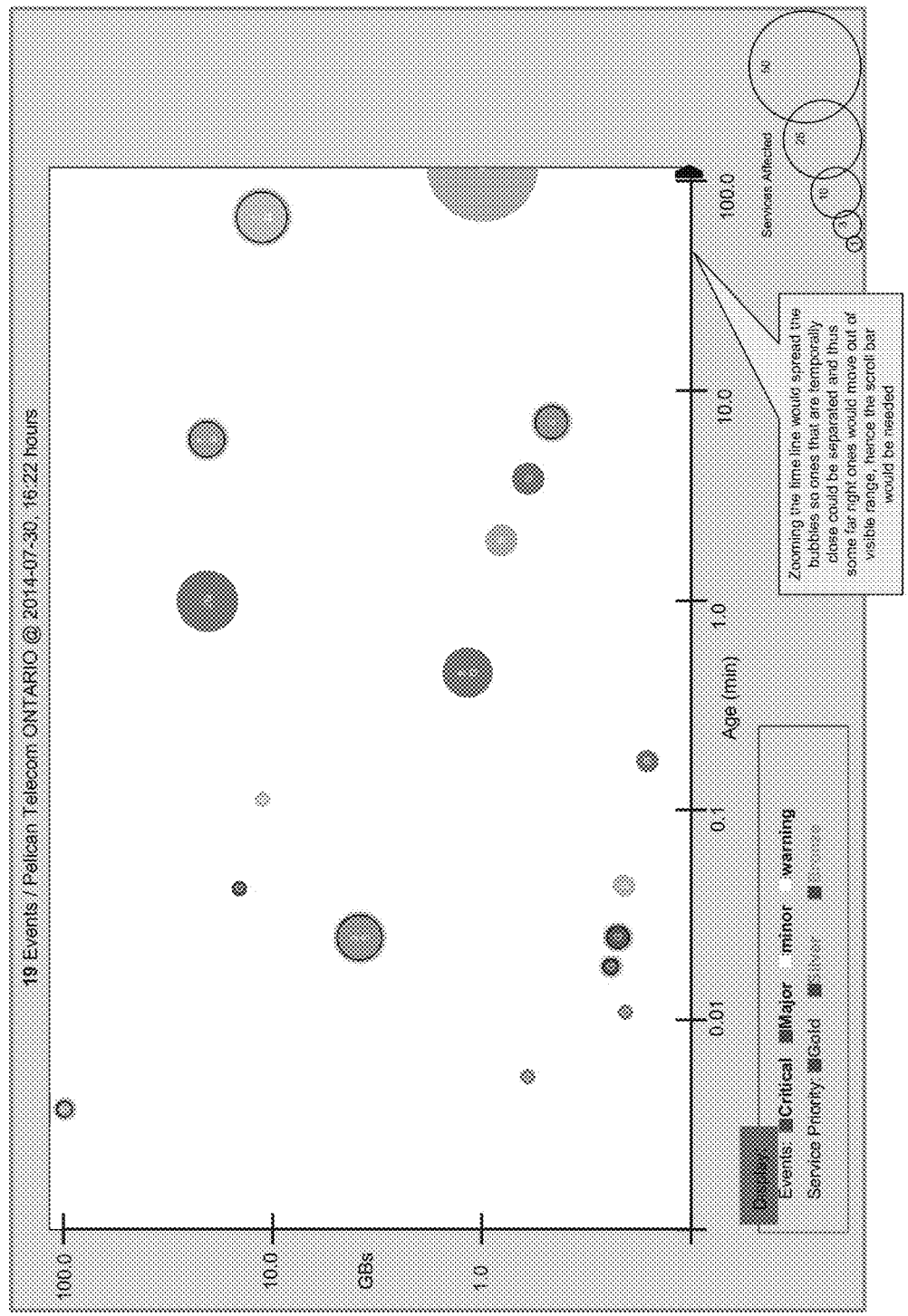
Figure 11L:
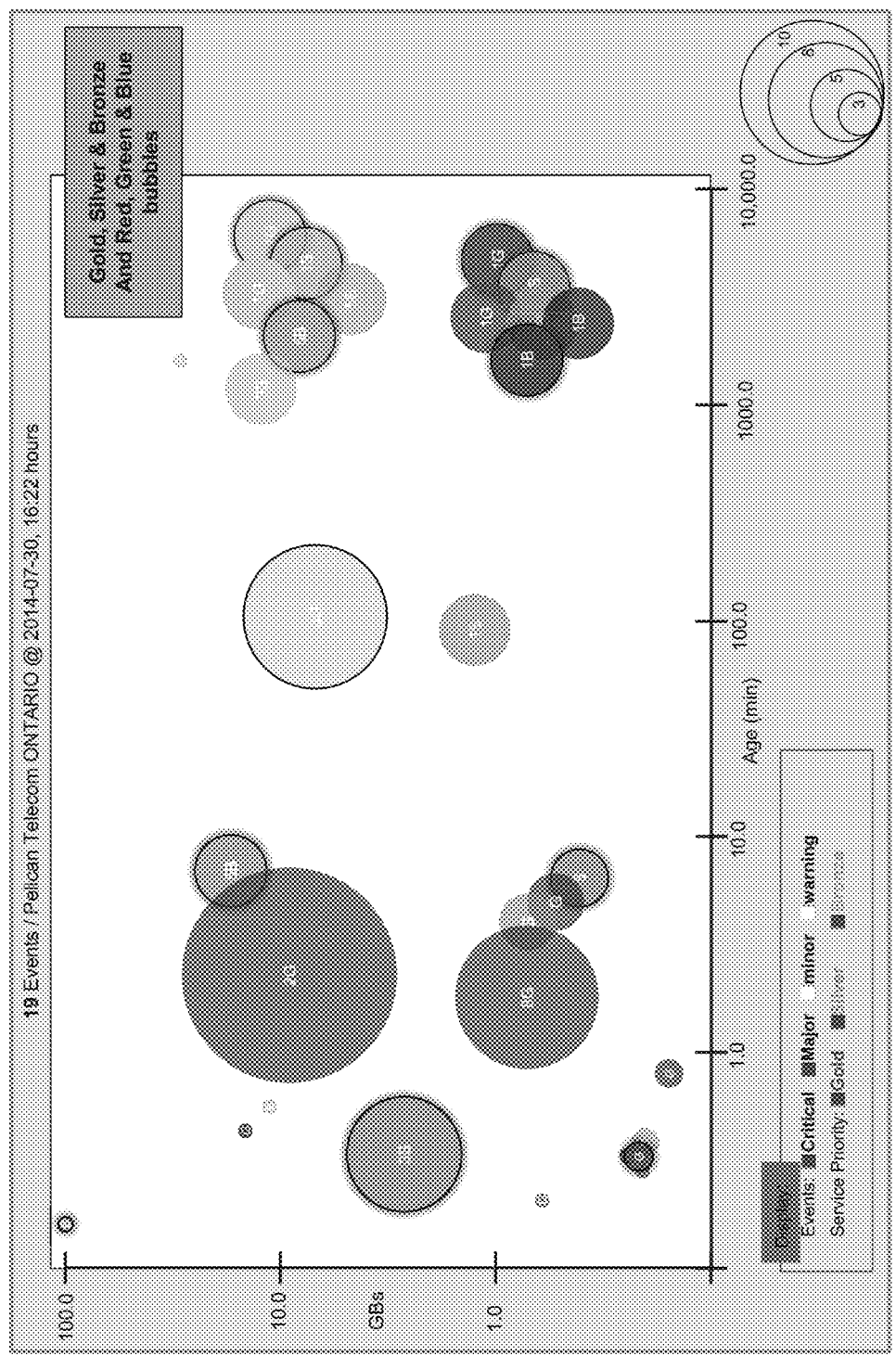
Figure 11M:
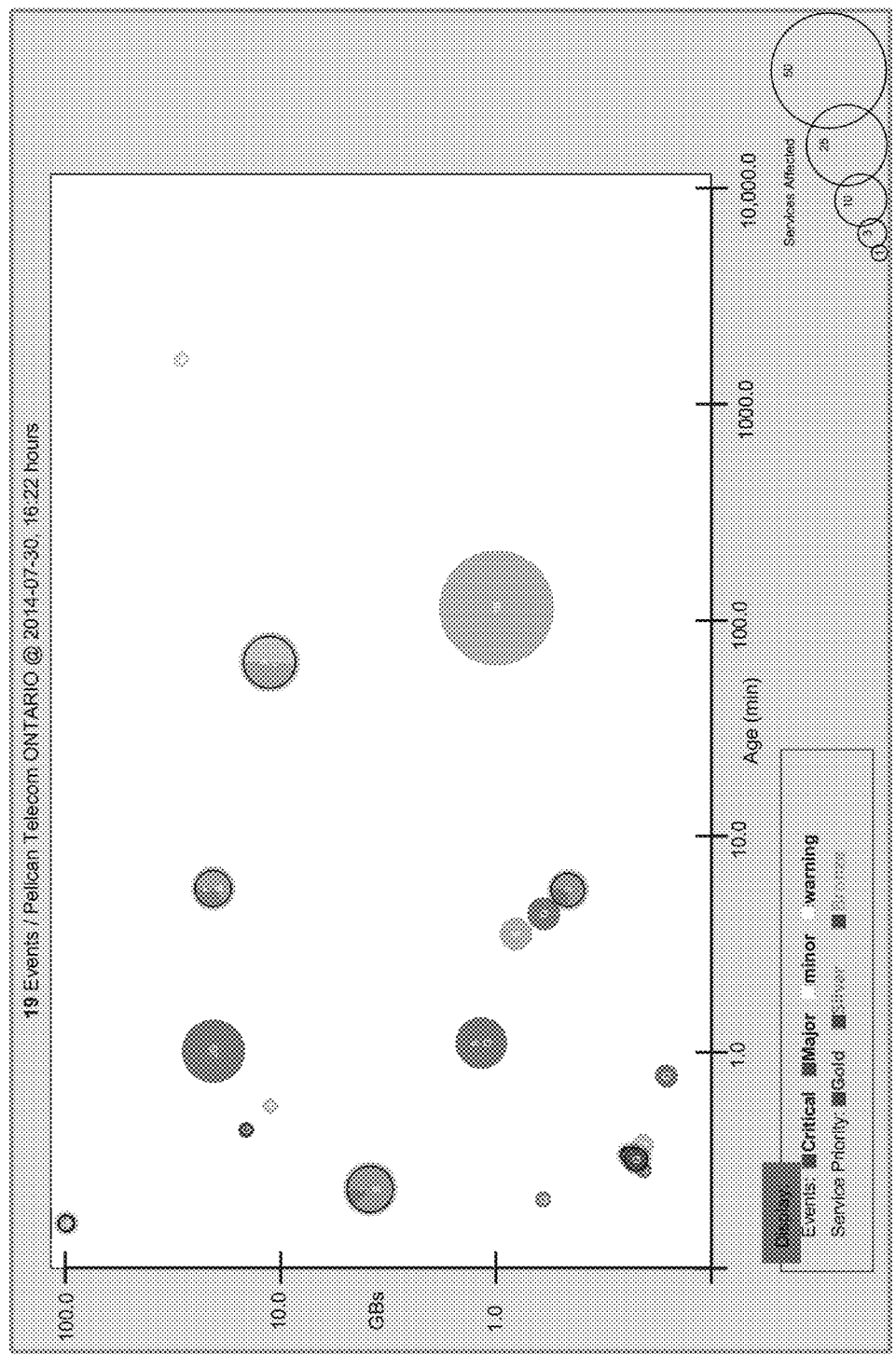
Figure 11N:
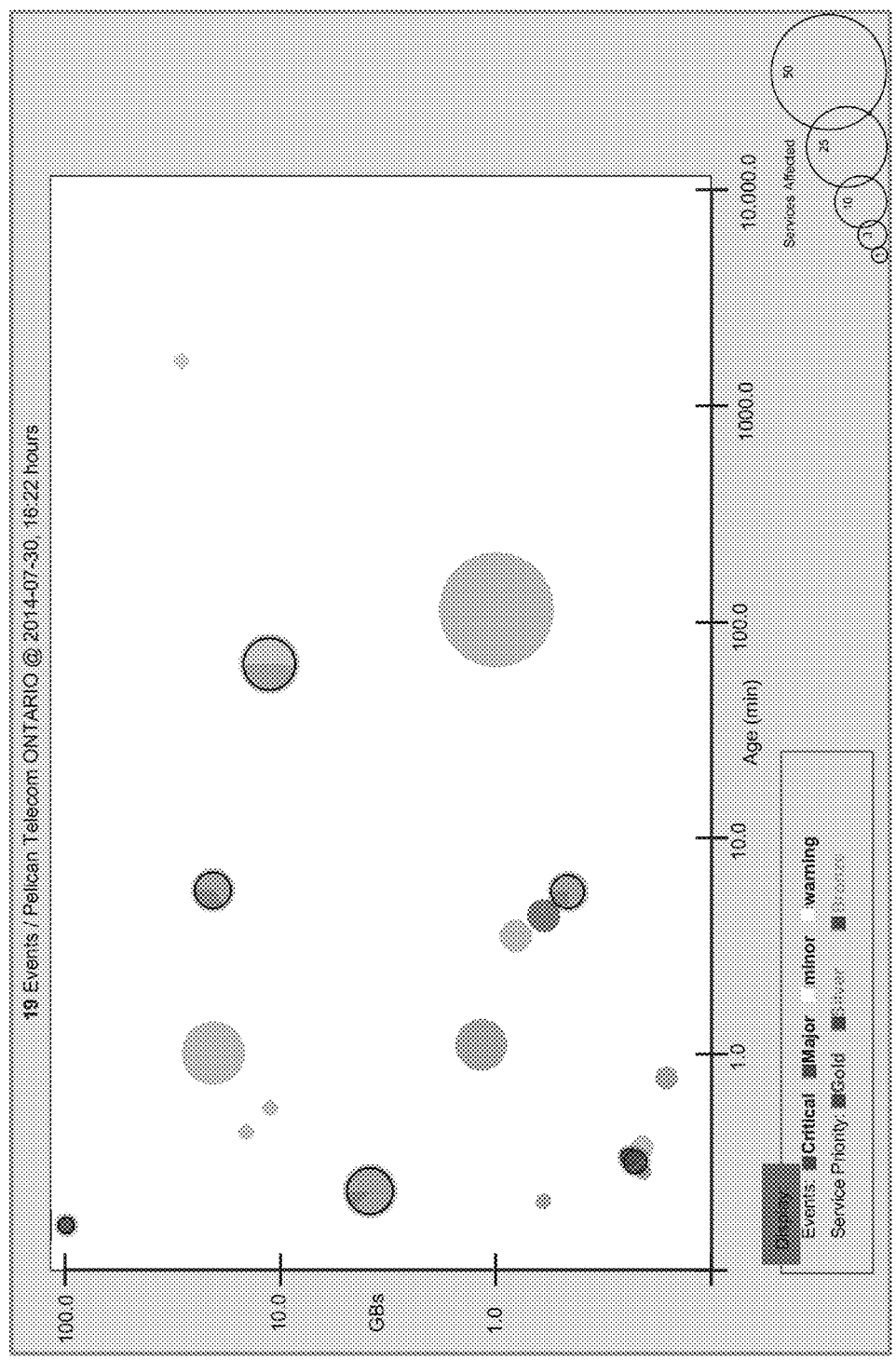

FIGS. 11A-11N are diagrams illustrating an example of a Graphical User Interface (GUI) for displaying network events while allowing user interaction to change the GUI as desired. The GUI includes a main display area that includes a graph with age (in minutes) on the x-axis and bandwidth affected (in gigabytes) on the y-axis. One or both of the axes may use a logarithmic scale for creating a logarithmic graph or semi-logarithmic graph. Since the main display area shows the bubbles with respect to an ongoing factor (i.e., time) that increases continually, the main display area may be updated periodically (e.g., once or more per second). Each bubble (or circle) displayed in the main display area represents an alarm cluster (as described throughout the present disclosure). As the age of each alarm cluster gets older, its corresponding bubble may be moved continually toward the right to indicate its increasing age. The size of the bubble is an indication of the number of customer services that are affected by the event associated with the alarm cluster. Also, the color of the bubbles may represent a priority level. The height along the y-axis represents the amount of bandwidth at risk. The bubbles may also have other features (e.g., different border, glow, etc.) to indicate that one or more services are "down."

A gray bubble shows that the network event associated with the particular alarm cluster has been "checked-out" or acknowledged by the server 10 and is being resolved. In other words, personnel may be deployed to fix the problem. When the problem is cleared and the root-cause has been fixed, the gray bubble will disappear. Although data may still be available regarding the particular details of the history of the event, the main display area does not display this bubble any longer in order that focus can be placed on other issues that need to be resolved. Again, by removing the fixed problems, priority can then be given to the next set or issues or events that require attention.

Also, the GUI shown in FIGS. 11A-11N may include two panels on the left side, each of which may include any number of clickable objects or interactive objects (e.g., text links). The first panel is a highlight box for showing highlights of the bubbles (i.e., events). The second panel is a customer/service box for showing which customers have service issues that need to be resolved. This panel can help a network operator to see any customers that have higher priority. Also, when the user clicks on an interactive object (e.g., text), this object may correspond to a text box, pop-up, window, or other graphical feature that can be displayed to show additional information about the subject of the clicked interactive object.

A legend is shown at the bottom of the GUI of FIGS. 11A-11N. The legend may include a color key for indicating the various degrees of urgency of the bubbles based on the color. Other keys may be used for indicating the service priority of the bubbles. Also, a size key may be used to indicate the number of customers or services that are affected by the respective event. The size of each bubble may have a diameter, area, or other dimension that corresponds to the number customers/services affect.

As shown in FIG. 11B, details of the x-axis and y-axis are described. Also, the user may use the main display area in an interactive manner (e.g., enabling zooming in or out). In FIG. 11C, the user may click on a particular customer to get specific information about that customer, wherein FIG. 11D shows the results of selecting the customer link. Specifically, the bubbles associated with that customer are highlighted, either by enhancing the view of the customer's information or by reducing the intensity of other information.

It may be noted that FIGS. 11G-11N show only the main display area, where the two left-side panels are not shown. In some embodiment, alarm clusters (and their corresponding bubbles) can be cleared manually by a network operator. However, the systems may be set up where some alarms cannot be cleared manually. The x-axis may show up to about 10,000 minutes, which is equivalent to about seven days, which may be the time that some events linger in the network until they are eventually resolved.

Event bubbles on the graph are multi-encoded in the following manner:

1. Size (area) indicates the number of services affected by the event (the greater the area, the more services affected).

2. Color could be used to indicate highest order service priority of all services inside (H, M, L), e.g. 5 Low priority+1 High priority in bubble=HIGH 3. Height (or placement along the Y-axis) indicates amount of bandwidth at risk (higher up the Y-axis=more bandwidth involved)

4. Border & Glow on the event bubble indicates at least 1 correlated service is DOWN 5. X-axis is a logarithmic timeline of the age of the event (i.e., how long it has been going on)

Both the Y-axis and X-axis may be logarithmic in order to effectively place as many event bubbles on the graph as possible. The logarithmic graph of the GUI may be implemented this way for the following rationale:

Y-Axis: Logarithmic scale for bandwidth (GB) per event.

Many more L2 services may appear as individual events than L1 or L0 services. Thus, there may be more bubbles in the area around 10G or less. By using a log scale for GB, the main display area can give more space in the lower GB range to accommodate the numerous bubbles that are anticipated to be 1's and 2's in the display. As the service event aggregating module 24 correlates more and more services into a single bubble, the aggregated GB of that bubble would naturally place it higher up the Y-axis. The reasoning for this feature is that a NOC operator may not necessarily be concerned with a lot of little bubbles in the lower part of the graph but may still be able to see them as individual events and not one big blur.

X-Axis: Logarithmic scale for timeline: According to the reasoning for the various embodiments, an alarm-to-service correlation application (e.g., the service event aggregating module 24) is that the service events (e.g., troubled or down services) should not be removed from the graph until they are indeed back to normal (i.e., cleared). This could result in a lot of bubbles collecting at the right-hand side of the timeline for services that are running troubled for hours or even days until the physical fault is corrected. By employing a log time scale, the GUI can allocate a great deal of visible space to the new service events that need attention (e.g., the events in an area from about 0 to 10 minutes) while still maintaining space for service events that linger for days until they are cleared. The GUI may be able to display a logarithmic timeline on the x-axis having tick marks 0 minutes, 1 minute, 10, minutes, 100 minutes, 1000 minutes, and 10,000 minutes (i.e., about one week). The logarithmic timeline allows the information to be displayed in a straightforward manner. The GUI may also be configured to allow a user to zoom in and out and scroll to focus in on a particular time period.

In addition to the main display area of the first GUI shown in FIGS. 11A-11N that plots service affecting event bundles on an affected bandwidth X time graph, several accompanying side panels that present value-added computed data to the operator would be offered. The system could identify interesting patterns or statistically significant metrics/data from the correlated service events that would further assist a NOC operator to focus on the biggest bang for the effort. For example, a Customer panel would contain relevant customer information such as: "Customer A: 3 services troubled" while a Highlights panel would contain calculated simple statistics and analytics such as: "55% of all service affecting incidents are less than 10 minutes old"

Figure 12:
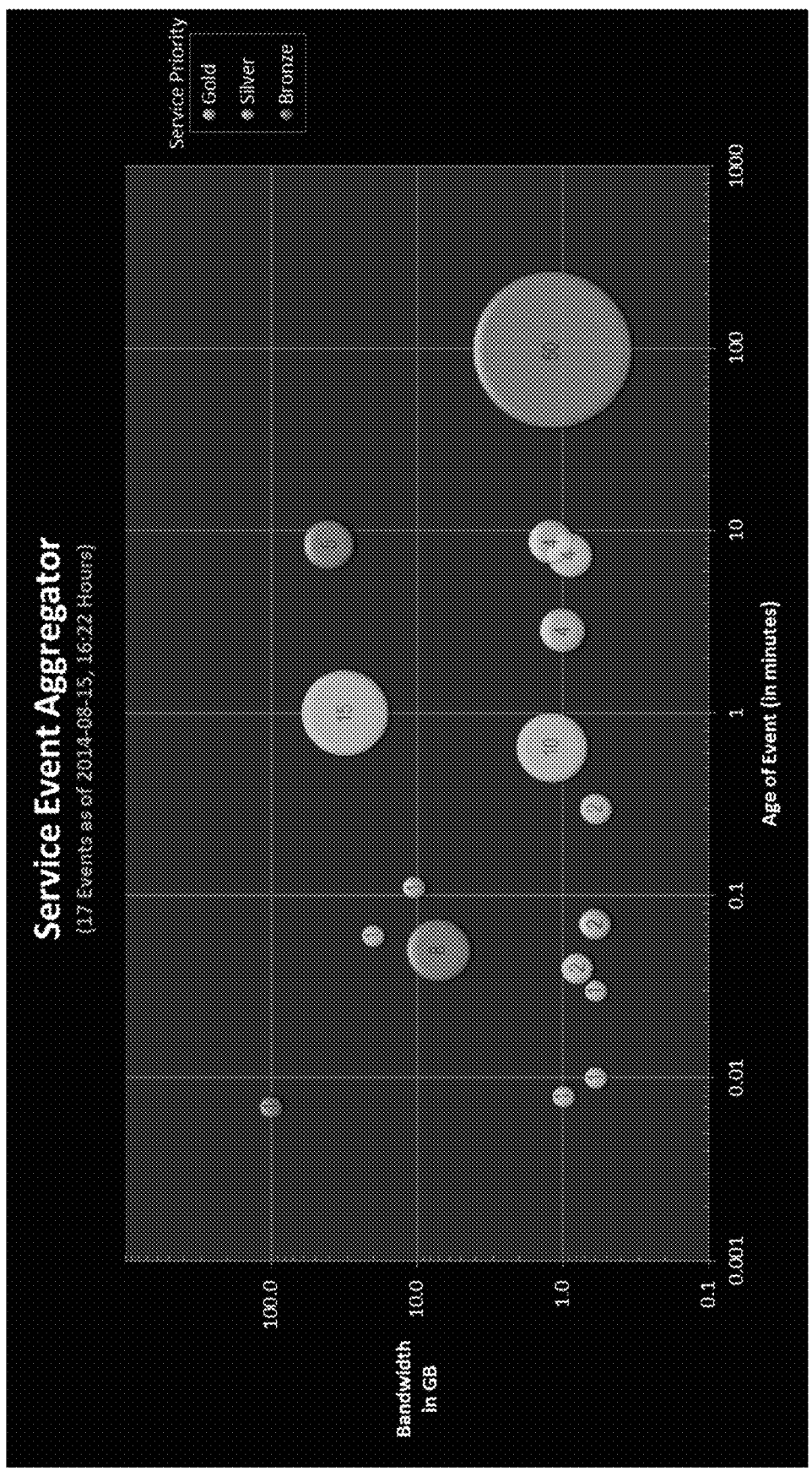
FIG. 12 is a diagram illustrating another example of a GUI for displaying network events allowing user interaction, according to various embodiments.

FIG. 12 is a diagram illustrating an embodiment of a second GUI for displaying network events and which allows user interaction. The second GUI also includes a main display area with bandwidth-affected versus age of alarm/event clusters. Exploring the creation of a service affecting alarm cluster, event bundle, or other grouping of network issues (e.g., represented by bubbles) may enable the functions to associate alarm(s) with the service(s) that are being affected, and combine this with the upper layer services the lower layers support, and tie in all the associated symptomatic alarms that seem to occur at relatively the same time.

In essence, a "service-affecting event" would be a collection of services that are affected by specific alarms combined with all the associated alarms against those services that are happening at approximately the same time. As mentioned in the present disclosure, this may be presented as one event object (e.g., bubbles).

Figure 13:
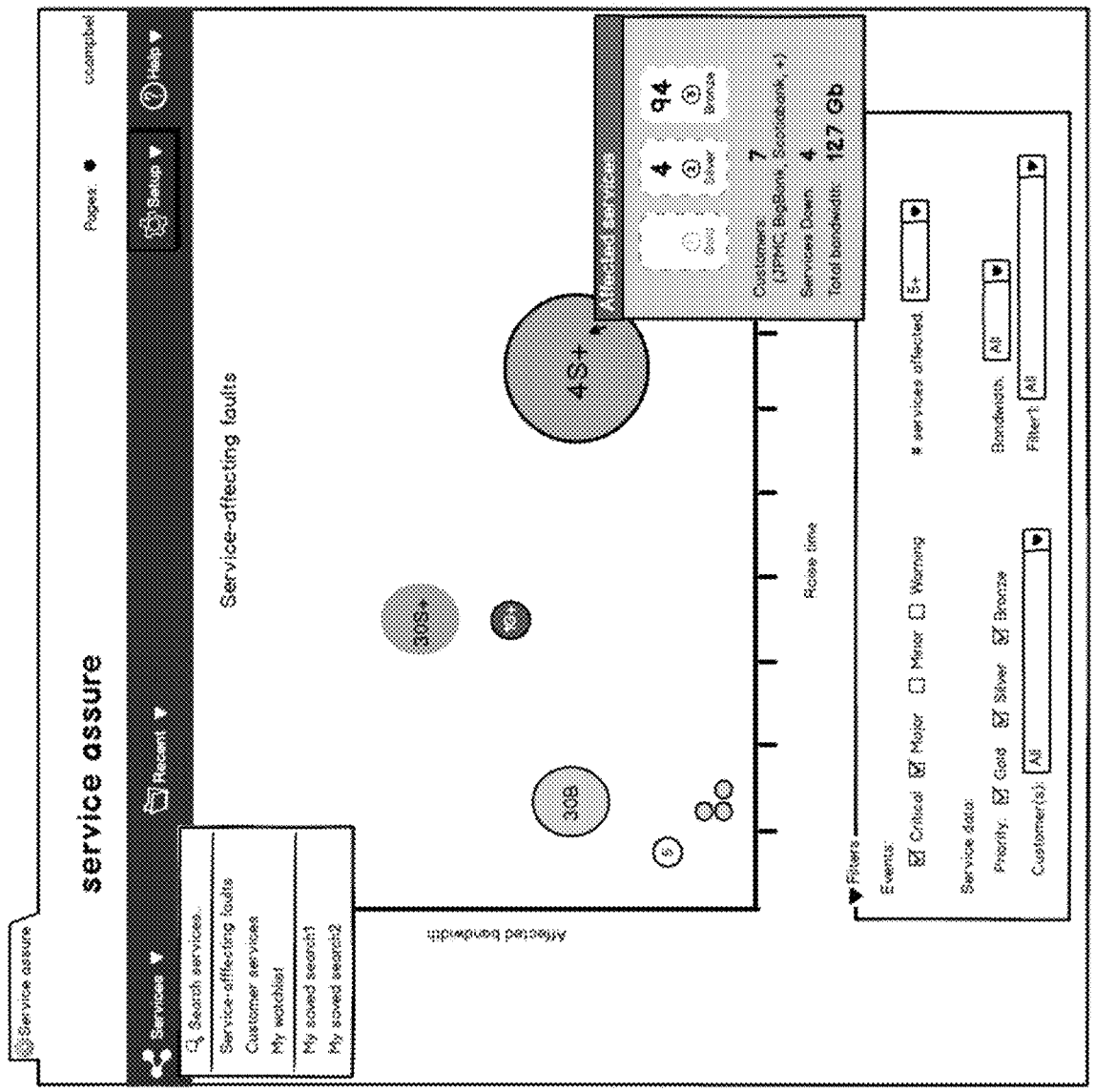
Figure 14:
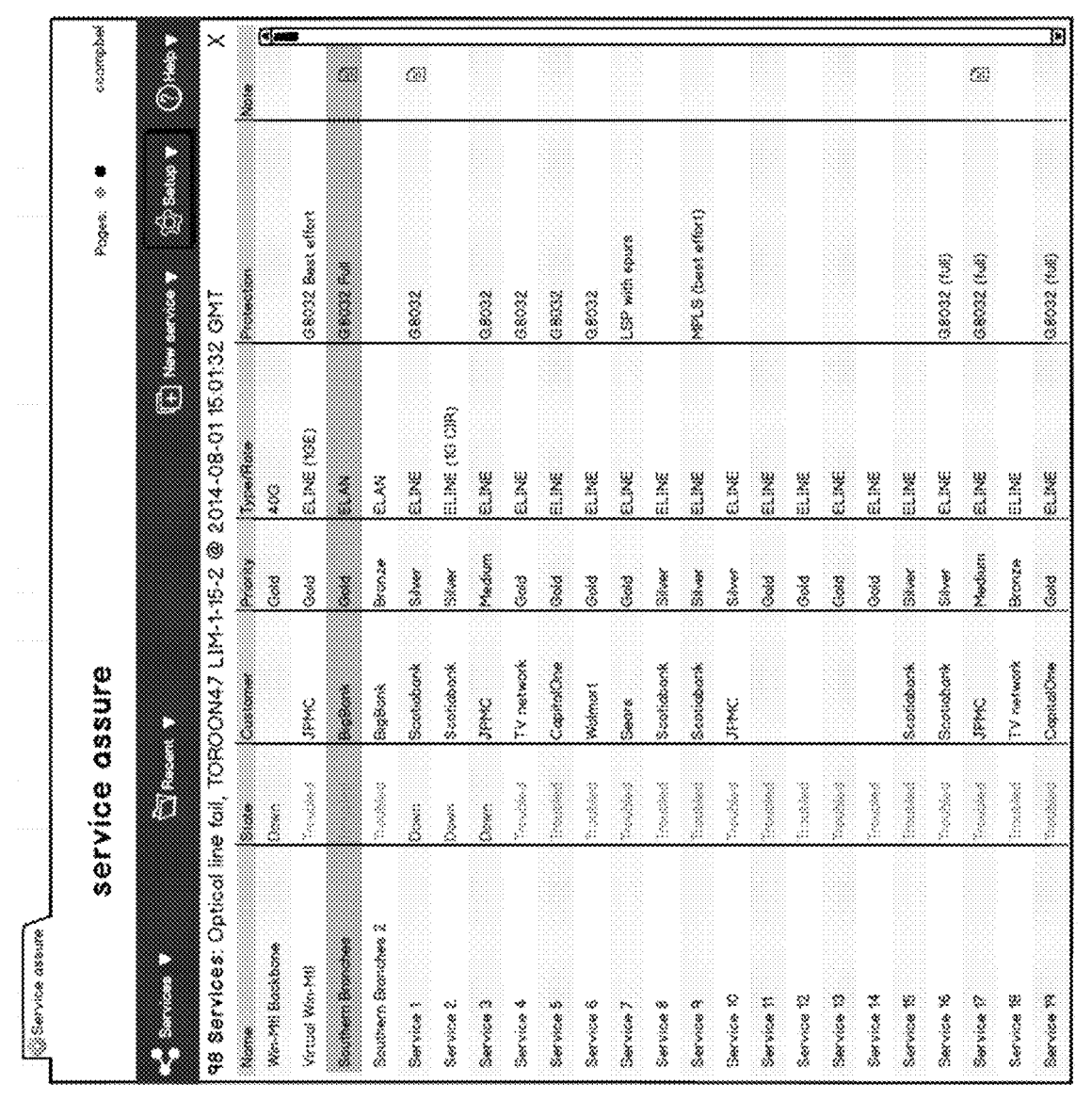
Figure 15:
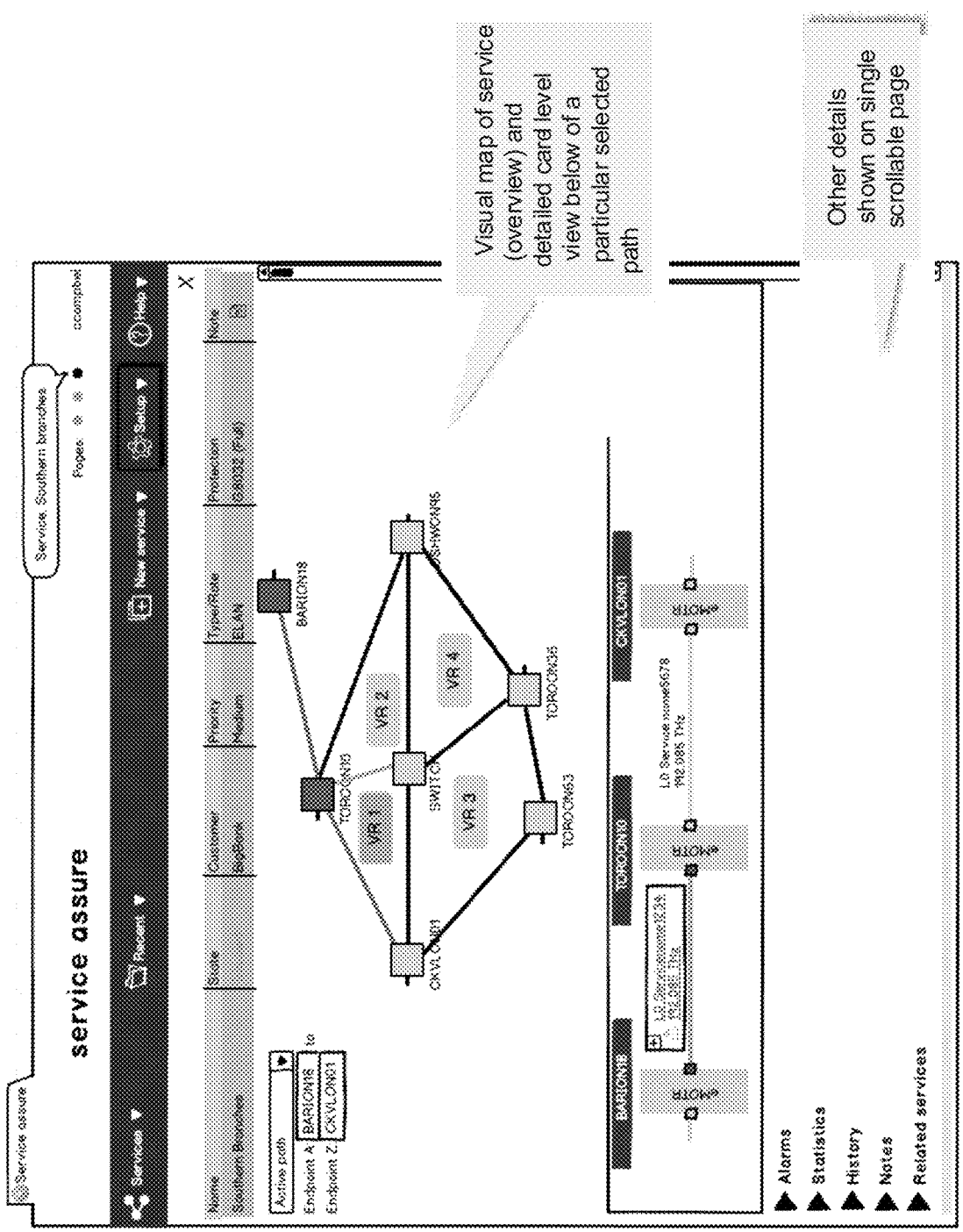

FIGS. 13-15 are diagrams illustrating a third embodiment of a set of GUIs for displaying network events allowing user interaction. FIG. 13 shows a graph having similar features as the first and second GUIs with respect to FIGS. 11 and 12. In FIGS. 14 and 15, other GUIs are shown for displaying other useful information.

Figure 16A:
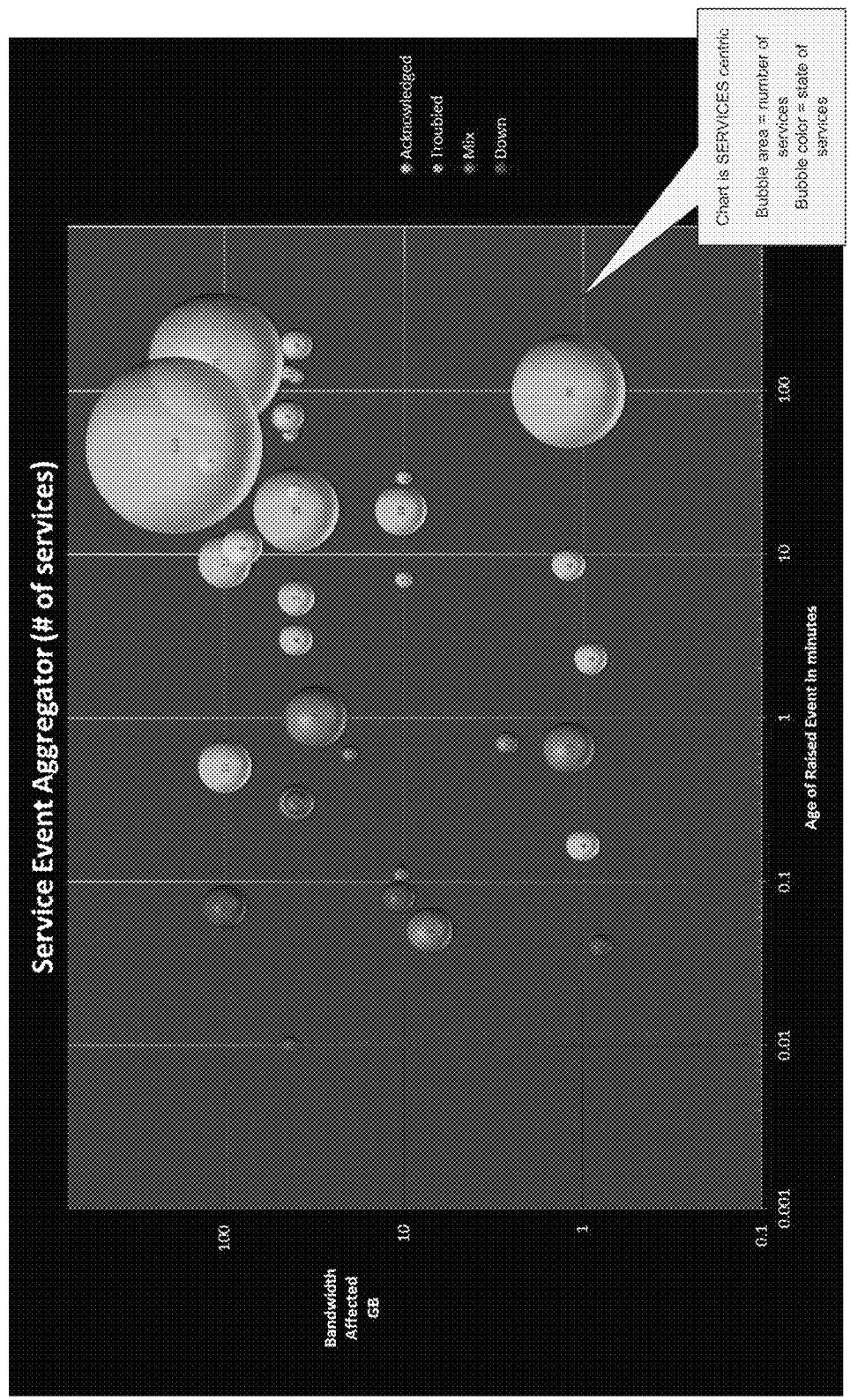
FIGS. 16A and 16B are diagrams illustrating yet another example of a GUI for displaying network events allowing user interaction, according to various embodiments.
Figure 16B:
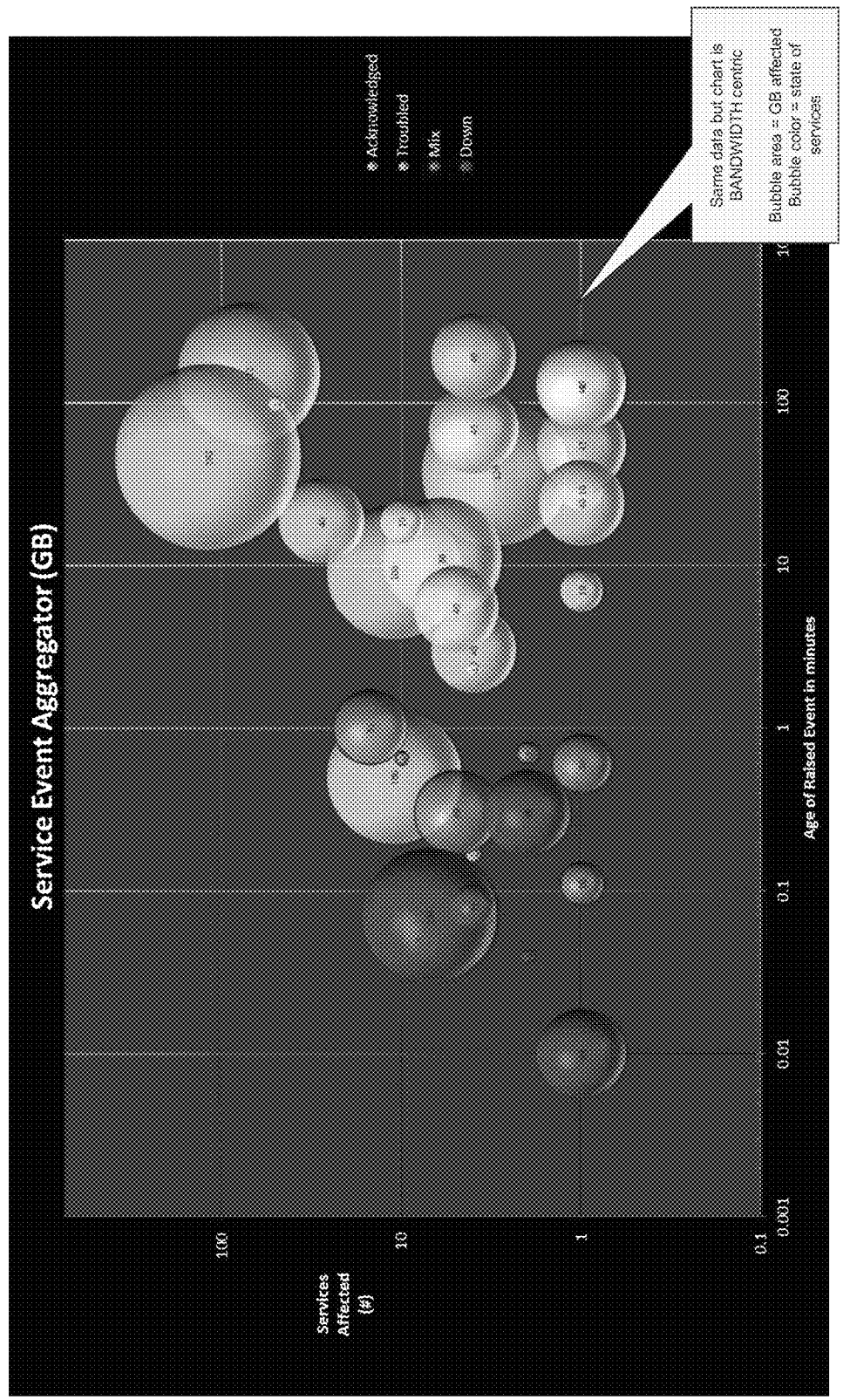

FIGS. 16A and 16B are diagrams illustrating a fourth embodiment of GUIs for displaying network events allowing user interaction. These are similar to the second GUIs of FIG. 12. The various implementations of sets of GUIs shown in the present disclosure are merely exemplary and may be altered in any suitable manner according to common practices. The purpose, however, is to present alarm clusters in a viewable format where the alarm clusters have been grouped based on the correlation of alarms having common factors to thereby represent potential root-cause events in the network. These views may be created and updated by the visualization module 26. The groupings are created by the service event aggregating module 24 by taking raw alarm data and finding correlations among the various alarms. Then, the visualization module 26 is configured to take the information about the alarm clusters to provide the information as shown in the GUIs. Thus, the GUIs show the creation and evolution of each of the service-affecting alarm clusters (or event bundles), which include the features that: associates alarm(s) with the service(s) it's affecting, correlates the lower layer services (the bearer) with the upper layers services it supports, ties in the associated symptomatic alarms that seem to occur at relatively the same time. In essence a "service affecting event bundle" would be a collection or set of affected services that are associated together, combining the alarms for those services that are happening at approximately the same time. This would be presented as one event bundle object.

Figure 17:
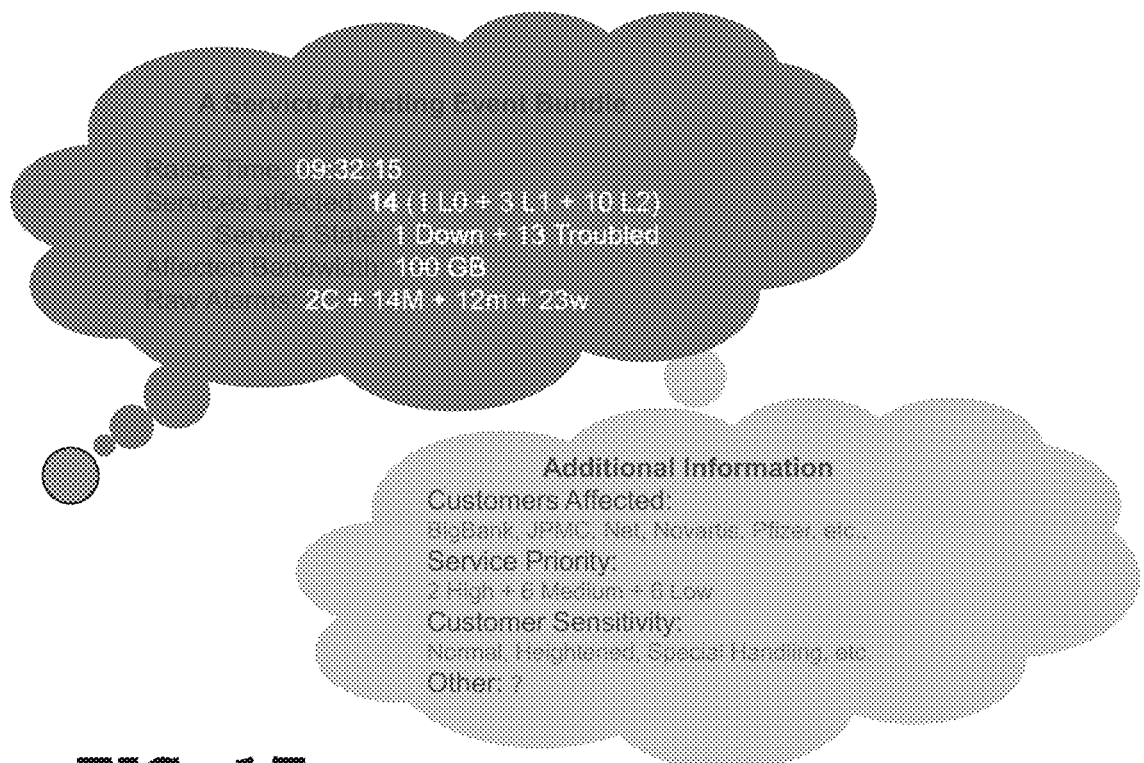
FIG. 17 is a diagram illustrating pop-up dialog windows for providing information about graphical objects displayed in the GUIs of FIGS. 16A and 16B, according to various embodiments.

FIG. 17 is a diagram illustrating pop-up dialog windows for providing information about graphical objects (e.g., bubbles displayed in a main display area of a GUI). The pop-ups provide information for each service-affecting Event Bundle, including an amount of bandwidth affected, the number of services affected (number down, number troubled), time/age of event, customer affected, and number and severity of alarms. The pop-up may also include service priority information, customer sensitivity information, etc. This allows an operator to see a good amount of information about an Event at a glance. In some embodiments, it is possible to retrieve secondary or tertiary information on-demand. This can make it easier for the operator to make a prioritization decision on which service affecting Event to work on first.

Figure 18:
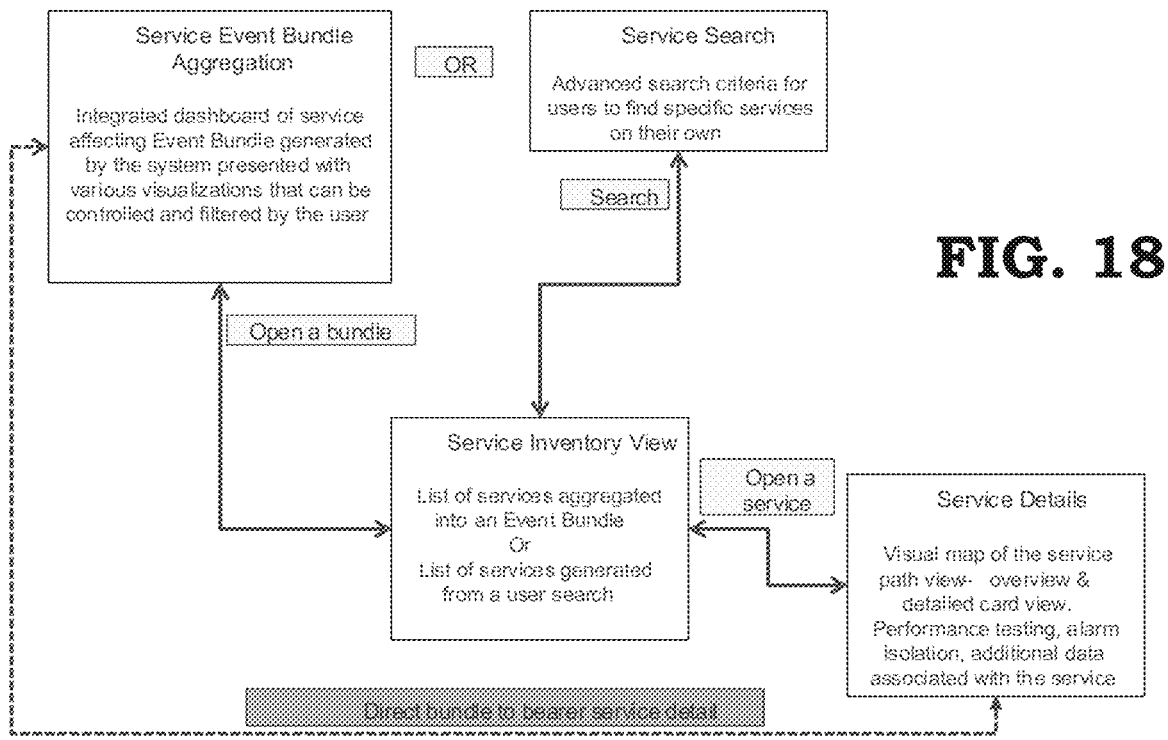
FIG. 18 is a flow diagram illustrating another process for handling network events, according to various embodiments.

The pop-up dialog windows of FIG. 17 may provide information about graphical objects displayed in the GUIs of FIGS. 16A and 16B. For example, a Service Affecting Event Bundle would include the following information:

Raise Time=2020-03-07 09:32:15
Services Affected=14 (1 L0+3 L1+10 L2)/Service States=1 Down+13 Troubled
Total Affected Bandwidth=100 GB
Raw Alarm Count=2C+14M+12m+23w
Additional Information in the second pop-up may include:
Customers Affected={BigBank, JPMC, Net, Novartis, Pfizer}
Service Priorities=2 High+6 Medium+6 Low
Customer Sensitivity=Normal & Heightened FIG. 18 is a flow diagram illustrating another process for handling network events.

Figure 19A:
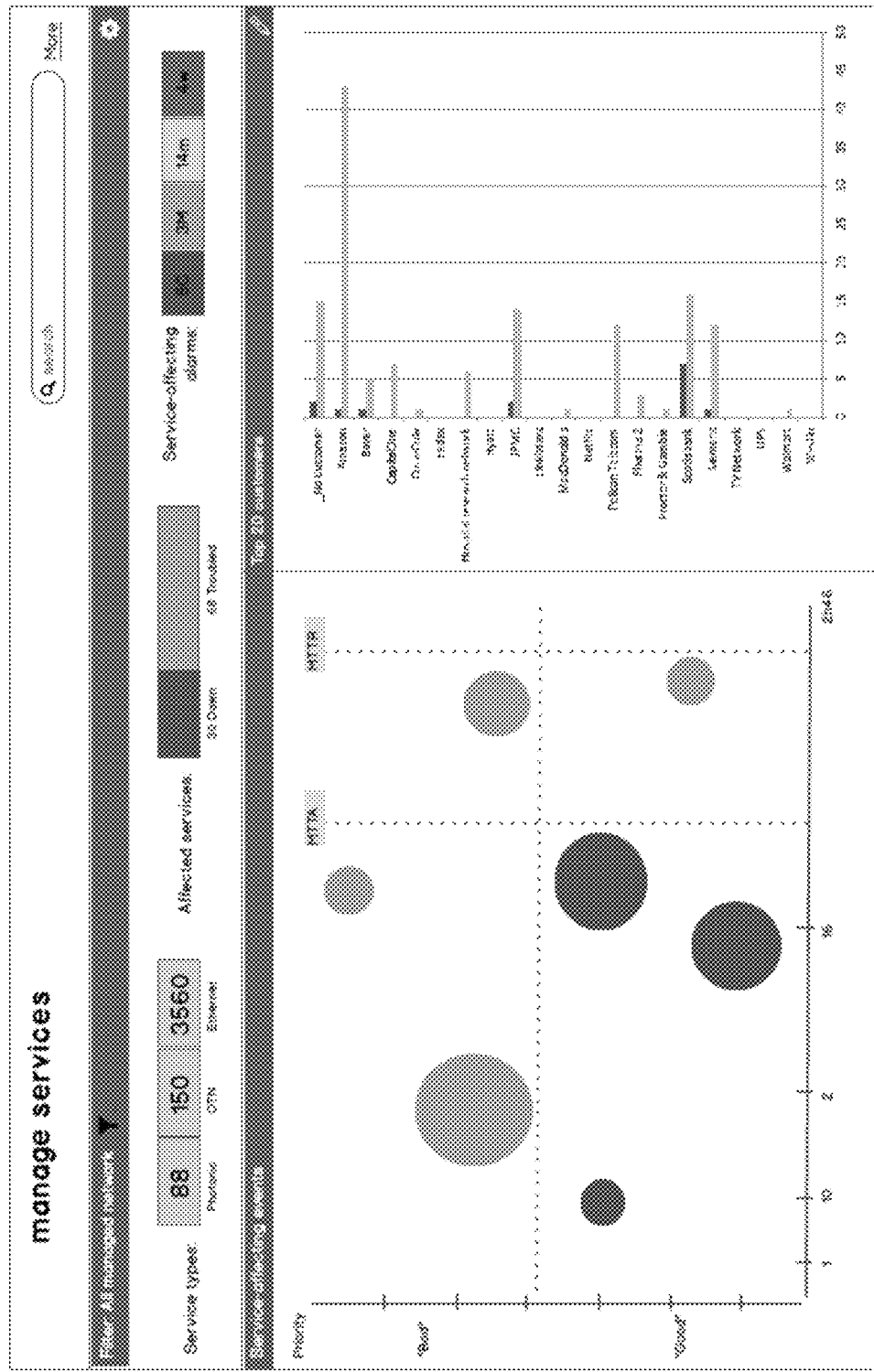
FIGS. 19A-19M are diagrams illustrating yet another example of a GUI for displaying network events allowing user interaction, according to various embodiments.
Figure 19B:
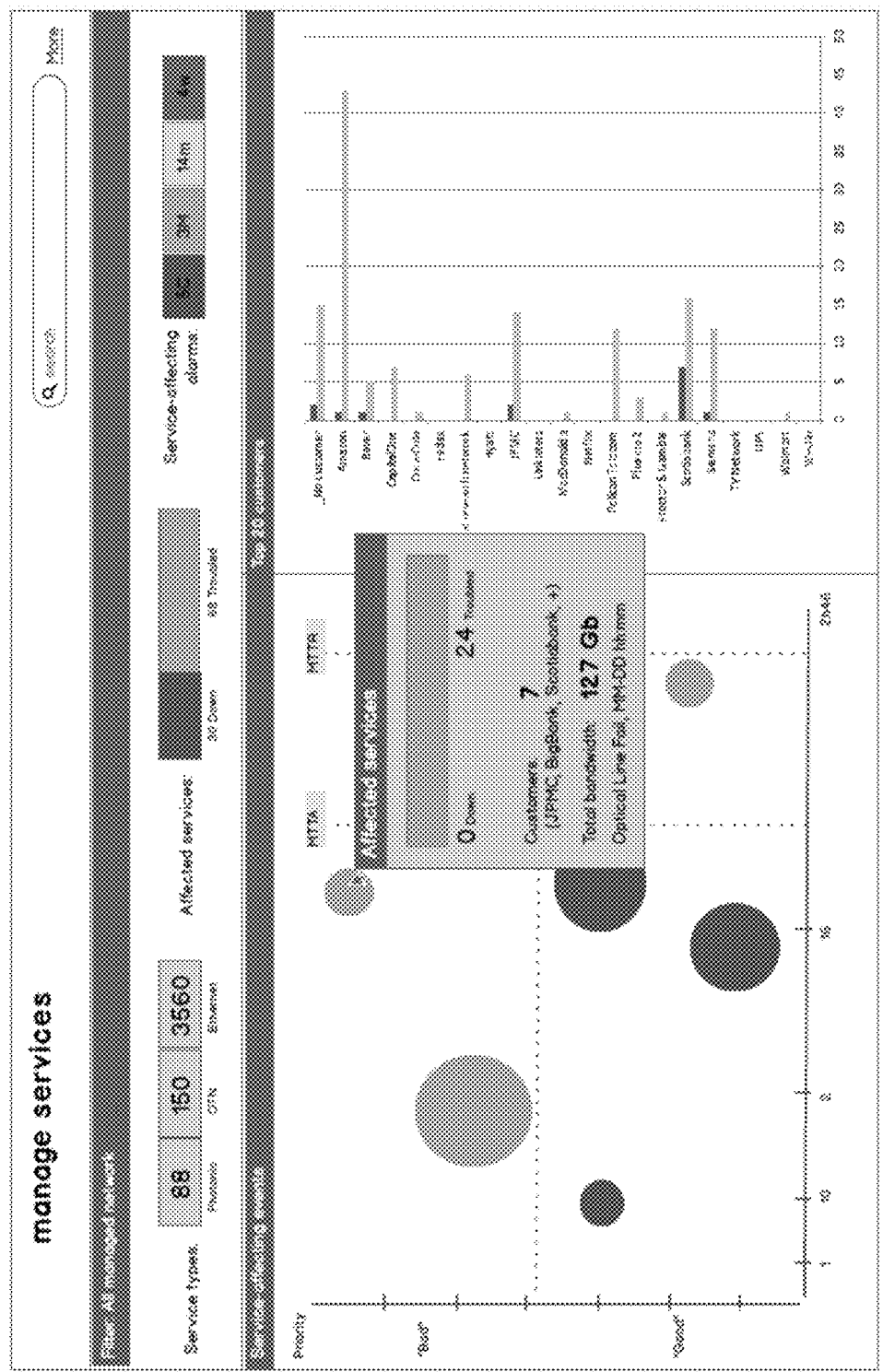
Figure 19C:
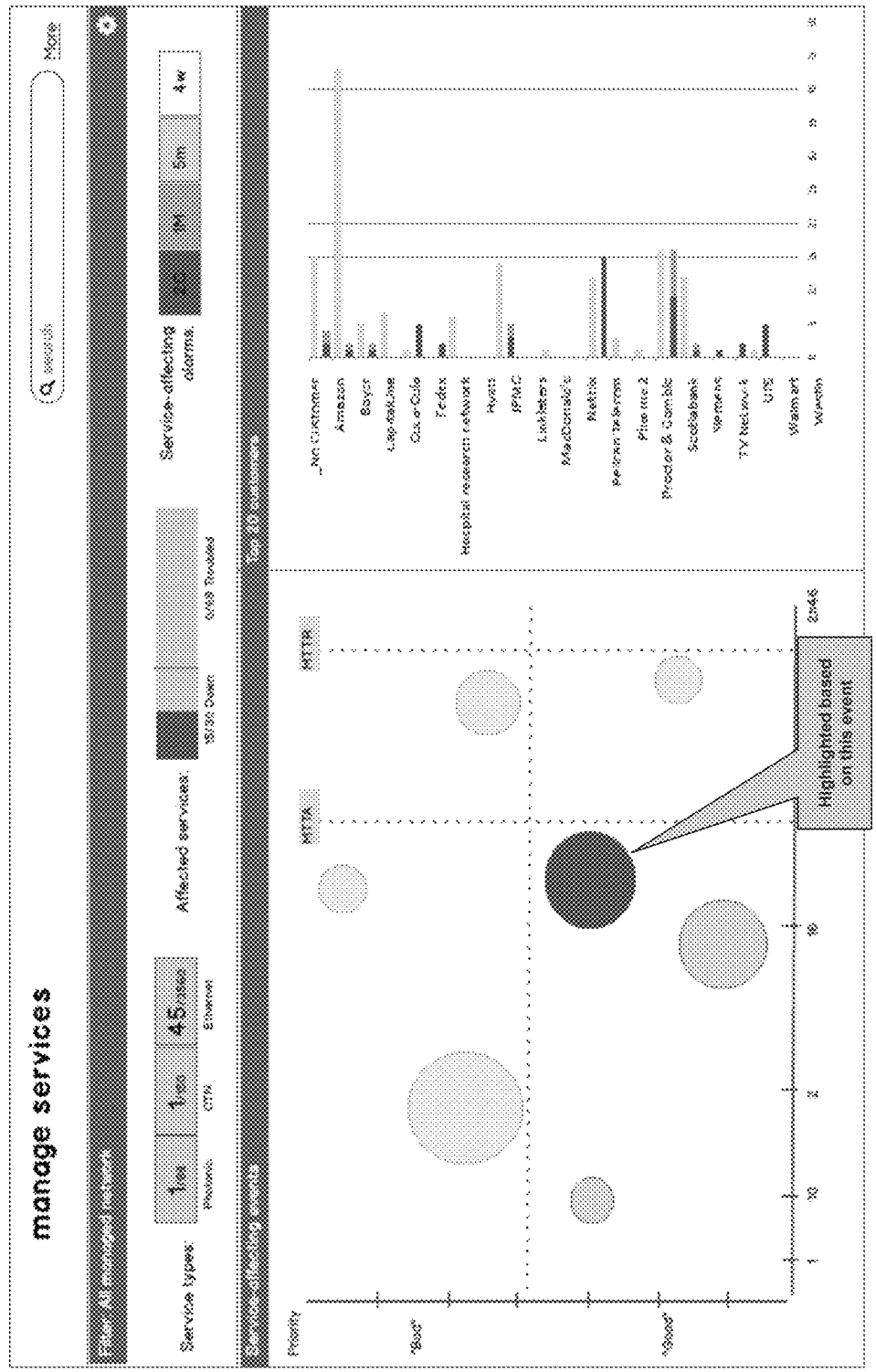
Figure 19D:
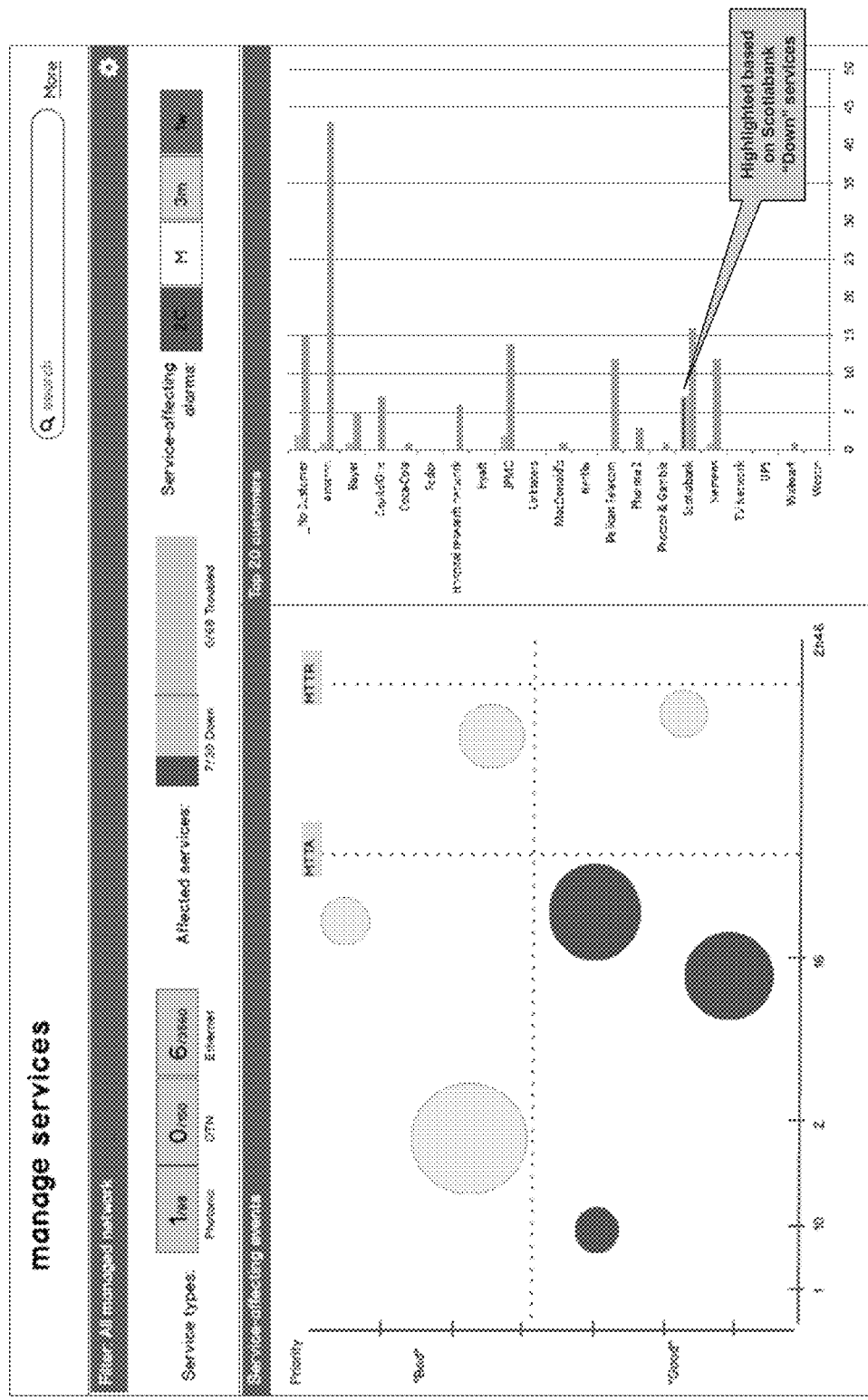
Figure 19E:
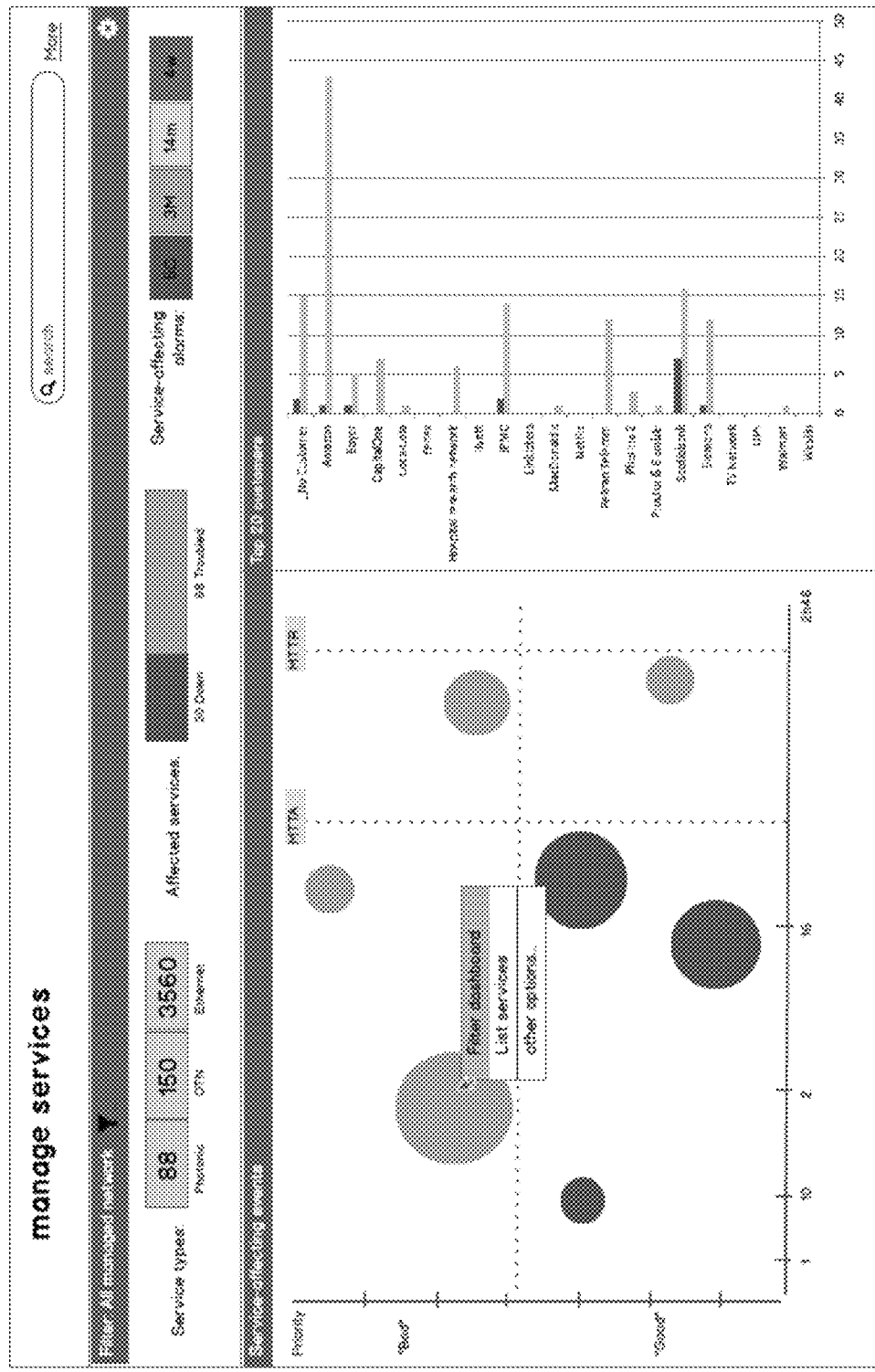
Figure 19F:
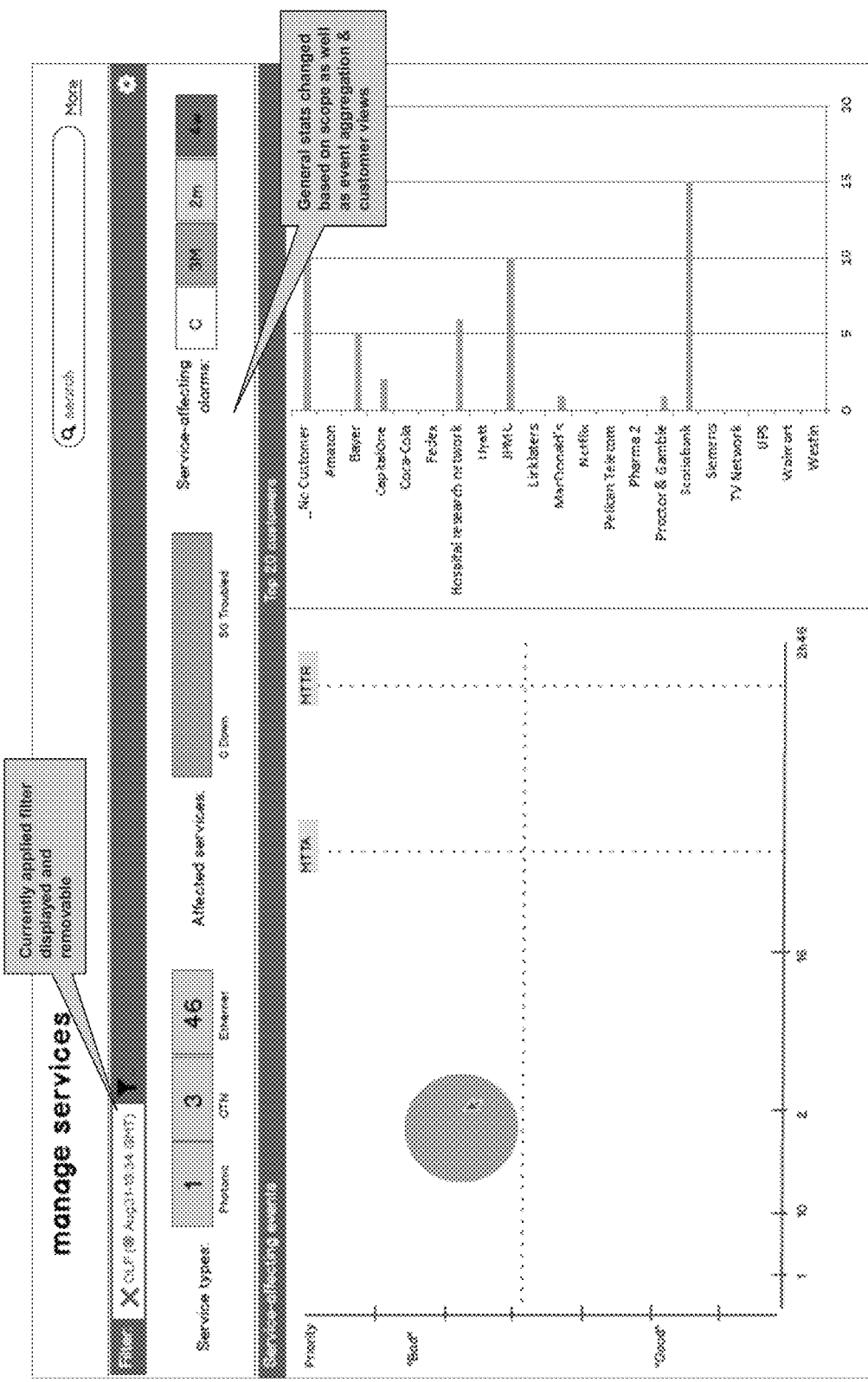
Figure 19G:
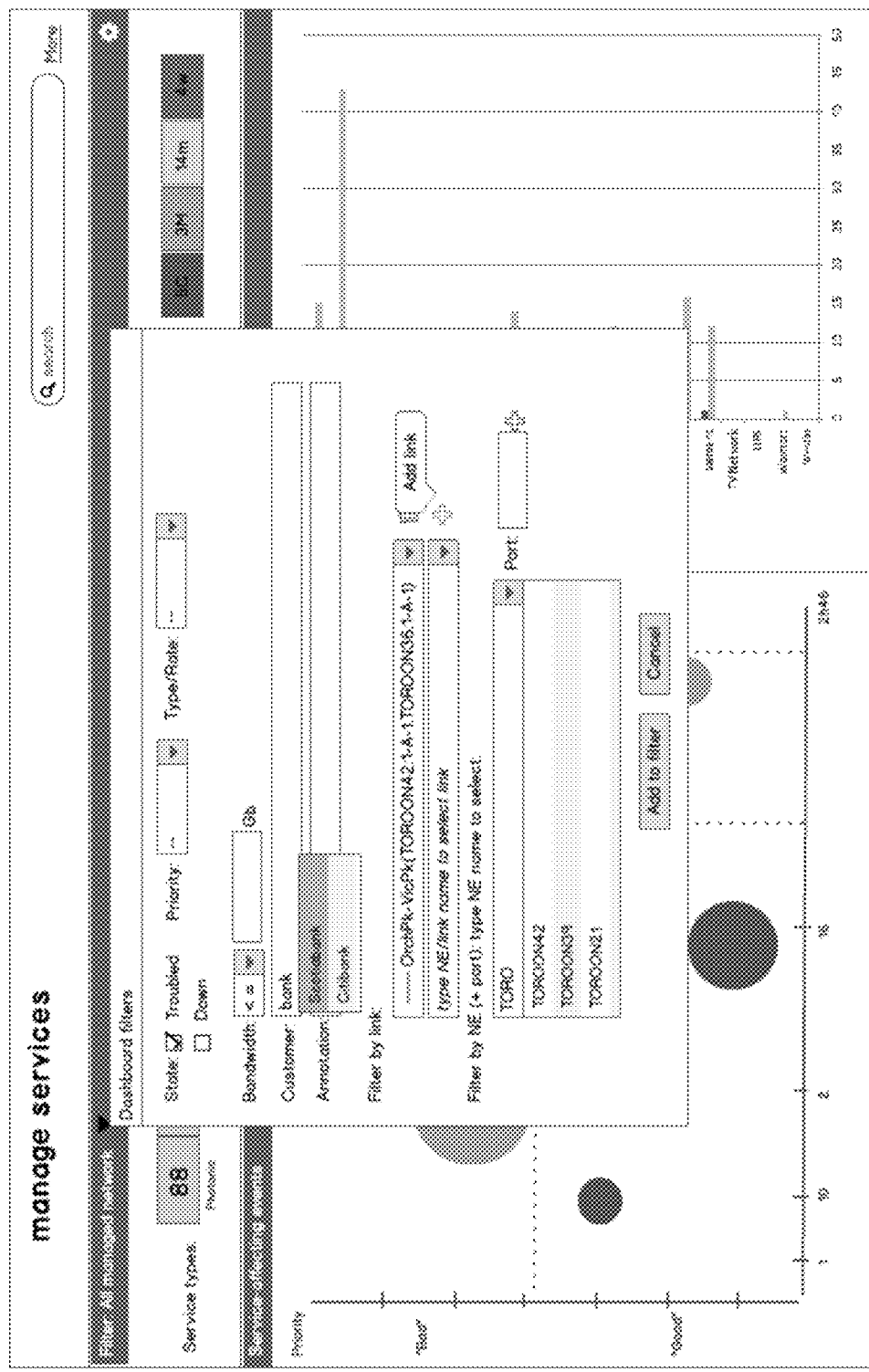
Figure 19H:
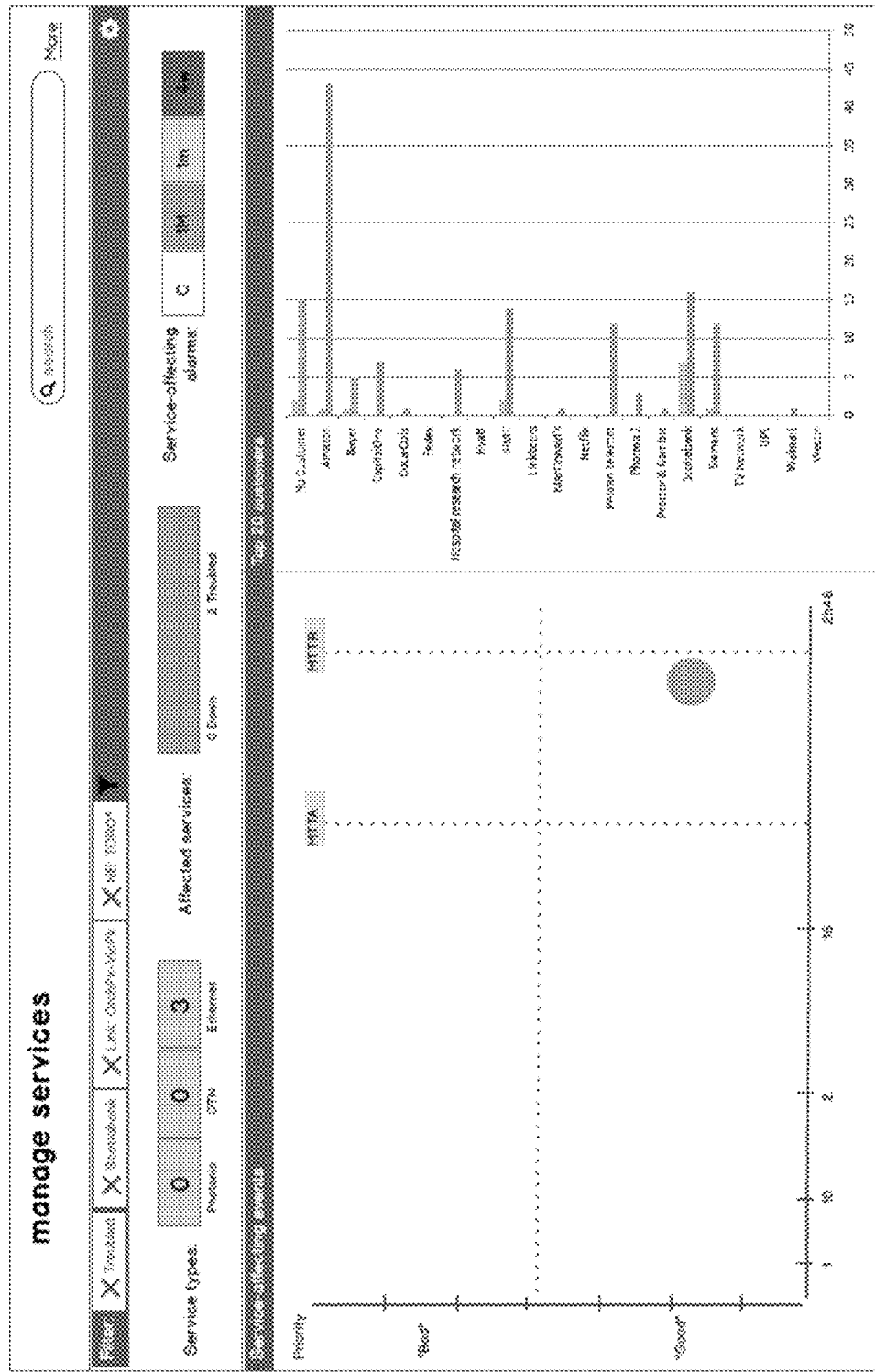
Figure 19I:
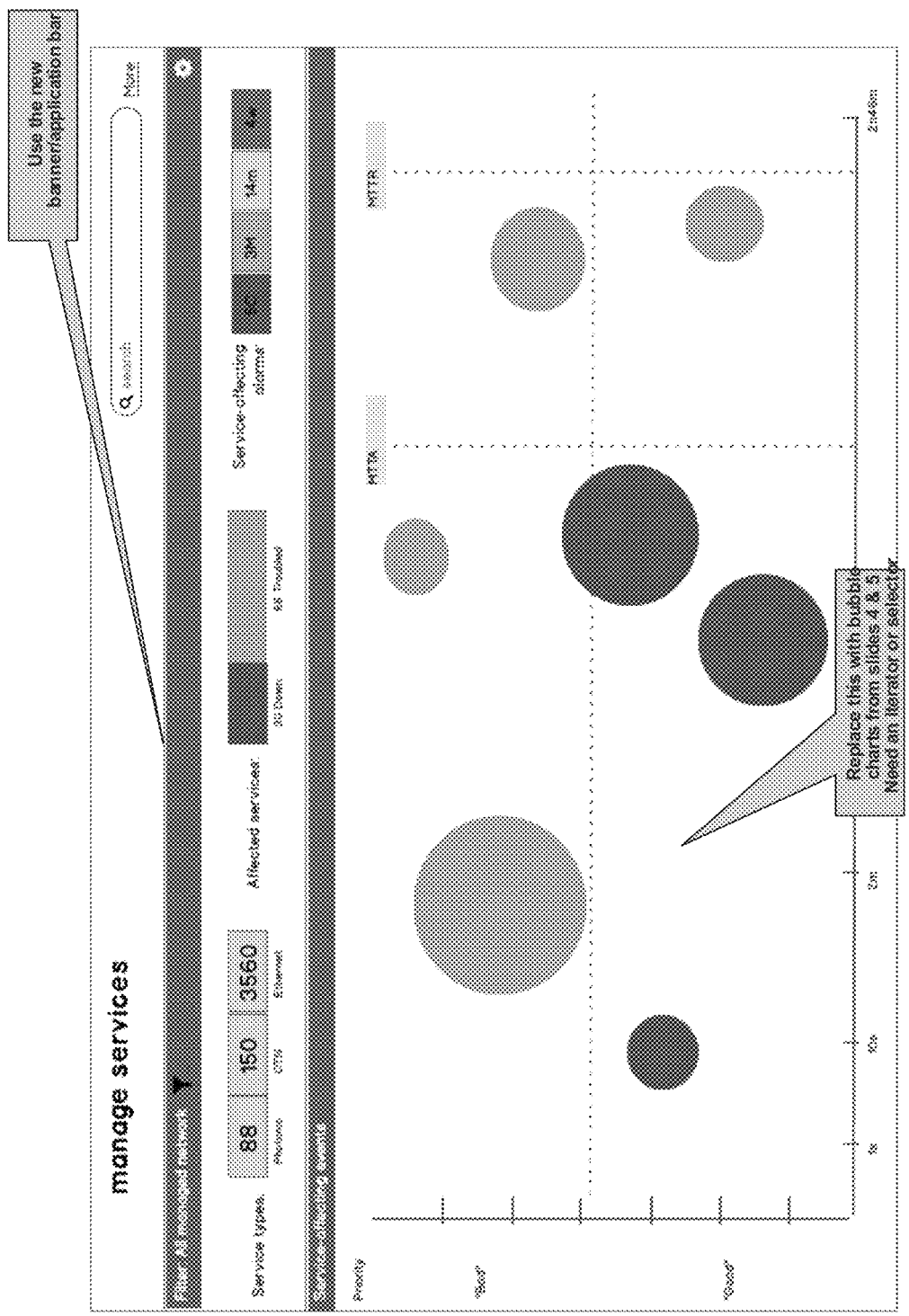
Figure 19J:
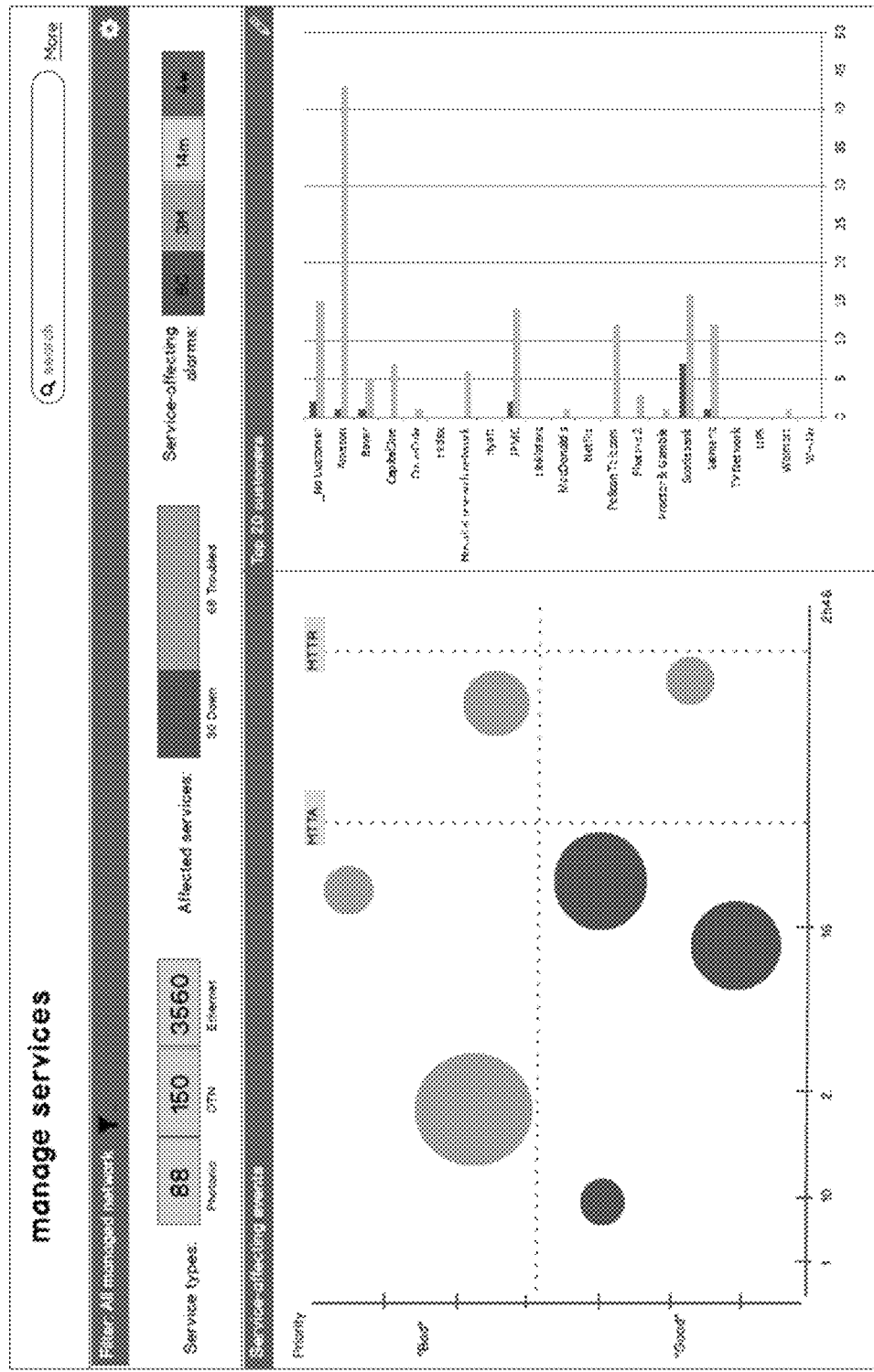
Figure 19K:
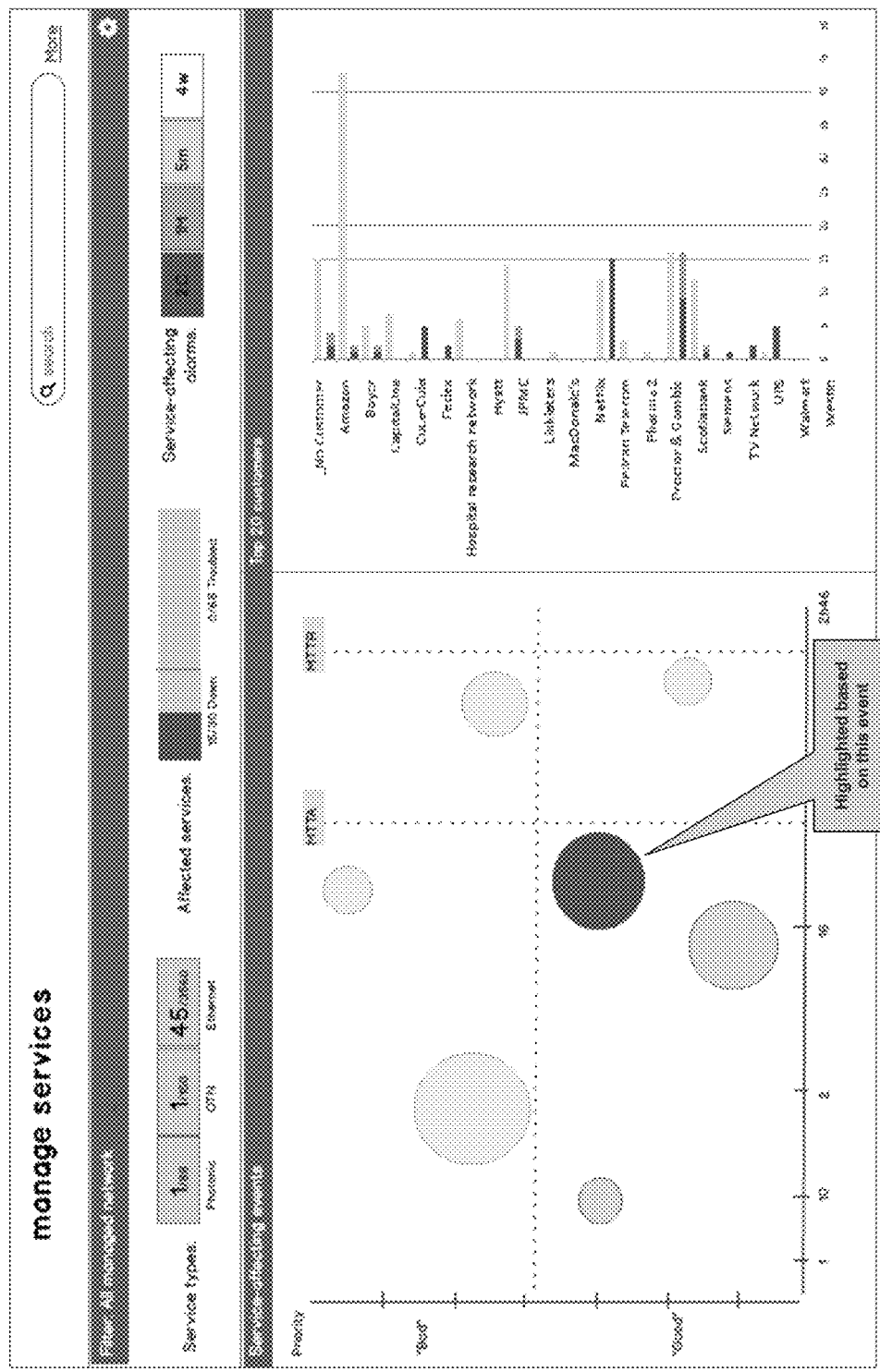
Figure 19L:
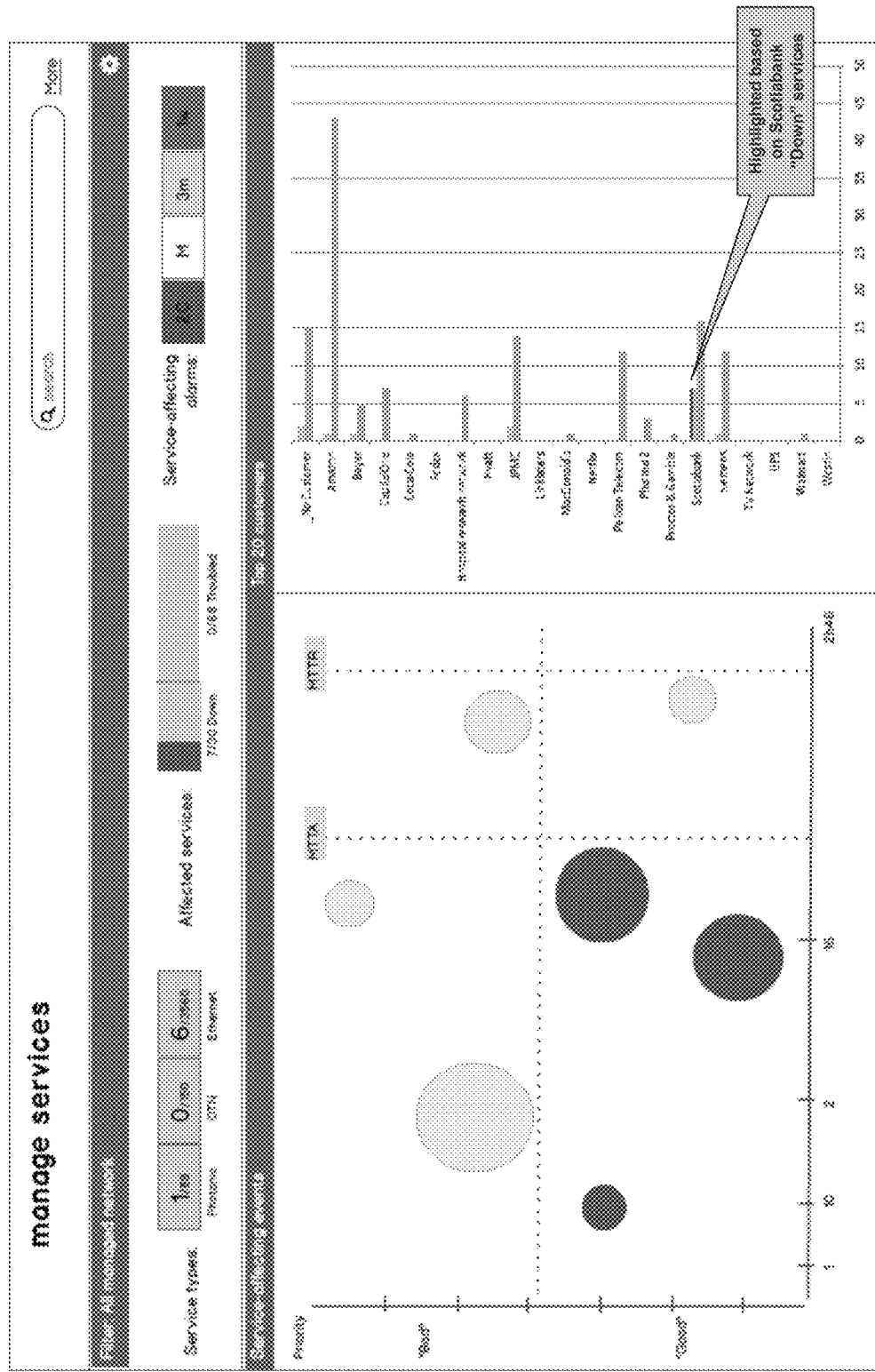
Figure 19M:
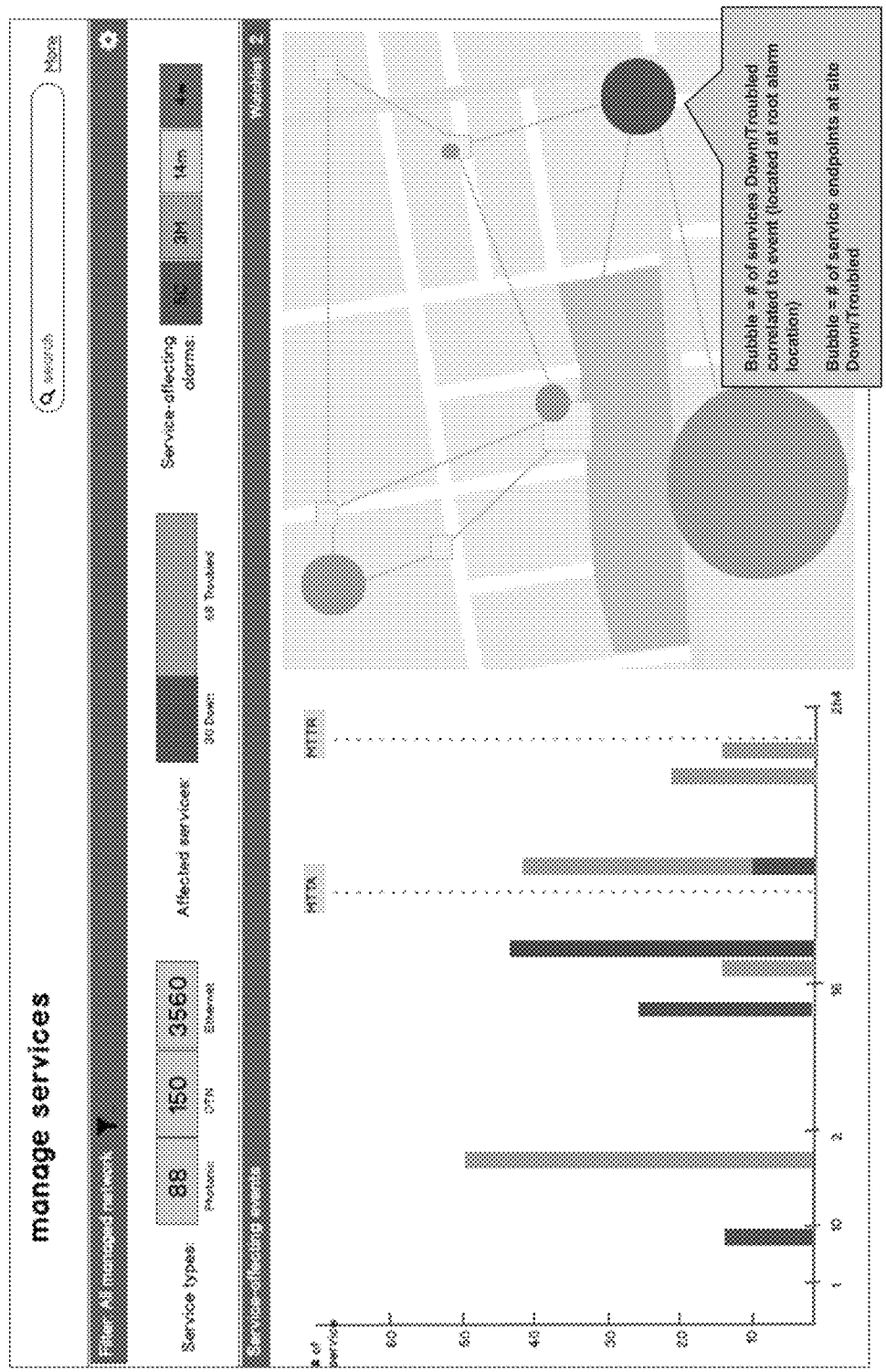

FIGS. 19A-19M are diagrams illustrating yet another (fifth) embodiment of a GUI for displaying network events allowing user interaction. As shown in FIG. 19B, the user may click on a bubble, where the GUI (controlled by the visualization module 26) may be configured to display a pop-up window showing the multiple customers on a failed optical line that is down, according to one example. Other features and examples are shown throughout the drawings.

Figure 20A:
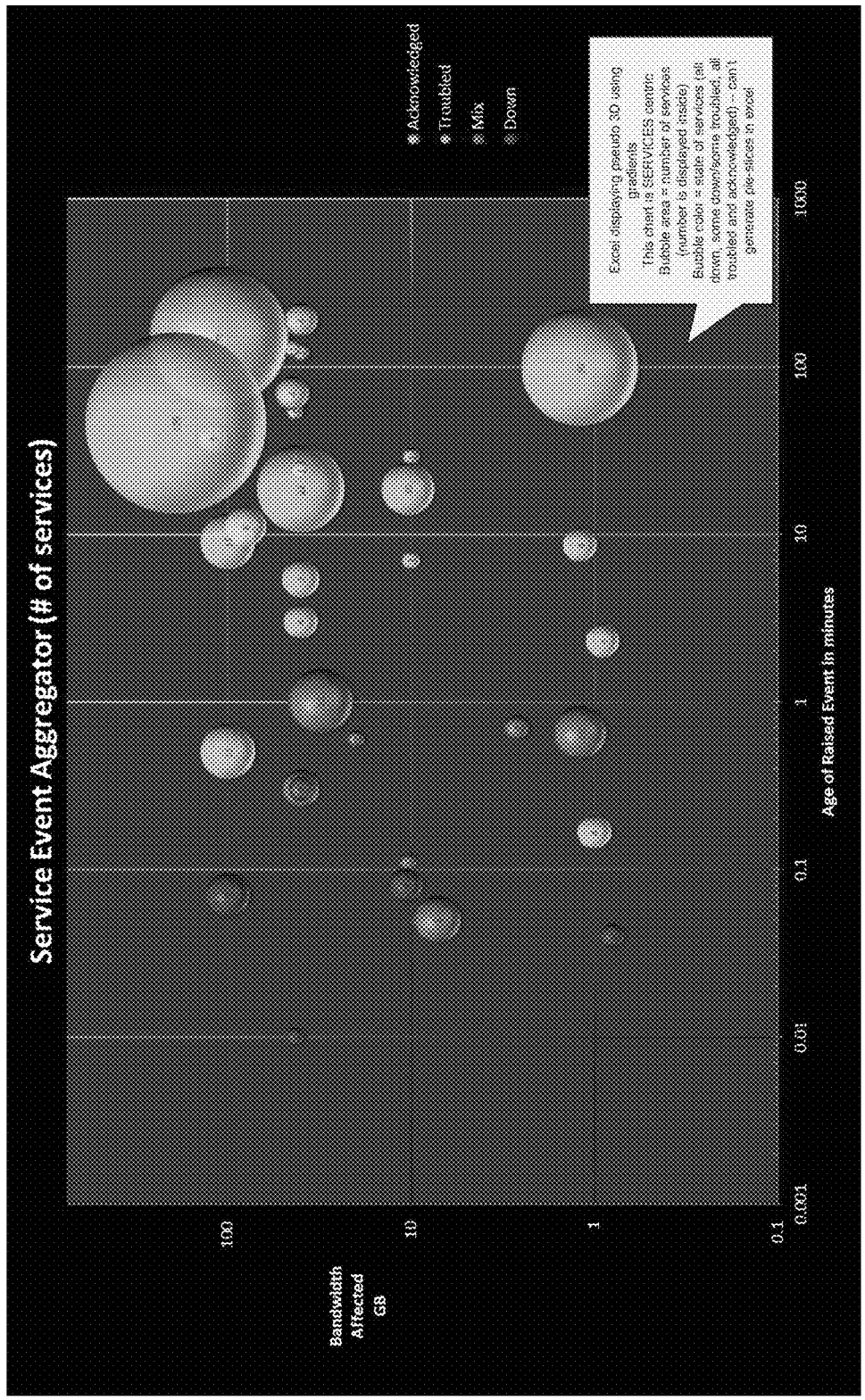
FIGS. 20A and 20B are diagrams illustrating yet another example of a GUI for displaying network events allowing user interaction, according to various embodiments.
Figure 20B:
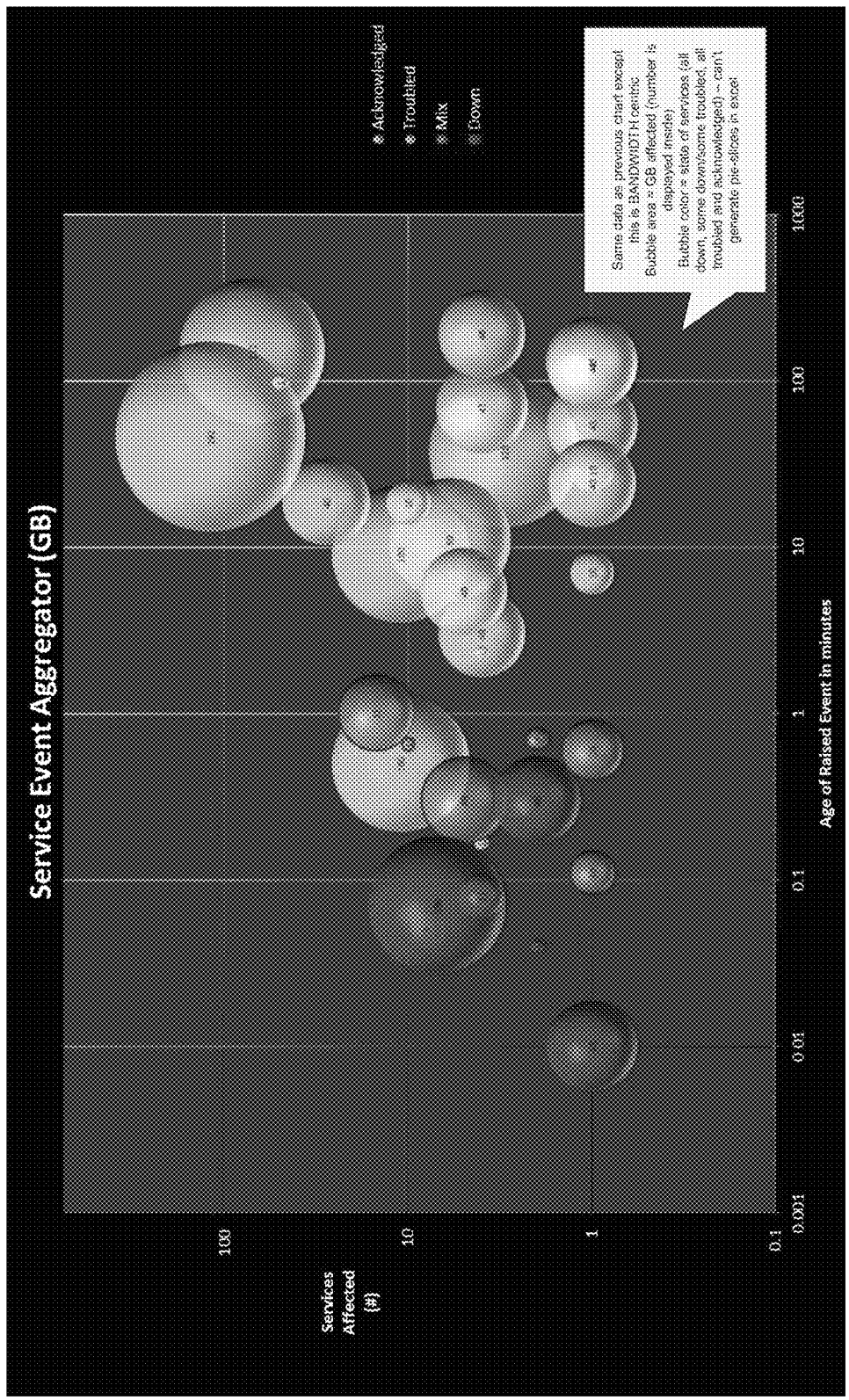

FIGS. 20A and 20B are diagrams showing a sixth embodiment of a GUI for displaying network events. This sixth GUI may be similar in certain ways to the second and fourth GUIs of FIGS. 12 and 16, respectively.

The methods and UI have the capability to correlate related Alarms & Events, including root-cause and symptomatic alarms, with all the services that they are affecting (cross-layer) at the same relative time into one Service Affecting Event Bundle (bubble). This information can be graphed on an Affected Bandwidth X Timeline plot. This gives a Service Assurance operator an unprecedented view of service affecting events across the network so they can focus on what is the highest priority, or most customers affected, or most bandwidth affected, or oldest event, etc. instead of merely focusing on the oldest, highest severity alarms first. This solution may be very useful for Service Assurance in that the multiple alarms and affected services can be bundled into one object to be worked on for troubleshooting, thus expediting an operator's ability to resolve more service affecting events at a faster rate.

The embodiments of the present disclosure also meet the needs of many customers. For example, some customers may understand that a certain amount of bandwidth is lost (e.g., 100 GB), but they may see, however, that the wavelength is also affecting hundreds of upper layer services. The customer may not need their L2 data operators chasing symptomatic alarms when their L0 transport operators can focus on resolving that particular 100 GB wavelength issue that is affecting the most important L2 upper layer services.

The embodiments of the present disclosure provide many solutions to the issues that face network operators. The tools herein allow the operator to better prioritize network issues to be able to resolve them in an effective manner to minimize SLA penalties and to maximize customer experience. The service event aggregation applications meet the requirements of several Tier 1 carrier customers and other service providers who can benefit from the visualization processes in order to have the ability to visualize related Alarms (i.e., root cause plus symptomatic alarms) associated together along with all the affected services (across layers) of those alarms into an easy to comprehend object that can be detected, isolated, and subsequently resolved in order to mitigate service disruptions faster. The present embodiments facilitate faster and more focused service assurance by an operator based on factors other than merely fixing the oldest, highest severity alarm first.

This software and processes discussed in the present disclosure may be incorporated in other management, NOC, NMS software products in a service assurance context. This allows detection, isolation, and resolution of service affecting alarms and events that are impacting the highest priority services so that they can be prioritized and diagnosed in a timely fashion.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An interactive Graphical User Interface (GUI) implemented via instructions stored in a non-transitory computer-readable medium and executable by a processing device, the interactive GUI comprising:
   a main display area configured to display one or more geometrical shapes representing one or more alarm clusters, respectively, wherein each alarm cluster represents a potential root-cause event in a system, and each of the one or more geometrical shapes has a size based upon an effect of an associated alarm, color based on a priority level of the associated alarm, and border and glow based upon the associated alarm indicating one or more services are down, and
   one or more interactive objects that, when selected by a user, provide additional information associated with the one or more alarm clusters, the interactive objects being displayed on the main display or one or more accompanying side panels,
   wherein the main display area is configured to display the geometrical shapes in a graph having an x-axis and a y-axis, wherein one of the y-axis and the x-axis represents an elapsed time since each respective alarm cluster was detected, and wherein another of the y-axis and the x-axis represents one of a number of services affected by each potential root-cause event and an amount of bandwidth at risk, wherein the one or more geometrical shapes each with a corresponding size are displayed in the graph on corresponding values for the x-axis and the y-axis.

2. The interactive GUI of claim 1, wherein the main display area is configured to show various degrees of urgency of each of the one or more alarm clusters so as to enable the user to prioritize a plurality of potential root-cause events in the system for remediation of the plurality of root-cause events.

3. The interactive GUI of claim 1, further comprising a visualization module configured to obtain the one or more alarm clusters from a service event aggregating module, wherein the service event aggregating module is configured to obtain a plurality of alarms from detectors in communication with the system and determine correlations among the alarms to aggregate the alarms into the one or more alarm clusters.

4. The interactive GUI of claim 1, wherein the main display area is further configured to periodically update a position of the one or more geometrical shapes with respect to the x-axis based on the elapsed time.

5. The interactive GUI of claim 1, wherein the main display area is configured to alter the display of the one or more geometrical shapes to indicate a service that is down.

6. A method comprising the steps of
   obtaining alarms from a multi-layer network;
   correlating the alarms across the multi-layer network based on a combination of time, flow relationships, and layer relationships; and
   presenting a visualization of the correlated alarms, wherein the visualization includes a main display area to display one or more geometrical shapes representing one or more alarm clusters, respectively, wherein each alarm cluster represents a potential root-cause event in the multi-layer network, and one or more interactive objects that, when selected by a user, provide additional information associated with the one or more alarm clusters, the interactive objects being displayed on the main display or one or more accompanying side panels, and each of the one or more geometrical shapes has a size based upon an effect of an associated alarm, color based on a priority level of the associated alarm, and border and glow based upon the associated alarm indicating one or more services are down,
   wherein the step of presenting the visualization includes plotting the geometrical shapes, which correspond to the correlated alarms and services, on a graph of having a first axis and a second axis, wherein the first axis is one of affected bandwidth and number of services affected, and wherein the second axis is time, wherein the one or more geometrical shapes each with a corresponding size are displayed in the graph on corresponding values for the first axis and the second axis.

7. The method of claim 6, wherein the visualization includes a logarithmic scale.

8. The method of claim 6, wherein the multi-layer network includes interconnected functions.

9. The method of claim 6, wherein the step of obtaining includes obtaining an alarm related to a first service at a first layer, and wherein the step of correlating the alarms includes correlating one or more alarms at other layers where one or more services are affected by the first service.

10. The method of claim 6, wherein the step of correlating utilizes a data model that tracks each layer in the multi-layer network.

11. A system comprising
a processor, and
a memory device configured to store software logic having instructions that, when executed, enable the processor to
receive alarms based on parameters detected at different points of a multi-layer network;
analyze the alarms to determine correlations among sets of alarms to group related alarms into bundles; and
graphically display each bundle as a single object on an interactive Graphical User Interface (GUI) including a main display area for displaying one or more geometrical shapes that represents one or more alarm clusters, respectively, wherein each alarm cluster represents a potential root-cause event in the multi-layer network, the GUI further including one or more interactive objects that, when selected by a user, provide additional information associated with the one or more alarm clusters, the interactive objects being displayed on the main display or one or more accompanying side panels, and each of the one or more geometrical shapes has a size based upon an effect of an associated alarm, color based on a priority level of the associated alarm, and border and glow based the associated alarm indicating one or more services are down,
wherein the graphically display on the interactive GUI includes displaying each bundle in a logarithmic graph having a first axis and a second axis, the first axis representing an age of the respective bundle, the second axis representing one of an amount of bandwidth at risk and a number of affected services on account of the bundle, wherein the one or more geometrical shapes each with a corresponding size are displayed in the graph on corresponding values for the first axis and the second axis.

12. The system of claim 11, wherein the bundles are grouped based on one or more of similar issues within a layer stack, proximity within the multi-layer network, and one or more issues occurring at the same time.

13. The system of claim 11, wherein the instruction further enables the processor to perform a visualization process to convert the alarm bundles into geometrical shapes.

14. The system of claim 11, further comprising a network interface configured to receive the alarms from detectors of Network Elements (NEs) distributed throughout the multi-layer network.

15. The system of claim 11, wherein graphically displaying the bundles includes displaying a feature to indicate an urgency of the bundle with respect to an amount of services affected by the bundle, an amount of bandwidth affected by the bundle, or a sensitivity of issues for customers.

16. The system of claim 11, wherein the GUI is part of a server at a Network Operations Center (NOC).

* * * * *